United States Patent [19]

Watanabe

[11] Patent Number: 5,596,667
[45] Date of Patent: Jan. 21, 1997

[54] APPLICATION OF PHASE CONJUGATE OPTICS TO OPTICAL SYSTEMS

[75] Inventor: Shigeki Watanabe, Kawasaki, Japan

[73] Assignee: Fujitsu Limited, Kawasaki, Japan

[21] Appl. No.: 244,995

[22] PCT Filed: Oct. 20, 1993

[86] PCT No.: PCT/JP93/01514

§ 371 Date: Jun. 20, 1994

§ 102(e) Date: Jun. 20, 1994

[87] PCT Pub. No.: WO94/09403

PCT Pub. Date: Apr. 28, 1994

[30] Foreign Application Priority Data

Oct. 20, 1992 [JP] Japan .................................. 4-281752
Nov. 16, 1992 [JP] Japan .................................. 4-304250

[51] Int. Cl.$^6$ .......................... G02B 6/00; H01S 3/10; H04J 14/02
[52] U.S. Cl. .................. 385/122; 385/1; 385/5; 385/11; 385/24; 385/42; 385/36; 372/21; 359/127; 359/134; 359/160; 359/129
[58] Field of Search .................. 385/15, 16, 11, 385/24, 31, 36, 42, 47, 122, 1, 2, 3, 4, 5, 8, 9; 372/21, 22; 359/109, 115, 122, 127, 134, 143, 159, 160, 129

[56] References Cited

U.S. PATENT DOCUMENTS

| 3,947,688 | 3/1976 | Massey | 372/22 X |
|---|---|---|---|
| 4,493,086 | 1/1985 | Jain et al. | 372/21 |
| 4,778,261 | 10/1988 | Boyd et al. | 372/21 X |
| 4,879,722 | 11/1989 | Dixon et al. | 372/21 |
| 4,897,562 | 1/1990 | Krasinski et al. | 372/22 X |
| 5,005,933 | 4/1991 | Shimuzu | 385/122 X |
| 5,243,610 | 9/1993 | Murata | 385/122 X |

FOREIGN PATENT DOCUMENTS

| 60-107603 | 6/1985 | Japan | 385/11 X |
|---|---|---|---|
| 61-113036 | 5/1986 | Japan | 385/122 X |
| 2-172122 | 7/1990 | Japan | 385/122 X |
| 2-184827 | 7/1990 | Japan | 385/122 X |
| 4-81724 | 3/1992 | Japan | 385/122 X |
| 4-149526 | 5/1992 | Japan | 385/122 X |
| 4-191709 | 7/1992 | Japan | 385/122 X |
| 4-229842 | 8/1992 | Japan | 385/11 X |
| 4-256931 | 9/1992 | Japan | 385/16 X |
| 4-355526 | 12/1992 | Japan | 385/24 X |
| 5-2199 | 1/1993 | Japan | 385/11 X |
| 5-119360 | 5/1993 | Japan | 385/11 X |

*Primary Examiner*—Brian Healy
*Attorney, Agent, or Firm*—Staas & Halsey

[57] ABSTRACT

A phase conjugate light generation apparatus for various optical systems, wherein pump light and input signal light are supplied to a non-linear optical medium to generate output signal light and phase conjugate light within the non-linear optical medium. The output signal light and the phase conjugate light are extracted by a signal light/phase conjugate light extraction unit and outputted from respective output ports.

52 Claims, 36 Drawing Sheets

Optical Multi-/Demultiplexer

FIG. 31A-1
FIG. 31A-2
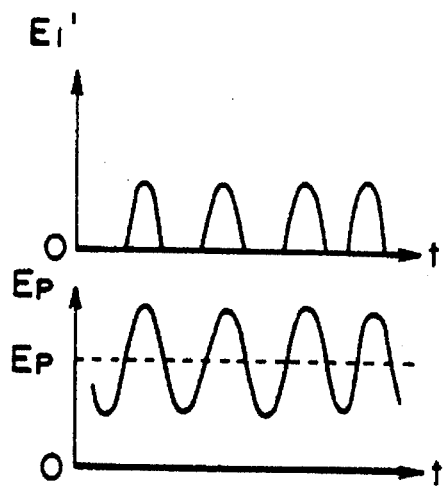
FIG. 31B-1
FIG. 31B-2
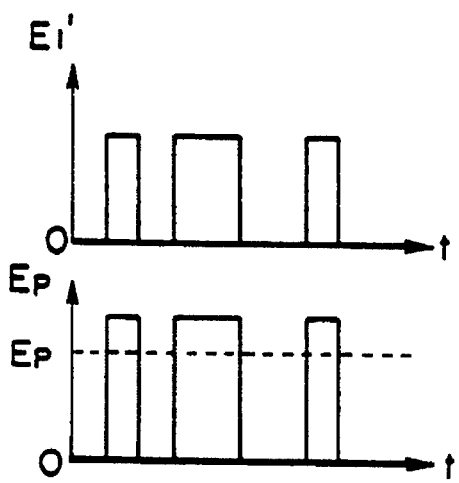
FIG. 31C-1
FIG. 31C-2
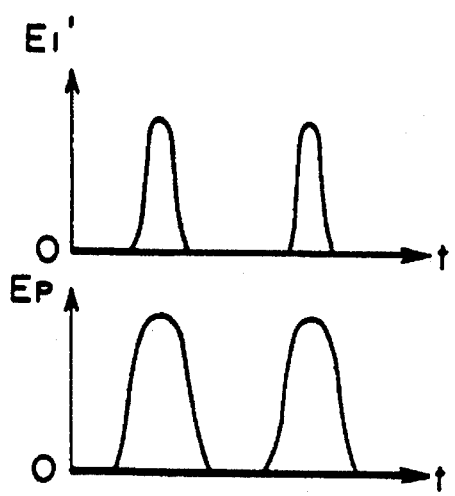

APPLICATION OF PHASE CONJUGATE OPTICS TO OPTICAL SYSTEMS

TECHNICAL FIELD

This invention relates generally to an application of phase conjugate optics to optical communications, optical measurement, optical information processing and some other fields. More particularly, the present invention relates in the first place to a phase conjugate light generation apparatus as well as a repeater optical transmission system, a bi-directional repeater optical transmission system, an optical distribution system, an optical switching system, an optical channel selection system and an optical AND circuit system which include such an apparatus. In the second place, the present invention relates to an optical communications system which employs phase conjugate light, and in the third place relates to an optical modulator which can be applied to those systems.

First, description will be given of the first application field of the present invention. The following embodiments of the present invention relate to a phase conjugate light generation apparatus as well as a repeater optical transmission system, a bi-directional repeater optical transmission system, an optical distribution system, an optical switching system, an optical channel selection system and an optical AND circuit system.

Employment of non-linear optics allows achievement of a novel function which has not been obtained by the conventional optical technology and allows improvement in the characteristics of an optical system. Particularly, employment of phase conjugate light, to which investigations have been directed actively in recent years, allows a wide variety of applications of the optical technology, from compensation for phase fluctuation or chromatic dispersion in an optical transmission line, reading of high density information, amplification with low noise, production of a quantum condition such as a squeezed condition and so forth.

BACKGROUND ART

Conventionally, in order to realize such functions as, for example, amplification of light, splitting and addition of information, several optical devices having the individual functions (in particular, an optical amplifier, an optical splitter, an optical coupler and so forth) are combined to construct a system. Meanwhile, for example, for phase fluctuation, chromatic dispersion, etc., phenomenon which occurs in an optical transmission line, a method is principally employed wherein compensation for such phenomena is performed on the sending and receiving sides of a signal, particularly on the receiving side.

It is an object of the present invention in a first application field to provide a phase conjugate light generation apparatus which has a novel construction application and can be applied to various optical systems.

It is another object of the present invention in the first application field to provide a useful optical system which includes such a phase conjugate light generation apparatus.

DISCLOSURE OF THE INVENTION

A phase conjugate light generation apparatus of the present invention comprises a non-linear optical medium, a pump light source for outputting pump light, signal light/pump light supply means for supplying input signal light supplied to a signal light input port to the non-linear optical medium together with the pump light from the pump light source, and signal light/phase conjugate light extraction means for extracting output signal light and phase conjugate light generated by an interaction between the input signal light and the pump light supplied to the non-linear optical medium and outputting the output signal light and the phase conjugate light from a signal light output port and a phase conjugate light output port, respectively.

A repeater optical transmission system of the present invention comprises a sending station, a receiving station, an optical transmission line laid between the sending station and the receiving station, and at least one repeating station interposed intermediately of the optical transmission line, the repeating station including the phase conjugate light generation apparatus of the present invention, the phase conjugate light generation apparatus receiving light supplied thereto from the side of the sending station as the input signal light and sending out the phase conjugate light toward the side of the receiving station.

A bi-directional repeater optical transmission system of the present invention comprises a first sending/receiving station having a first optical transmitter and a first optical receiver, a second sending/receiving station having a second optical transmitter and a second optical receiver, ascending and descending optical transmission lines laid between the first and second sending/receiving stations, and at least one repeating station interposed intermediately of the ascending and descending optical transmission lines, the repeating station including the phase conjugate light generation apparatus of the present invention, the pump light source of the phase conjugate light generation apparatus including first and second pump light sources for outputting first pump light and second pump light, the phase conjugate light output port of the phase conjugate light generation apparatus including first and second phase conjugate light output ports, the phase conjugate light generation apparatus receiving light supplied to the signal light input port thereof from the side of the first sending/receiving station as first signal light, generating first phase conjugate light in accordance with the first signal light and the first pump light, and sending out the first phase conjugate light from the first phase conjugate light output port thereof toward the side of the second sending/receiving station, the phase conjugate light output port of the phase conjugate light generation apparatus receiving light supplied to the signal light output port thereof from the side of the second sending/receiving station as second signal light, generating second phase conjugate light in accordance with the second signal light and the second pump light, and sending out the second conjugate light from the second phase conjugate light output port thereof toward the side of the first sending/receiving station.

An optical distribution system of the present invention comprises a plurality of the phase conjugate light generation apparatuses of the present invention, the signal light output port and the phase conjugate light output port of the upper order one of each pair of adjacent ones of the plurality of phase conjugate light generation apparatuses being connected to the signal light input port of the lower order one phase conjugate light generation apparatus of the pair.

An optical switching system of the present invention comprises the phase conjugate light generation apparatus of the present invention, and switching means for switching the pump light source of the phase conjugate light generation apparatus on and off, wherein the optical switching system switches, in response to operation of the switching means, between a condition wherein the phase conjugate light is generated and another condition wherein the phase conjugate light is not generated.

An optical selection system of the present invention comprises the phase conjugate light generation apparatus of the present invention, and sweeping means for sweeping the frequency of the pump light of the phase conjugate light generation apparatus, a plurality of kinds of frequency division multiplexed signal light being supplied to the signal light input port of the phase conjugate light generation apparatus, and phase conjugate light corresponding to signal light alternatively being selected from the plurality of kinds of signal light generated in response to operation of the sweeping means.

An optical AND circuit system of the present invention comprises the phase conjugate light generation apparatus according to an embodiment of the present invention, and pump light control means for varying the light emission intensities of the first and second pump light sources of the phase conjugate light generation apparatus in accordance with high and low levels of first and second input logic data, respectively, the phase conjugate light being generated when both of the first and second input logic data have the high level.

BRIEF DESCRIPTION OF THE DRAWINGS

FIGS. 23A-1, 23A-2, 23B-1 and 23B-2 are views illustrating intensity modulation of phase conjugate light;

FIGS. 31A-1, 31A-2, 31B-1 and 31B-2, 31C-1 and 31C-2 are views illustrating modulation of output idler light by modulation of pump light;

BEST MODE FOR CARRYING OUT THE INVENTION

Embodiments of the present invention in the first application field will be described in detail below with reference to the drawings.

Figure 1:
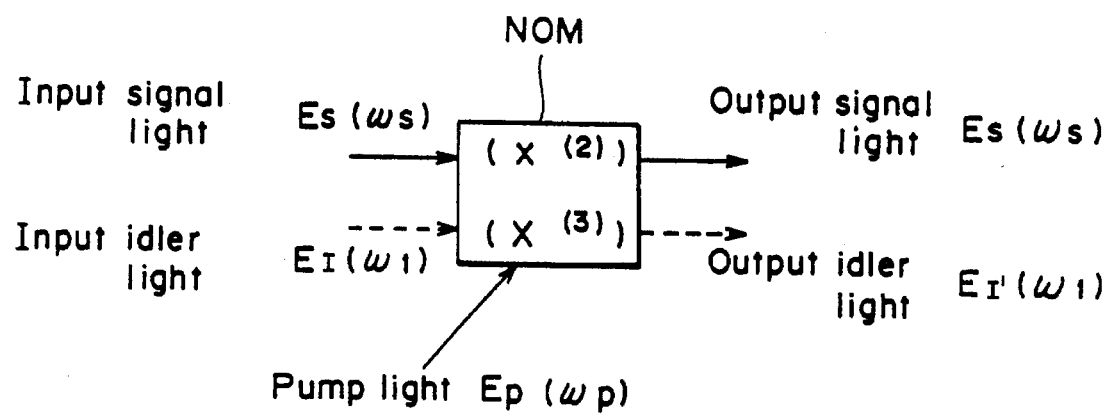
FIG. 1 is a view illustrating the principle of generation of phase conjugate light.

FIG. 1 is a view illustrating the principle of generation of phase conjugate light by a non-linear optical effect. When it is tried to generate phase conjugate light using a non-linear optical medium, preferably parametric optical amplification (optical parametric process) or four-light wave mixture is employed. While a parametric optical amplifier uses a secondary non-linear optical effect, four-light wave mixture is different in that it uses a tertiary non-linear optical effect. However, they physically are quite the same phenomenon.

Now, if signal light $E_S$ of a frequency $\omega_S$ and idler light $E_I$ of another frequency $\omega_I$ are inputted to a non-linear optical medium NOM while pump light $E_P$ (frequency $\omega_P$) of a high intensity is inputted to the non-linear optical medium NOM as shown in FIG. 1, then due to a secondary or tertiary non-linear optical process, signal light $E_S'$ of the frequency $\omega_S$ and idler light $E_I'$ of the frequency $\omega_I$ are outputted from the non-linear optical medium NOM. In this instance, in accordance with the law of energy conservation, the following relationships are met:

$$\omega_S + \omega_I = \omega_P \text{ (parametric optical amplifier)} \quad (1)$$

$$\omega_S + \omega_I = 2\omega_P \text{ (four-light wave mixture)} \quad (2)$$

Figure 2:
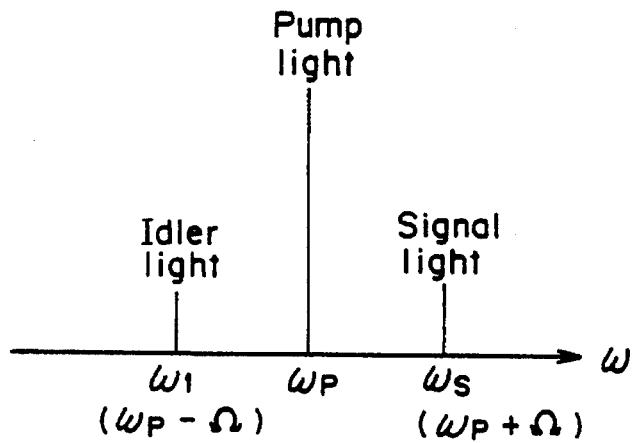
FIG. 2 is a view illustrating the arrangement of frequencies of signal light, pump light and idler light.

Particularly, the arrangement of frequencies of the signal light, the pump light and the idler light in four-light wave mixture is shown in FIG. 2. $\Omega$ denotes a detuning frequency between the signal light and the pump light. It can be seen that, on the frequency axis, the signal light and the idler light are at symmetrical positions with respect to the pump light.

If the interaction length of the non-linear optical effect in the principle of FIG. 1 is represented by L, generation equations are given as below:

$$\frac{E_S'}{(\omega_S)^{1/2}} = \cosh(|g|L)\frac{E_S}{(\omega_S)^{1/2}} - i\exp(i\theta)\sinh(|g|L)\frac{E_I^*}{(\omega_I)^{1/2}} \quad (3)$$

$$\frac{E_I^*}{(\omega_I)^{1/2}} = \cosh(|g|L)\frac{E_I^*}{(\omega_I)^{1/2}} + i\exp(-i\theta)\sinh(|g|L)\frac{E_S}{(\omega_S)^{1/2}} \quad (4)$$

Here, g represents an engagement constant, and particularly in the case of four-light wave mixture, $$g = \kappa E_P^2 = |g|\exp(i\theta) \quad (5)$$

$$\kappa = \frac{3\omega_0}{2nc}\langle\chi^{(3)}\rangle \quad (6)$$

n and $\chi^{(3)}$ represent the refraction index and the tertiary non-linear optical constant of the non-linear medium NOM, respectively. Meanwhile, $\langle\chi^{(3)}\rangle$ represents an average of the non-linear optical constant $\chi^{(3)}$ in a polarization condition in the non-linear medium NOM. It can be recognized that, from the equations (3) and (4), the gains $G_S$ and $G_I$ for the signal light and the idler light are given by $$G_S = G = \cosh^2(|g|L) \quad (7)$$

$$G_I = (G-1)\frac{\omega_I}{\omega_S} = \sinh^2(|g|L)\frac{\omega_I}{\omega_S} \quad (8)$$

Normally, since $\omega_I/\omega_S \simeq 1$, it can be recognized that amplification of a signal is realized in generation of phase conjugate light by a non-linear optical effect. Further, since the gains in this instance rely upon the intensity of the pump light, optical modulation can be performed in a phase conjugate light generation apparatus of the present invention to carry new information onto light to be outputted from the phase conjugate light generation apparatus.

The output idler light $E_I'$ generated in accordance with the principle of FIG. 1 is phase conjugate light with the input signal light $E_S$. This is apparent from the consideration of the equations (3) and (4) for the case wherein no input idler light is inputted ($E_I=0$) ($E_I'$ corresponds to a complex conjugate with $E_S$).

Subsequently, the characteristic of time reversal, which is a significant feature of such phase conjugate light, will be described. Now, it is assumed that input probe light (corresponding to input signal light which is not in a modulated condition) which advances in the direction of $+z$ is represented as a plane wave by the following equation:

$$E_S(r,t)=(1/2)A_S(r)\exp[i(\omega_S t - k_S z)] + c.c. + tm \quad (9)$$

Here, AS(r) represents a complex amplitude of an electric field, r represents a spatial coordinate vector, $\omega_S$ represents a frequency of the probe light, t represents time, and $k_S$ represents a wave number vector, and c.c. signifies that a complex conjugate with a term just prior to the same is provided there. It is to be noted that the magnitude $k_S$ of the wave number vector is given, where the refractive index of the optical path is represented by n and the velocity of light in the vacuum is represented by c, by $k_S = \omega_S n/c$. In this instance, phase conjugate light of the light represented by the equation (9) is represented by the following equations (10) and (11):

$$E_c(r,t)=(1/2)A_s^*(r)\exp[i(\omega_S t - k_S z)] + c.c \quad (10)$$

$$E_c(r,t)=(1/2)A_s^*(r)\exp[i(\omega_S t + k_S z)] + c.c \quad (11)$$

Here, the equation (10) represents transmission type phase conjugate light which is a progressive wave in the direction of $+z$, and the equation (11) represents reflection type phase conjugate light which is a progressive wave in the direction of $-z$. As is apparent from the equations (9) and (11), the equation $$E_C(r, t) = E_S(r, -t) \quad (12)$$

stands with reflection type phase conjugate light, and it can be seen that the phase conjugate light has the characteristic of time reversal. By making use of the characteristic of time reversal, phase fluctuation such as linear phase deformation (influence of, for example, chromatic dispersion) or polarization variation, which occurs in an optical transmission line, can be compensated for.

Figure 3:
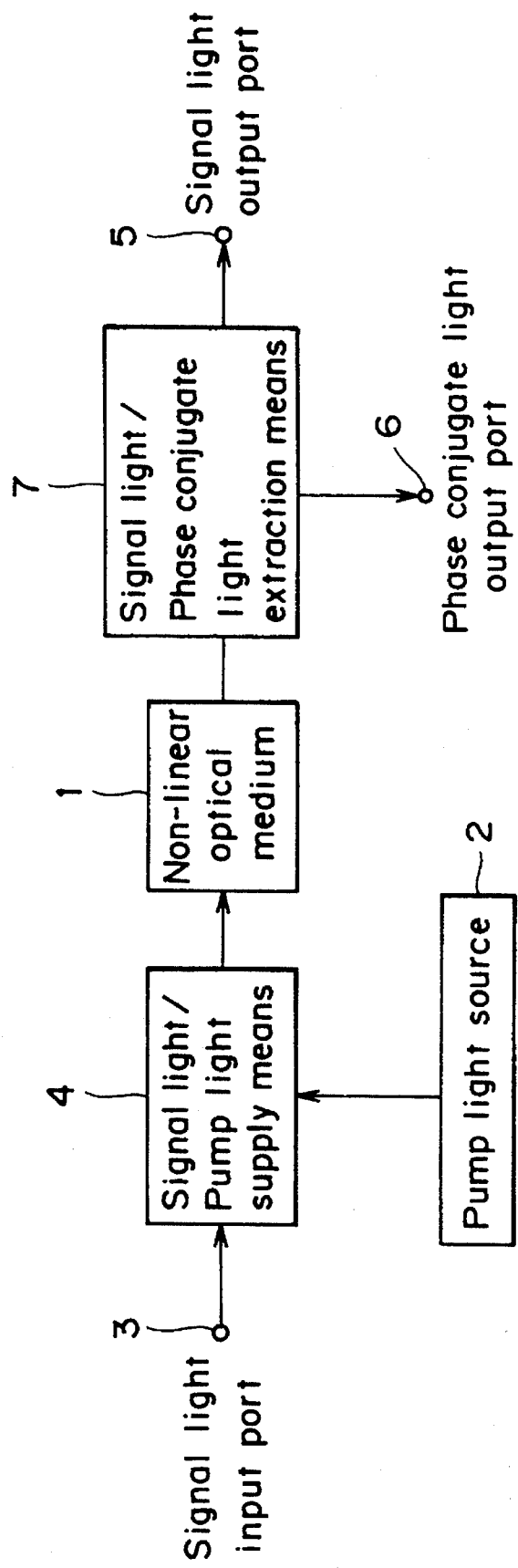
FIG. 3 is a block diagram of a phase conjugate light generation apparatus showing a basic construction of the present invention.

FIG. 3 is a block diagram showing a basic construction of a phase conjugate light generation apparatus of the present invention. Reference numeral 1 denotes a non-linear optical medium, 2 a pump light source, 3 a signal light input port, 4 signal light/pump light supply means, 5 a signal light output port, 6 a phase conjugate light output port, and 7 signal light/phase conjugate light extraction means.

The pump light source 2 outputs pump light. The signal light/pump light supply means 4 supplies input signal light supplied to the signal light input port 3 to the non-linear optical medium 1 together with the pump light from the pump light source 2. The signal light/phase conjugate light extraction means 7 extracts output signal light and phase conjugate light generated by an interaction between the input signal light and the pump light supplied to the non-linear optical medium 1 and outputs the output signal light and the phase conjugate light from the signal light output port 5 and the phase conjugate light output port 6, respectively.

With the present construction, signal light and pump light can be inputted to the non-linear optical medium 1 to generate phase conjugate light. Further, since the phase conjugate light thus generated can be extracted from the phase conjugate light output port 6, the present apparatus can be applied to various optical systems.

Figure 4:
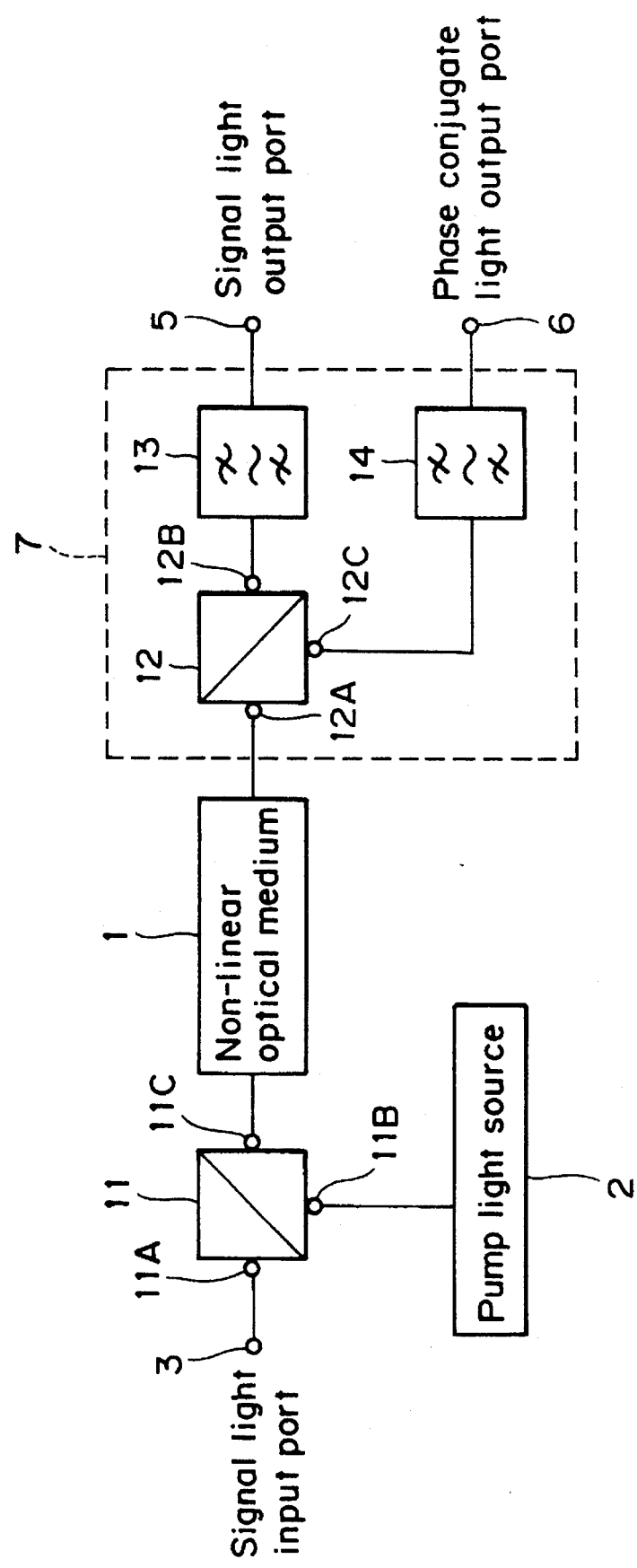
FIG. 4 is a block diagram of a phase conjugate light generation apparatus showing a first embodiment of the present invention.

FIG. 4 is a block diagram of a phase conjugate light generation apparatus showing a first embodiment of the present invention. In the present embodiment, the signal light/pump light supply means 4 of FIG. 3 includes an optical coupler 11 having at least three ports. The optical coupler 11 has ports 11A, 11B and 11C and functions so as to output light supplied to the port 11A and 11B from the port 11C. The port 11A of the optical coupler 11 is connected to the signal light input port 3; the port 11B is connected to the pump light source 2; and the port 11C is connected to a first end of the non-linear optical medium 11. It is to be noted that the terminology "connection" in the description of the present application signifies connection in action and includes direct optical connection and further includes connection by way of an optical device such as an optical filter, an optical isolator or an optical amplifier. For the optical coupler 11, an optical coupler of the fiber fusion type, a half mirror, a polarization beam splitter, an optical combiner or a like element can be employed. Meanwhile, for the non-linear optical medium 1, an optical fiber, a semiconductor laser, a semiconductor optical amplifier, optical crystal which exhibits a secondary or tertiary non-linear optical effect or a like element can be adopted.

When signal light and pump light are supplied to the non-linear optical medium 1 using the optical coupler 11 as in the present embodiment, the signal light and the pump light enter the non-linear optical medium 1 along the same optical path from the first end of the non-linear optical medium 1, and accordingly, in the non-linear optical medium 1, the signal light and the pump light propagate in the same direction. When, for example, the non-linear optical medium 1 exhibits a tertiary non-linear optical effect, the signal light and the pump light cause four-light wave mixture of the one-directional pumping type so that phase conjugate light can be extracted from the second end of the non-linear optical medium 1.

When the intensity of the pump light supplied from the pump light 2 is sufficiently high, a gain is produced in the non-linear optical medium 1 as described above, and amplified signal light and phase conjugate light are outputted from the non-linear optical medium 1. In order to separately extract the signal light and the phase conjugate light, in the present embodiment, the signal light/phase conjugate light extraction means 7 of FIG. 3 includes an optical divider 12 and a pair of optical filters 13 and 14. The optical divider 12 has ports 12A, 12B and 12C and functions such that it divides light supplied to the port 12A into two beams of light and outputs the two beams of light from the ports 12B and 12C, respectively. The port 12A of the optical divider 12 is connected to the second end of the non-linear optical medium 1. For the optical divider 12, for example, an optical divider of the fiber fusion type, a half mirror, a polarization beam splitter, an optical splitter or a like element is used. The optical filter 13 is interposed in an optical path between the port 12B of the optical divider 12 and the signal light output port 5, and has a pass band which contains the frequency of the output signal light. The optical filter 14 is interposed in an optical path between the port 12C of the optical divider 12 and the phase conjugate light output port 6, and has a pass band which contains the frequency of the phase conjugate light.

Where the frequency of pump light and the frequency of signal light are a little different from each other to cause four-light wave mixture of the non-degeneracy type in the non-linear optical medium 1, the output signal light and the phase conjugate light can be separated optically in this manner. Where, for example, a laser diode is employed for the pump light 2, an information signal is superimposed on the drive current for the laser diode to perform amplitude modulation or intensity modulation of the pump light to modulate the gain of the non-linear optical medium 1, and as a result, modulated output signal light and phase conjugate light can be obtained.

Figure 5:
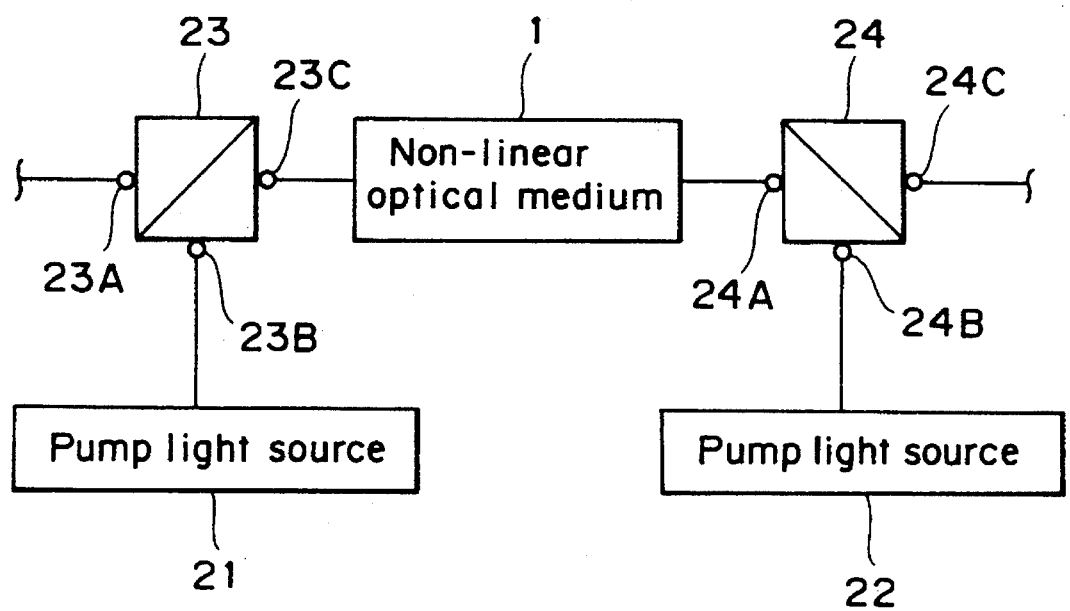
FIG. 5 is a block diagram of a major portion of a phase conjugate light generation apparatus for explaining second and third embodiments of the present invention.

FIG. 5 is a block diagram of a principal part of a phase conjugate light generation apparatus for explaining second and third embodiments of the present invention. The second and third embodiments are characterized in that two beams of pump light having an equal frequency are introduced in the opposite directions to each other into the non-linear optical medium 1 to cause four-light wave mixture of the bi-directional pumping type. Two pump light sources 21 and 22 are provided corresponding to the pump light source 2 of FIG. 3. In order to introduce the two beams of pump light from the pump light sources 21 and 22 in the opposite directions to each other into the non-linear optical medium 1, the signal light/pump light supply means 4 of FIG. 3 includes two optical couplers 23 and 24. The optical coupler 23 has ports 23A, 23B and 23C and functions such that it outputs light supplied to the ports 23A and 23B from the port 23C and outputs light supplied to the port 23C from the port 23A. The port 23B of the optical coupler 23 is connected to the pump light source 21, and the port 23C is connected to the first end of the non-linear optical medium 1. The optical coupler 24 has ports 24A, 24B and 24C and functions such that it outputs light supplied to the port 24A from the port 24C and outputs light supplied to the port 24B from the port 24A. The port 24A of the optical coupler 24 is connected to the second end of the non-linear optical medium 1, and the port 24B is connected to the pump light source 22. While the two independent pump light sources 21 and 22 are employed in the example shown, alternatively pump light from a single pump light having a high output intensity may be divided into two beams, which are individually supplied to the port 23B of the optical coupler 23 and the port 24B of the optical coupler 24. In this instance, the control for making the frequencies of two pump light beams equal to each other is unnecessary.

Figure 6:
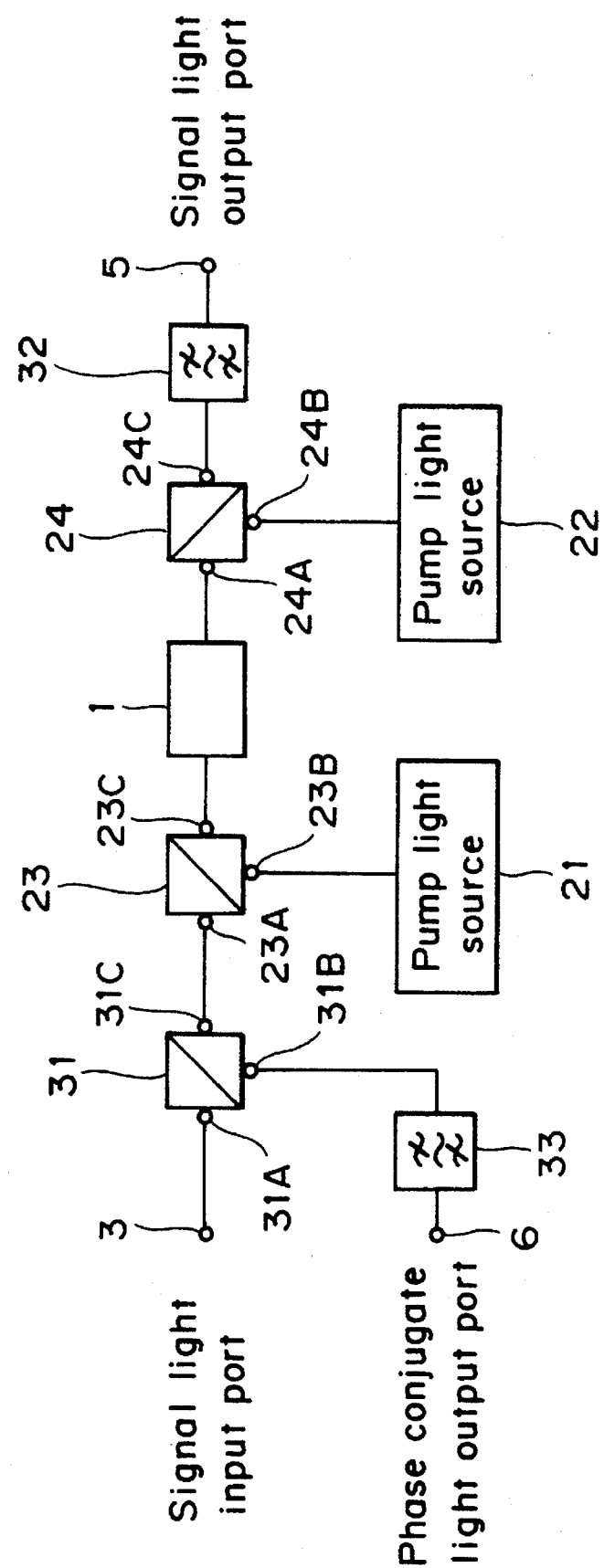
FIG. 6 is a block diagram of a phase conjugate light generation apparatus showing the second embodiment of the present invention.

FIG. 6 is a block diagram of a phase conjugate light generation apparatus showing the second embodiment of the present invention. The present embodiment is suitable to extract phase conjugate light generated in the rearward direction by four-light wave mixture of the bi-directional pumping type in the non-linear optical medium 1 of the principal part of FIG. 5. In order to extract the phase conjugate light generated in the opposite direction to that of the signal light propagating in the non-linear optical medium 1, in the present embodiment, the signal light/phase conjugate light extraction means 7 of FIG. 3 includes an optical divider 31 and a pair of optical filters 32 and 33. The optical divider 31 has ports 31A, 31B and 31C and functions such that it outputs light supplied to the port 31A from the port 31C and outputs light supplied to the port 31C from the port 31B. The optical filter 32 is interposed in an optical path between the port 24C of the optical coupler 24 and the signal light output port 5 and has a pass band which contains the frequency of the output signal light. The optical filter 33 is interposed in an optical path between the port 31B of the optical divider 31 and the phase conjugate light output port 6 and has a pass band which contains the frequency of the phase conjugate light.

Figure 7:
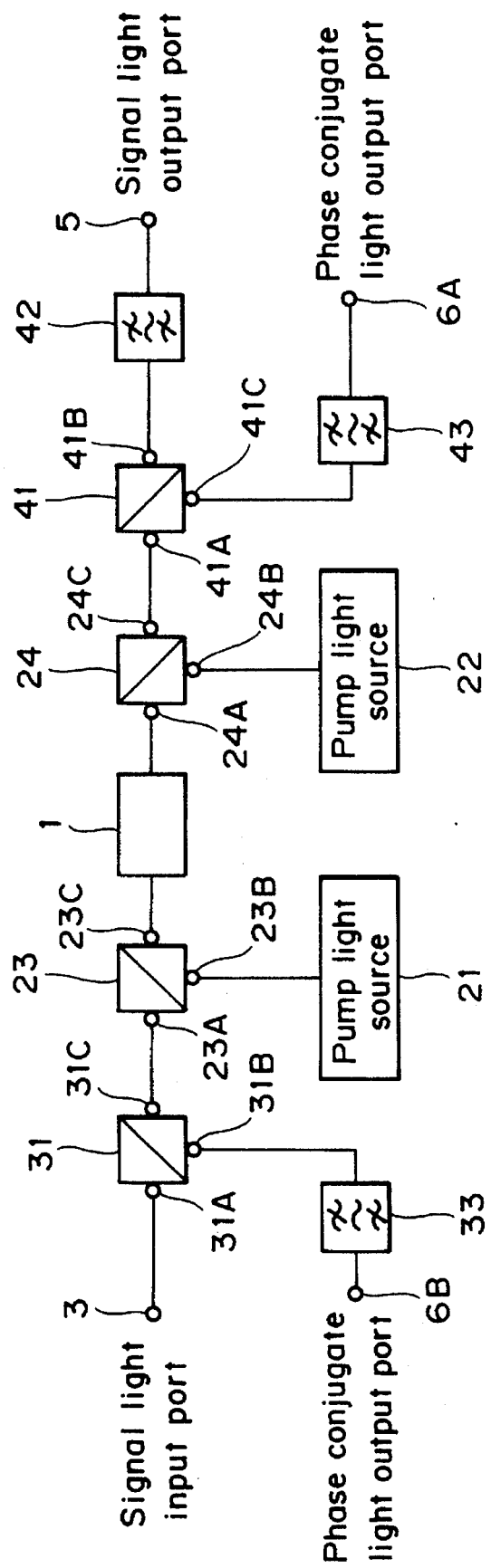
FIG. 7 is a block diagram of a phase conjugate light generation apparatus showing the third embodiment of the present invention.

FIG. 7 is a block diagram of a phase conjugate light generation apparatus showing the third embodiment of the present invention. The present embodiment is suitable to extract phase conjugate light generated in the forward direction and the rearward direction by four-light wave mixture of the bi-directional pumping type in the non-linear optical medium 1 of the principal part of FIG. 5. In order to extract the beams of phase conjugate light generated in the forward direction and the rearward direction, in the present embodiment, phase conjugate light output ports 6A and 6B are provided corresponding to the phase conjugate light output port 6 of FIG. 3, and the signal light/phase conjugate light extraction means 7 includes optical dividers 31 and 41, and optical filters 33, 42 and 43. The optical divider 31 and the optical filter 33 are provided to extract phase conjugate light generated in the rearward direction similarly as in the second embodiment of FIG. 6, and the phase conjugate light output port 6B is connected to the optical filter 33. The optical divider 41 and the optical filters 42 and 43 are provided to extract phase conjugate light generated in the forward direction. The optical divider 41 has ports 41A, 41B and 41C, and splits light supplied to the port 41A and outputs two beams of light from the ports 41B and 41C. The port 41A of the optical divider 41 is connected to the port 24C of the optical coupler 24. The optical filter 42 is interposed in an optical path between the port 41B of the optical divider 41 and the signal light output port 5 and has a pass band which contains the frequency of the output signal light. The optical filter 43 is interposed in an optical path between the port 41C of the optical divider 41 and the phase conjugate light output port 6A and has a pass band which contains the frequency of the phase conjugate light.

Figure 8:
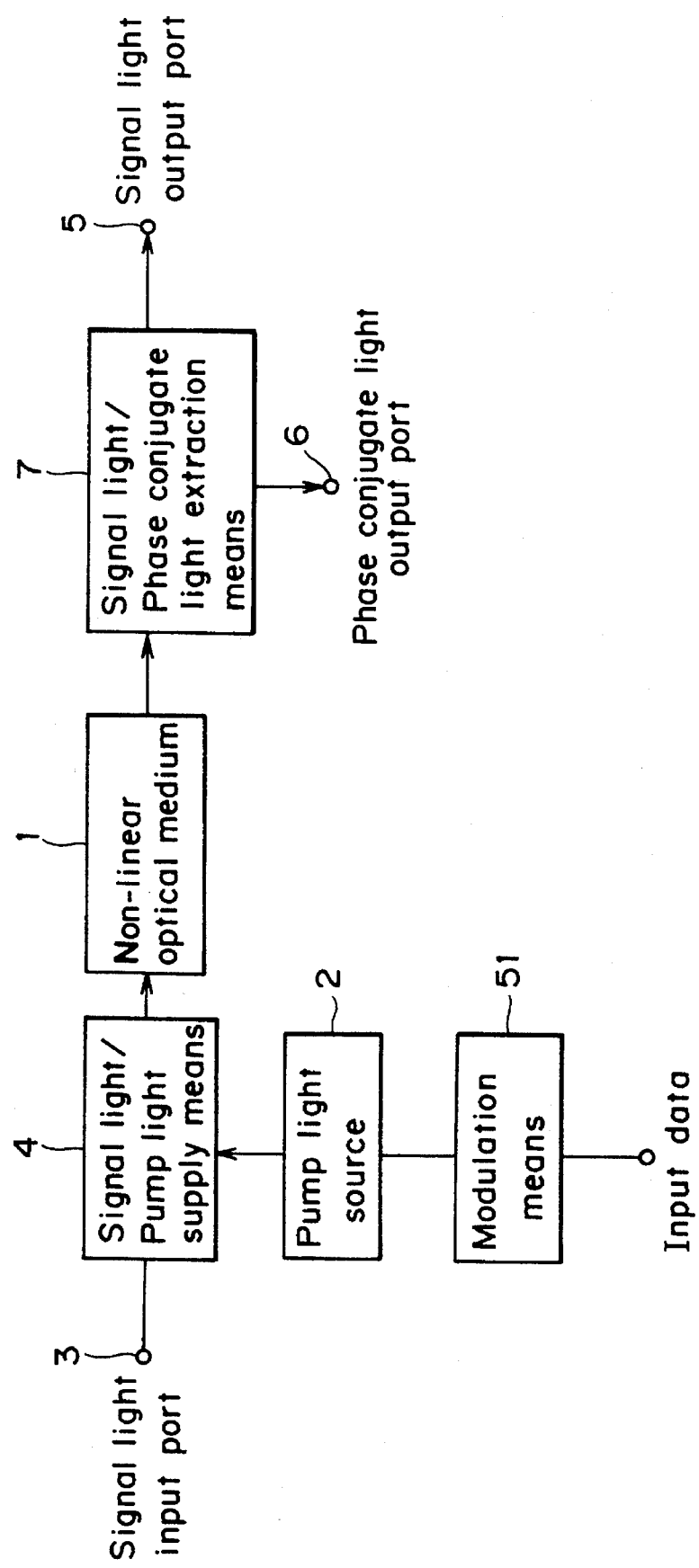
FIG. 8 is a block diagram of a phase conjugate light generation apparatus showing a fourth embodiment of the present invention.

FIG. 8 is a block diagram of a phase conjugate light generation apparatus showing the fourth embodiment of the present invention. The present embodiment is characterized in that, in contrast with the basic construction of FIG. 3, it further includes modulation means 51 for modulating pump light in accordance with input data. Where the modulation means 51 modulates the intensity or the amplitude of pump light, the gain of the non-linear optical medium 1 is varied in response to such modulation, and accordingly, modulation can be performed for both of the signal light to be outputted from the signal light output port 5 and the phase conjugate light to be outputted from the phase conjugate light output port 6. On the other hand, where the modulation means 51 modulates the frequency of pump light, frequency modulation of phase conjugate light is possible from the relationship that the difference between the frequency of the signal light and the frequency of the pump light is equal to the difference between the frequency of the pump light and the frequency of the phase conjugate light. It is to be noted that, where the modulation means 51 modulates the intensity of the pump light, the degree of modulation may be set low so as to superimpose a modulation component on the output signal light and/or the phase conjugate light, or the degree of modulation may be set high so as to modulate the phase conjugate light by on-off modulation. Where the modulation means 51 is applied to the second embodiment of FIG. 6 or the third embodiment of FIG. 7 to perform intensity modulation of a pump light source, pump light outputted from one of the pump light sources 21 and 22 should be modulated by the modulation means 51. It is to be noted that, in the embodiments of the phase conjugate light generation apparatus described above, optical amplification may be performed for pump light, output signal light or phase conjugate light when necessary.

Figure 9A:
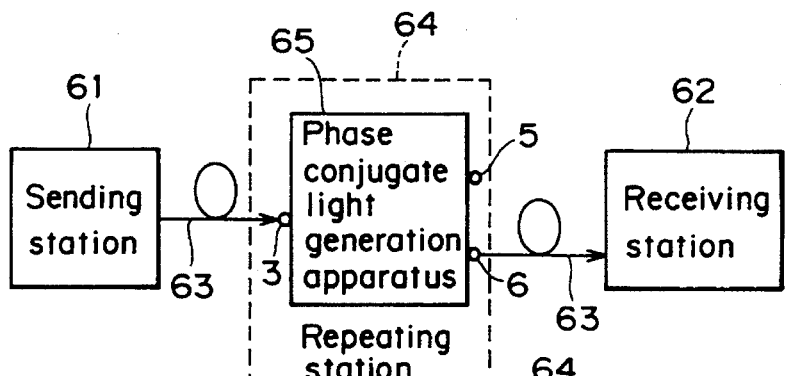
FIGS. 9A, 9B and 9C are block diagrams of repeater optical transmission systems showing a fifth embodiment of the present invention.
Figure 9B:
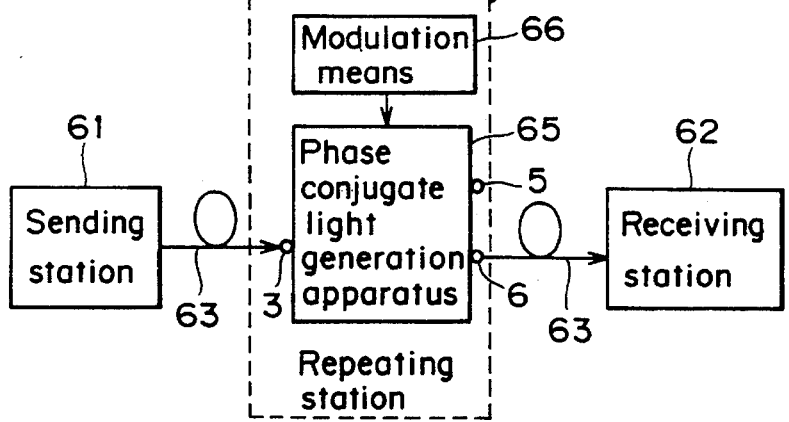
Figure 9C:
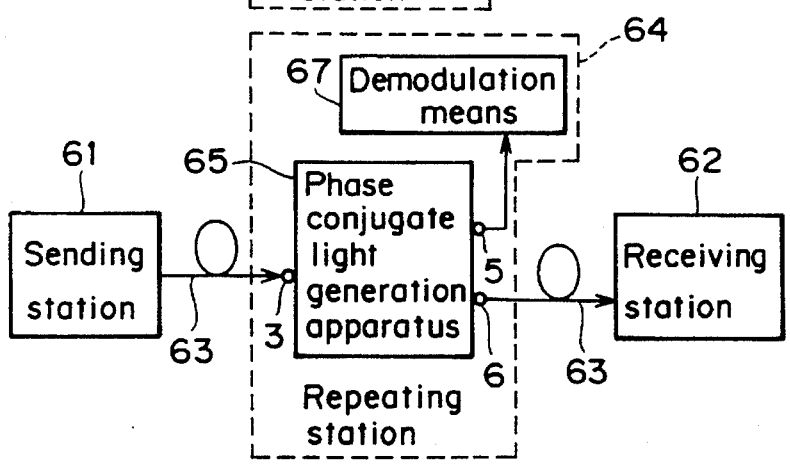

FIGS. 9A, 9B and 9C are block diagrams of repeater optical transmission systems showing the fifth embodiment of the present invention. Each of these systems includes a sending station 61, a receiving station 62, an optical transmission line 63 laid between the sending station 61 and the receiving station 62, and a repeating station 64 interposed intermediately in the optical transmission line 63.

In the example shown in FIG. 9A, the repeating station 64 includes a phase conjugate light generation apparatus 65, and the phase conjugate light generation apparatus 65 receives, as input signal light, light supplied to the signal light input port 3 from the sending station 61 by way of the optical transmission line 63 and sends out phase conjugate light generated in accordance with the input signal light from the phase conjugate light output port 6 to the receiving station 62 by way of the optical transmission line 63. The phase conjugate light generation apparatus 62 has, for example, the basic construction shown in FIG. 3. With this construction, since the phase conjugate light generation apparatus 65 is provided intermediately in the optical transmission line 63, chromatic dispersion or a like parameter caused in the optical transmission line 63 can be compensated for, which allows long haul optical transmission. Further, when the phase conjugate light generation apparatus 65 is constructed so as to produce a gain for the phase conjugate light, the signal light intensity attenuated in the optical transmission line 63 can be compensated for.

In the example shown in FIG. 9B, the repeating station 64 includes, in addition to the phase conjugate light generation apparatus 65, modulation means 66 for modulating pump light in accordance with input data. The input data include, for example, supervision data for the repeating station 64. With this construction, information peculiar to the repeating station 64, such as supervision data, can be transmitted to the receiving station 62. It is to be noted that the construction may be modified such that output signal light from the signal light output port 5 of the phase conjugate light generation apparatus 65 is transmitted to the receiving station 62 and modulated phase conjugate light outputted from the phase conjugate light output port 6 is transmitted to the sending station 61.

In the example shown in FIG. 9C, light to be sent out from the sending station 61 is modulated in accordance with transmission data, and the repeating station 64 includes, in addition to the phase conjugate light generation apparatus 65, demodulation means 67. The demodulation means 67 receives output signal light outputted from the signal light output port 5 of the phase conjugate light generation apparatus 65 and reproduces demodulation data corresponding to transmission data of the sending station 61. The modulation method in the sending station 61 is, for example, intensity modulation for coherent light or incoherent light or amplitude modulation or angle modulation for coherent light. For the detection method in the receiving station 62, direction detection which employs an optical receiver such as a photodiode is suitable where the modulation method in the transmitting station 61 is intensity modulation, but where the modulation method in the transmitting station 61 is amplitude modulation or angle modulation for coherent light, heterodyne detection or homodyne detection wherein receive light and local light are introduced along a same optical path to a light receiving face of an optical receiver such as a photodiode is suitable. With this construction, transmission data transmitted from the sending station 61 to the receiving station 62 can be monitored at the repeating station 64.

The systems of FIGS. 9A, 9B and 9C can be applied also to frequency division multiplex transmission. In this instance, preferably, the repeating station 64 has a pump light source for each frequency, but where the frequency division multiplex distance is short, it is otherwise possible to employ a single pump light source to generate phase conjugate light for all channels.

Figure 10:
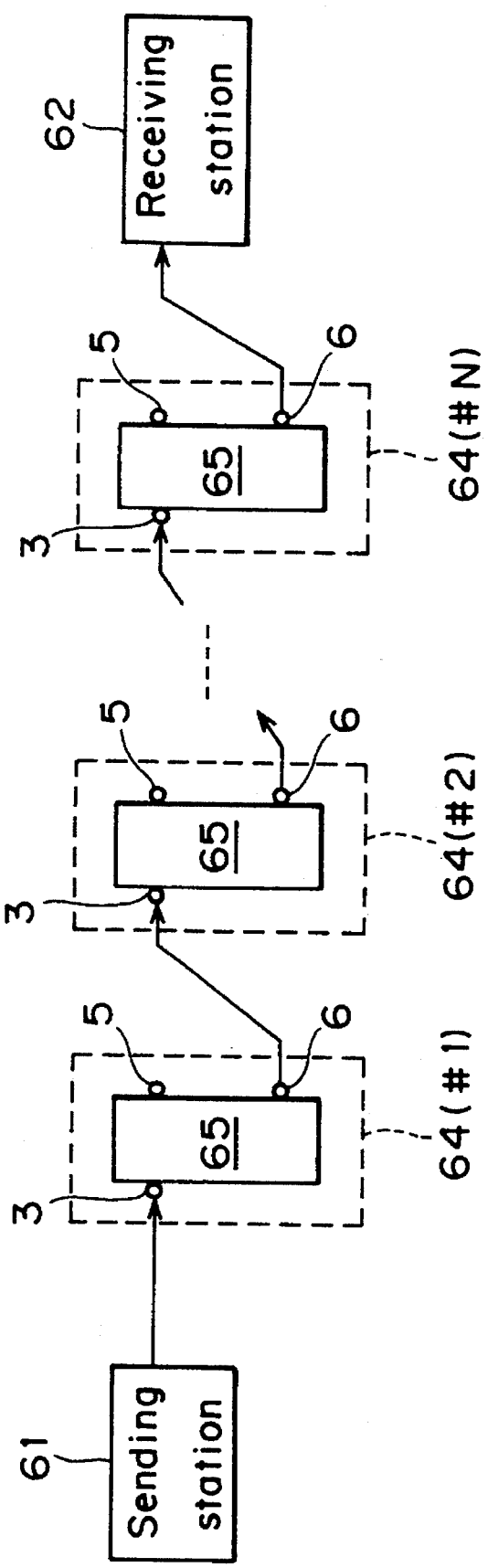
FIG. 10 is a block diagram of a repeater optical transmission system showing a sixth embodiment of the present invention.

FIG. 10 is a block diagram of a repeater optical transmission system showing the sixth embodiment of the present invention. The present embodiment is characterized in that, in contrast with the systems shown in FIGS. 9A, 9B and 9C, N (N is a natural number greater than 1) repeating stations 64 (#1 to #N) are interposed between the transmitting station 61 and the receiving station 62. The signal light input port 3 of the phase conjugate light generation apparatus 65 of the first repeating station 64 (#1) as counted from the side of the sending station 61 is connected to the sending station 61. Meanwhile, the signal light input port 3 of the phase conjugate light generation apparatus 65 of the nth (n is a natural number greater than 1 but smaller than (N+1)) repeating station of the repeating stations 64 (#1 to #N) as counted from the side of the sending station 61 is connected to the phase conjugate light output port 6 of the phase conjugate light generation apparatus 65 of the (n−1)th repeating station. Further, the phase conjugate light output port 6 of the phase conjugate light generation apparatus 65 of the first repeating station 64 (#N) as counted from the side of the receiving station 62 is connected to the receiving station 62. With the present embodiment, longer haul optical transmission can be achieved in comparison with any of the embodiments of FIGS. 9A, 9B and 9C.

Figure 11:
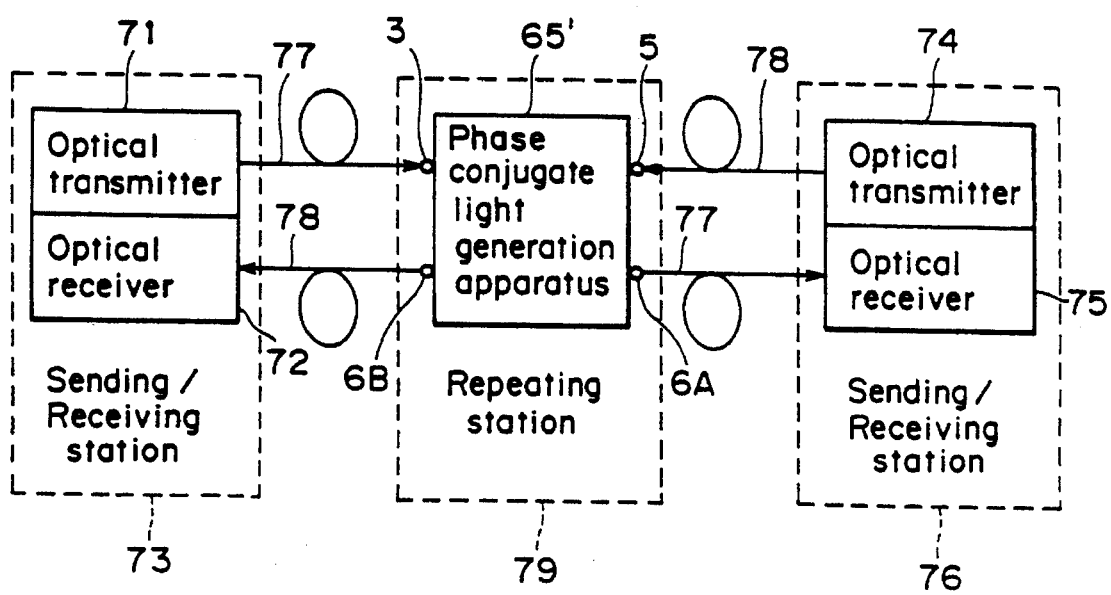
FIG. 11 is a block diagram of a bi-directional repeater optical transmission system showing a seventh embodiment of the present invention.

FIG. 11 is a block diagram of a bi-directional repeater optical transmission system showing the seventh embodiment of the present invention. The present system includes a sending/receiving station 73 having an optical transmitter 71 and an optical receiver 72, another sending/receiving station 76 having an optical transmitter 74 and an optical receiver 75, an ascending optical transmission line 77 and a descending optical transmission line 78 laid between the sending/receiving stations 73 and 75, and a repeating station 79 interposed intermediately in the ascending and descending optical transmission lines 77 and 78. The repeating station 79 includes a phase conjugate light generation apparatus 65' modified so as to be adapted to bi-directional transmission. The phase conjugate light generation apparatus 65' has first and second pump light sources, not shown, for outputting first and second pump light beams, respectively, and outputs generated phase conjugate light from phase conjugate light output ports 6A and 6B.

Figure 12:
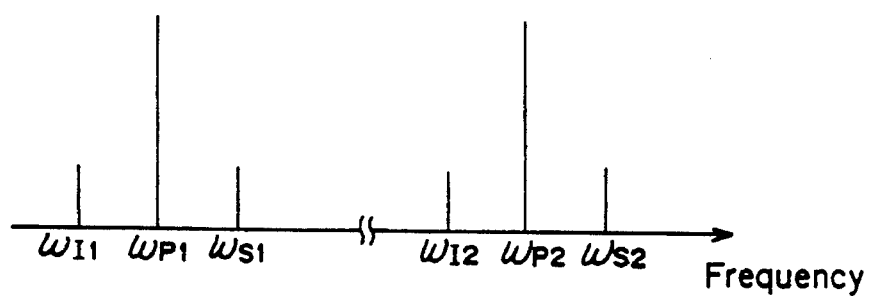
FIG. 12 is a view illustrating the arrangement of frequencies in the system of FIG. 11.

FIG. 12 is a view illustrating the arrangement of frequencies of different light in the system of FIG. 11. $\omega_{P1}$ represents the frequency of first pump light, $\omega_{S1}$ the frequency of first signal light which is supplied from the optical transmitter 71 to the signal light input port 3 of the phase conjugate light generation apparatus 65' by way of the ascending optical transmission line 77, $\omega_{r1}$ the frequency of first phase conjugate light which is generated from the phase conjugate light generation apparatus 65' in accordance with the first pump light and the first signal light, $\omega_{P2}$ the frequency of second pump light, $\omega_{S2}$ the frequency of second signal light which is supplied from the optical transmitter 74 to the signal light output port 5 of the phase conjugate light generation apparatus 65' by way of the descending optical transmission line 78, and $\omega_{r2}$ the frequency of second phase conjugate light which is generated from the phase conjugate light generation apparatus 65' in accordance with the second pump light and the second signal light. The first pump light and the second pump light have, for example, different frequencies from each other, and the frequencies of the first signal light and the second signal light are set a little different from the frequencies of the first pump light and the second pump light, respectively. The first phase conjugate light and the second phase conjugate light appear at symmetrical positions on the frequency axis with the first signal light and the second signal light with respect to the first pump light and the second pump light, respectively. It is to be noted that, where the first signal light and the second signal light have frequencies which are a little different from each other to such a degree that they do not cause radio interference, first pump light and second pump light having such a single frequency (band) that the first signal light and the second signal light may fall within a gain band may be employed.

The phase conjugate light generation apparatus 65' generates first phase conjugate light in accordance with first signal light supplied to the signal light input port 3 and first pump light, and the first phase conjugate light is transmitted from the phase conjugate light output port 6A to the optical receiver 75 by way of the ascending optical transmission line 77. Further, the phase conjugate light generation apparatus 65' generates second phase conjugate light in accordance with second signal light supplied from the optical transmitter 74 to the signal light output port 5 and second pump light, and the second phase conjugate light is transmitted from the phase conjugate light output port 6B to the optical receiver 72 by way of the descending light transmission line 78. It is to be noted that the phase conjugate light generation apparatus 65' can be constructed in accordance with the third embodiment of FIG. 7. While, in the third embodiment of FIG. 7, the signal light output port 5 is provided to send out output signal light, the signal light output port 5 in the seventh embodiment of FIG. 11 is used as an input port for the descending direction. Further, similarly to the fact that frequency division multiplex can be applied to the fifth embodiment of FIGS. 9A to 9C, frequency division multiplex can be applied also to the seventh embodiment of FIG. 11.

Figure 13:
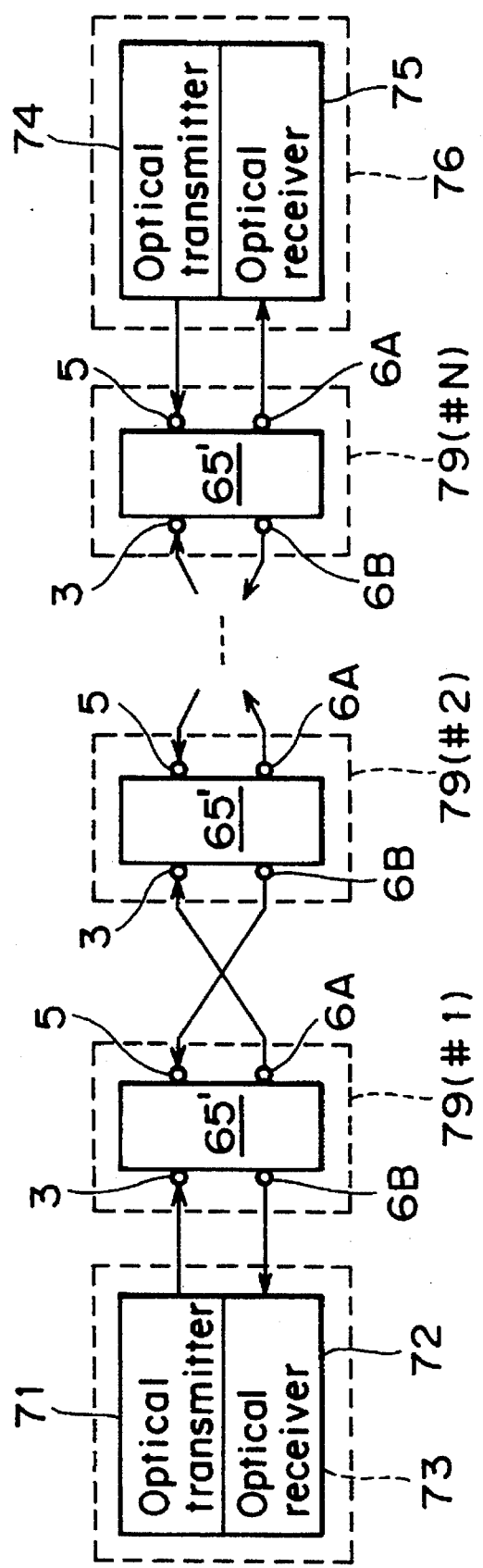
FIG. 13 is a block diagram of a bi-directional repeater optical transmission system showing an eighth embodiment of the present invention.

FIG. 13 is a block diagram of a bi-directional repeater optical transmission system showing the eighth embodiment of the present invention. The present embodiment is characterized in that, in contrast with the seventh embodiment of FIG. 11, N (N is a natural number greater than 1) repeating stations 79 (#1 to #N) are provided between the sending/receiving stations 73 and 76. Each of the repeating stations (#1 to #N) individually has the phase conjugate light generation apparatus 65' of FIG. 11. The signal light input port and the phase conjugate light output port 6B of the first repeating station 79 (#1) as counted from the side of the sending/receiving station 73 are connected to the optical transmitter 71 and the optical receiver 72, respectively. Meanwhile, the signal light input port 3 and the phase conjugate light output port 6B of the phase conjugate light generation apparatus 65' of the nth (n is a natural number greater than 1 but smaller than (N+1)) repeating station of the repeating stations 79 (#1 to #N) as counted from the side of the sending/receiving station 73 are connected to the phase conjugate light output port 6A and the signal light output port 5 of the phase conjugate light generation apparatus 65' of the (n−1)th repeating station, respectively. Further, the signal light output port 5 and the phase conjugate light output port 6A of the phase conjugate light generation apparatus 65' of the first repeating station 79 (#N) as counted from the side of the sending/receiving station 76 are connected to the optical transmitter 74 and the optical receiver 75, respectively. In the present embodiment, in order to make the frequencies of the first pump light in the different phase conjugate light generation apparatuses 65' equal to one another and make the frequencies of the second pump light in the different phase conjugate light generation apparatuses 65' equal to one another, the frequency arrangement relationship of the signal light and the phase conjugate light should be reversed alternately. For example, where the frequency arrangement in the phase conjugate light generation apparatus 65' of the repeating station 79 (#1) is set as shown in FIG. 2, the frequency arrangement in the phase conjugate light generation apparatus 65' of the repeating station 79 (#2) should be set to $\omega_S=\omega_P-\Omega$ and $\omega_f=\omega_P+\Omega$.

Figure 14:
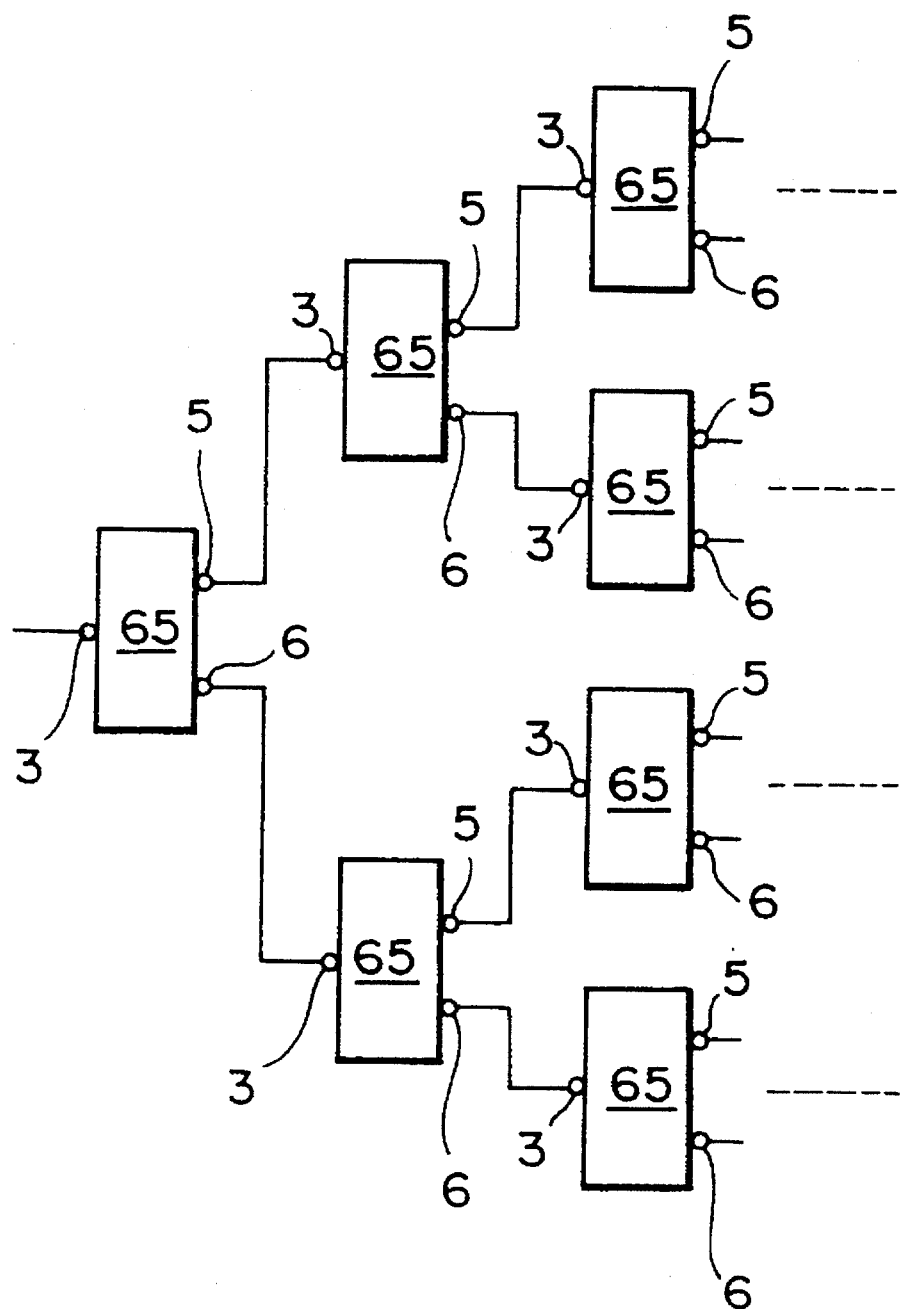
FIG. 14 is a block diagram of an optical distribution system showing a ninth embodiment of the present invention.

FIG. 14 is a block diagram of an optical distribution system showing the ninth embodiment of the present invention. The present system includes a plurality of phase conjugate light generation apparatuses 65, and a higher order one of each pair of adjacent ones of the plurality of phase conjugate light generation apparatuses 65 is connected at the signal light output port 5 and the phase conjugate light output port 6 thereof to the signal light input port 3 of the other lower order one of the pair of adjacent phase conjugate light generation apparatuses 65. In the present embodiment, the deterioration of the S/N ratio each time a phase conjugate light generation apparatus 65 is passed is only 3 dB (addition of quantum noise). On the other hand, in a conventional optical distribution system, since a single optical distribution section has at least a 1:1 ratio between an optical coupler and an optical amplifier, in order to suppress the loss by distribution to 0 dB, deterioration of the S/N ratio of at least 6 dB is provided by one optical distribution section. Accordingly, with the present embodiment, optical distribution which involves very low noise and does not cause any loss by distribution at all is possible. It is to be noted that, while the gains for signal light and phase conjugate light outputted from the ports 5 and 6 of the phase conjugate light generation apparatus 65, respectively, are different from each other as given by the equations (7) and (8), the difference between the gains can be ignored by causing the phase conjugate light generation apparatus 75 to operate under the conditions of $G \gg 1$ and $\omega_f/\omega_S \simeq 1$.

Figure 15:
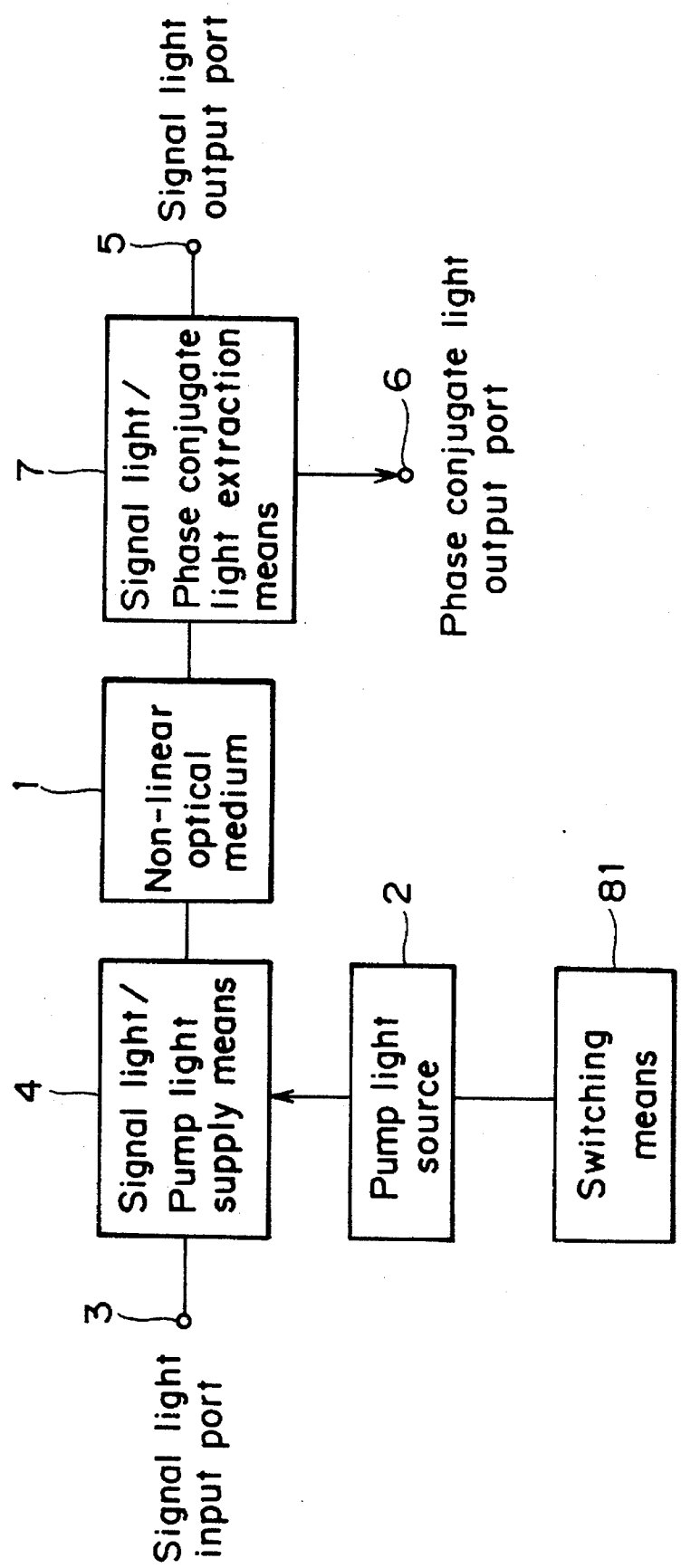
FIG. 15 is a block diagram of an optical switching system showing a tenth embodiment of the present invention.

FIG. 15 is a block diagram of an optical switching system showing the tenth embodiment of the present invention. The present embodiment is characterized in that, in contrast with the basic construction of FIG. 3, it further includes switching means 81 for switching the pump light source 2 on and off. In an on-state of the pump light source 2, the intensity of the pump light is controlled so that phase conjugate light may be generated from the non-linear optical medium 1, but in an off-state of the pump light source 2, the intensity of the pump light is controlled so that no phase conjugate light may be generated from the non-linear optical medium 1. With the present embodiment, a condition wherein phase conjugate light is generated and another condition wherein no phase conjugate light is generated can alternatively be established by operation of the switching means 81.

Figure 16:
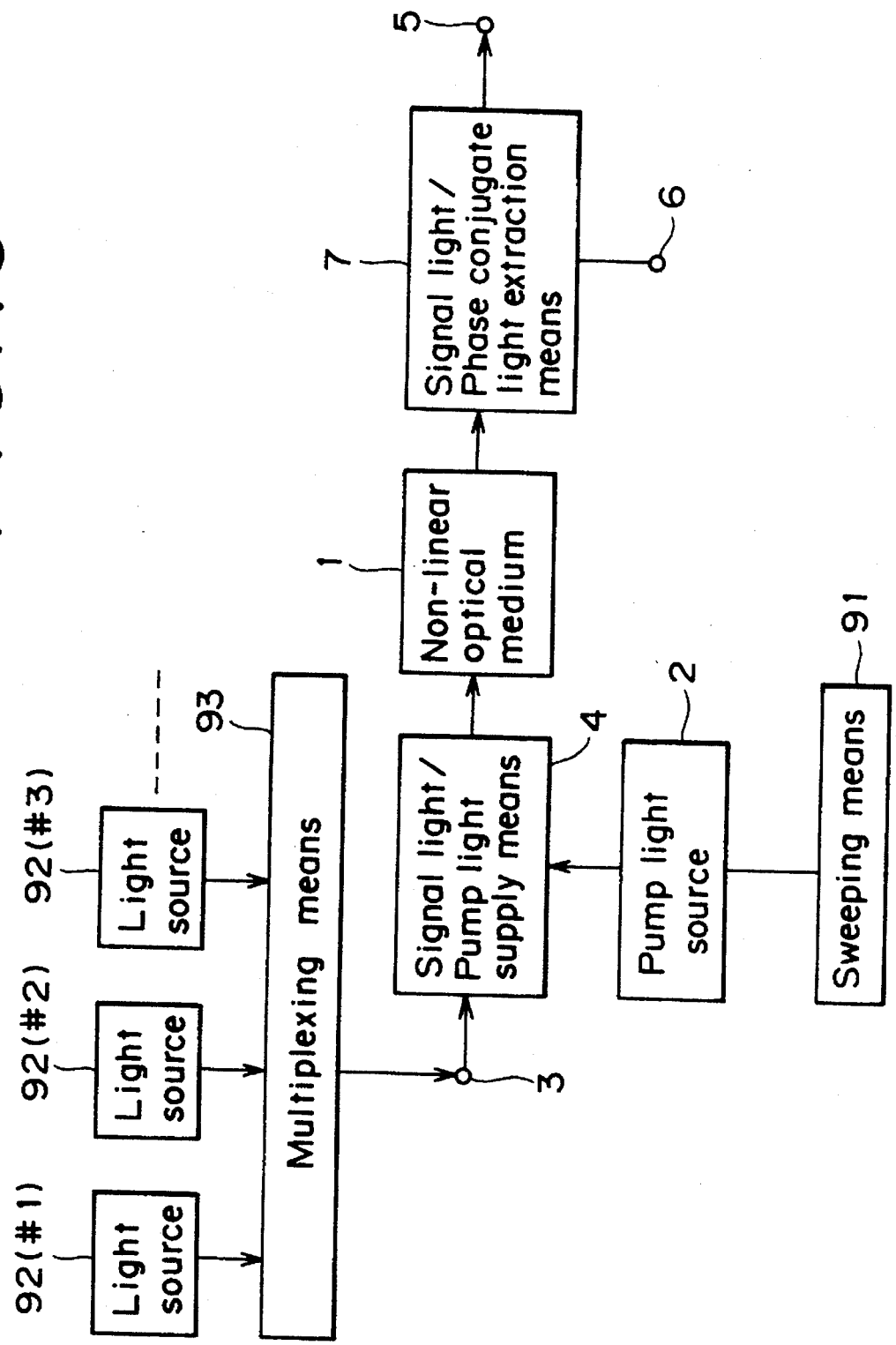
FIG. 16 is a block diagram of an optical selection system showing an eleventh embodiment of the present invention.

FIG. 16 is a block diagram of an optical selection system showing the eleventh embodiment of the present invention. The present embodiment is characterized in that, in contrast with the basic construction of FIG. 3, it further includes sweeping means 91 for sweeping the frequency of the pump light outputted from the pump light source 2 and a plurality of kinds of frequency division multiplexed signal light are supplied to the signal light input port 3. In order to supply a plurality of kinds of frequency division multiplexed signal light, in the present embodiment, a plurality of light sources 92 (#1, #2, ...) which output different kinds of signal light having different frequencies from one another are employed, and the different kinds of signal light from the light sources 92 (#1, #2, ...) are multiplexed by multiplexing means 93 such as a multiplexer and supplied to the signal light input port 3. In the present embodiment, if the frequency of the pump light is varied by the sweeping means 91, also the gain band in which phase conjugate light is generated is swept on the frequency axis in accordance with such a variation. Accordingly, since one of the plurality of kinds of signal light which is within the gain band can be alternatively selected to generate phase conjugate light corresponding to the signal light, channel selection in a frequency division multiplex system can be achieved readily.

Figure 17:
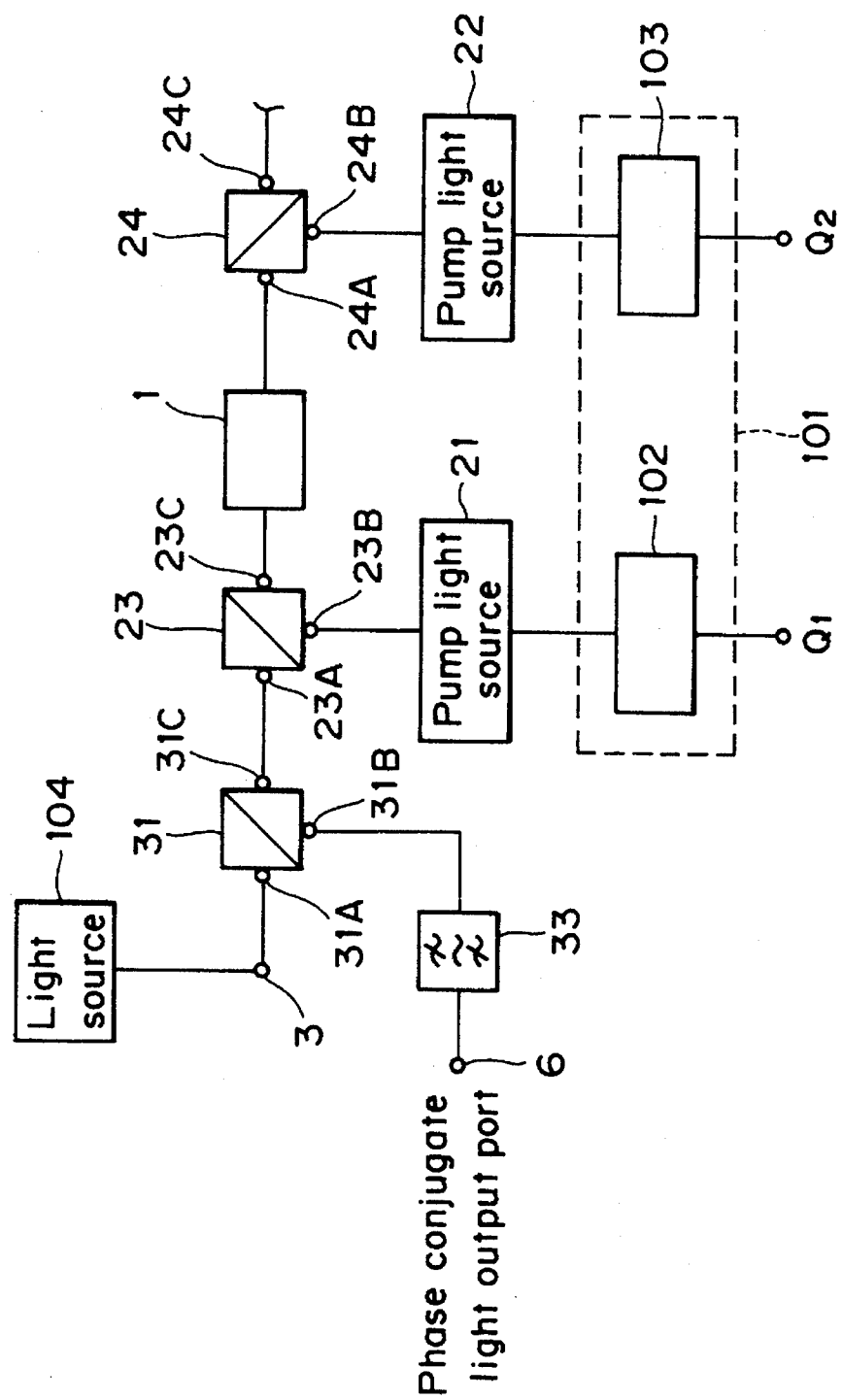
FIG. 17 is a block diagram of an optical AND circuit system showing a twelfth embodiment of the present invention.

FIG. 17 is an optical AND circuit system showing the twelfth embodiment of the present invention. In the present embodiment, the pump light sources 21 and 22, the optical couplers 23 and 24, the optical divider 31 and the optical filter 33 in the second embodiment of FIG. 6 are used, and further, pump light control means 101 is provided. The pump light control means 101 includes a drive circuit 102 for varying the intensity of the pump light supplied from the pump light source 21 to the port 23B of the optical coupler 23 in accordance with the high and low levels of input logic data $Q_1$, and another drive circuit 103 for varying the intensity of the pump light supplied from the pump light source 22 to the port 24B of the optical coupler 24 in accordance with the high and low levels of input logic data $Q_2$. Signal light from a light source 104 which is, for example, in a non-modulated condition is supplied to the signal light input port 3. And, the intensities of the signal light and the pump light are adjusted so that, only when both of the input logic data $Q_1$ and $Q_2$ exhibit a high level, phase conjugate light is outputted from the phase conjugate light output port 6. The relationship between the input logic data $Q_1$ and $Q_2$ and the logic level $X_1$ of the phase conjugate light from them is illustrated in the following table.

TABLE

| $Q_1$ | $Q_2$ | $X_1$ |
|---|---|---|
| 1 | 1 | 1 |
| 1 | 0 | 0 |
| 0 | 1 | 0 |
| 0 | 0 | 0 |

As is apparent from the table, it can be seen that, with the present embodiment, the intensity level of the phase conjugate light from two input logic data is obtained as an output of an AND circuit. It is to be noted that the two logic data may be in the form of electric signals or optical signals. Further, in the present embodiment, since the response time of the non-linear optical effect itself of the non-linear optical medium 1 is on the order of picoseconds, realization of very high speed calculation is allowed.

By the way, if light used for optical measurement or optical communications which makes positive use of the wave property of light is regarded as a vibrating electric field, then the amplitude or the phase of the vibrating electric field is fluctuated by various causes. Above all, fluctuation of the field in the quantum theory cannot be avoided. Accordingly, such fluctuation will ultimately rule the accuracy in optical measurement or the reception sensitivity in optical communications. The fluctuation of a certain quantity of a field is ruled in the indeterminacy relationship between the quantity and another quantity which is in a particular relationship with the quantity. In other words, the product of the magnitudes of fluctuation of the two quantities is not smaller than a predetermined value. However, there remains the possibility that, if it is allowed that the fluctuation of one of the quantities increases, then the fluctuation of the other quantity can be decreased. Based on such an idea, it has been attempted to produce a field which involves a reduced amount of fluctuation. The condition of a field produced in this manner is called a squeezed condition, and light which is in the condition is called squeezed light.

A squeezed condition can be produced using the phase conjugate light generation apparatus of the present invention. In particular, when the intensity of pump light is high, it is possible to handle output signal light and phase conjugate light by quantum theoretical handling and it is possible to produce a squeezed condition using the fact that output signal light and phase conjugate light have a mutually parametric quantum correlation, and the measurement accuracy in optical measurement or the sensitivity in optical communications can be enhanced.

As described so far, according to the first application form of the present invention, an effect that it is possible to provide a phase conjugate light generation apparatus having a novel construction applicable to various optical systems is provided. Further, another effect that various useful optical systems which include the phase conjugate light generation apparatus can be provided is provided.

Subsequently, a second application field of the present invention will be described. The following embodiments of the present invention relate to an optical communications system which employs phase conjugate light.

It is an object of the present invention in the second application field to use phase conjugate light generation means having multiple functions and apply the same to an optical communications system.

Particularly, it is an object of the following embodiments of the present invention to provide an optical communications system which compensates for phase fluctuation in an optical transmission line.

According to the present invention, there is provided an optical communications system, which comprises an optical transmission line provided between a master station and a slave station, the master station having phase conjugate light generation means and first modulation means, the slave station having probe light generation means and first demodulation means, the probe light generation means supplying probe light to a first end of the optical transmission line, the phase conjugate light generation means generating phase conjugate light for the probe light outputted from a second end of the optical transmission line and supplying the phase conjugate light to the second end of the optical transmission line, the first modulation means modulating the phase conjugate light in accordance with first input data, the first demodulation means demodulating the first input data in accordance with the phase conjugate light outputted from the first end of the optical transmission line.

In the present system, phase conjugate light corresponding to probe light transmitted from the slave station by way of the optical transmission line is generated by the master station, and the phase conjugate light is modulated, for example, in accordance with a data signal and transmitted to the slave station by way of the optical transmission line. Accordingly, phase fluctuation in the optical transmission line is compensated for from the characteristic of time reversal of the phase conjugate light.

In the following, the embodiments in the second application field of the present invention will be described in detail with reference to the accompanying drawings.

Figure 18:
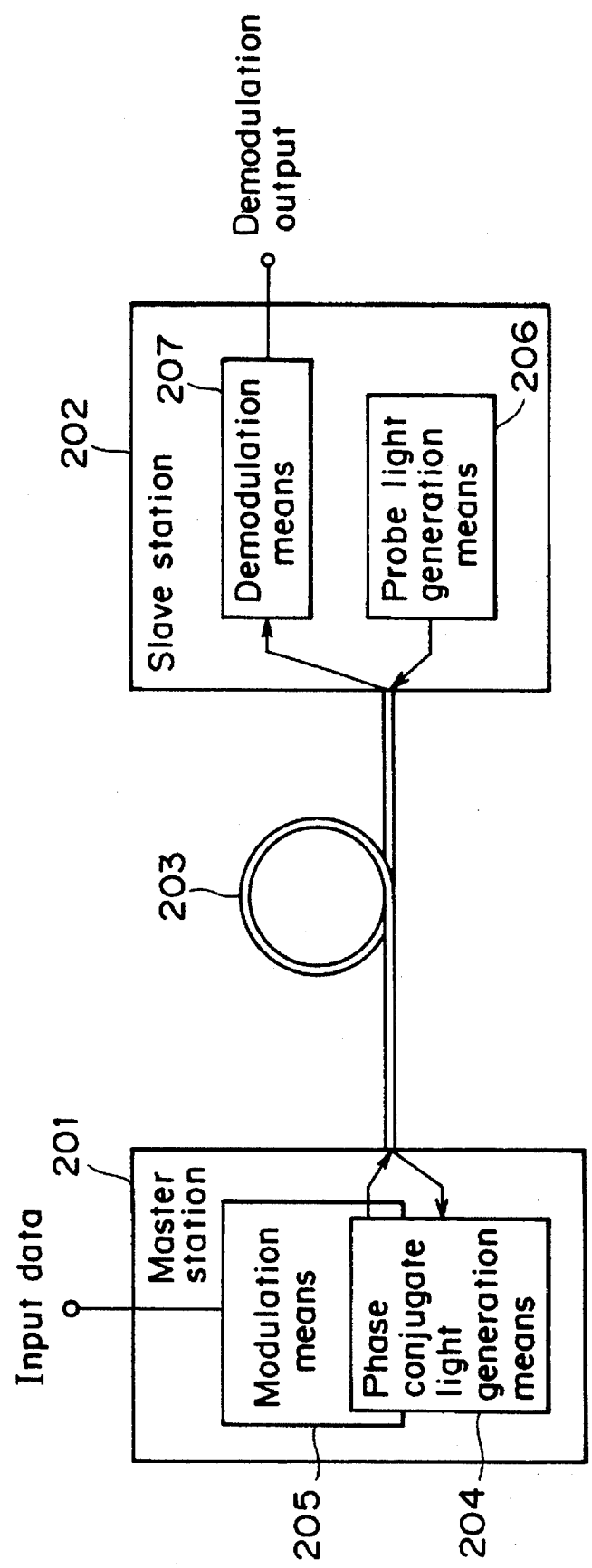
FIG. 18 is a block diagram showing a basic construction of an optical communications system of the present invention.

FIG. 18 is a block diagram showing a basic construction of an optical communications system of the present invention. The present system is constructed such that a master station 201 and a slave station 202 are interconnected by way of an optical transmission line 203. The master station 201 has phase conjugate light generation means 204 and (first) modulation means 205. The slave station 202 has probe light generation means 206 and (first) demodulation means 207. The probe light generation means 206 supplies probe light, which is in a modulated or non-modulated condition, to a first end of the optical transmission line 203. The phase conjugate light generation means 204 receives probe light outputted from a second end of the optical transmission line 203, generates phase conjugate light from the probe light and supplies the phase conjugate light to the second end of the optical transmission line 203. The modulation means 205 modulates the phase conjugate light in accordance with input data. The demodulation means 207 demodulates the input data in accordance with the phase conjugate light outputted from the first end of the optical transmission line 203. The modulation means 205 may be constructed otherwise such that it is operatively connected to the phase conjugate light generation means 204 to internally modulate the phase conjugate light or provided independently of the phase conjugate light generation means 204 and externally modulates the phase conjugate light supplied from the phase conjugate light generation means 204 to the second end of the optical transmission line 203.

Figure 19:
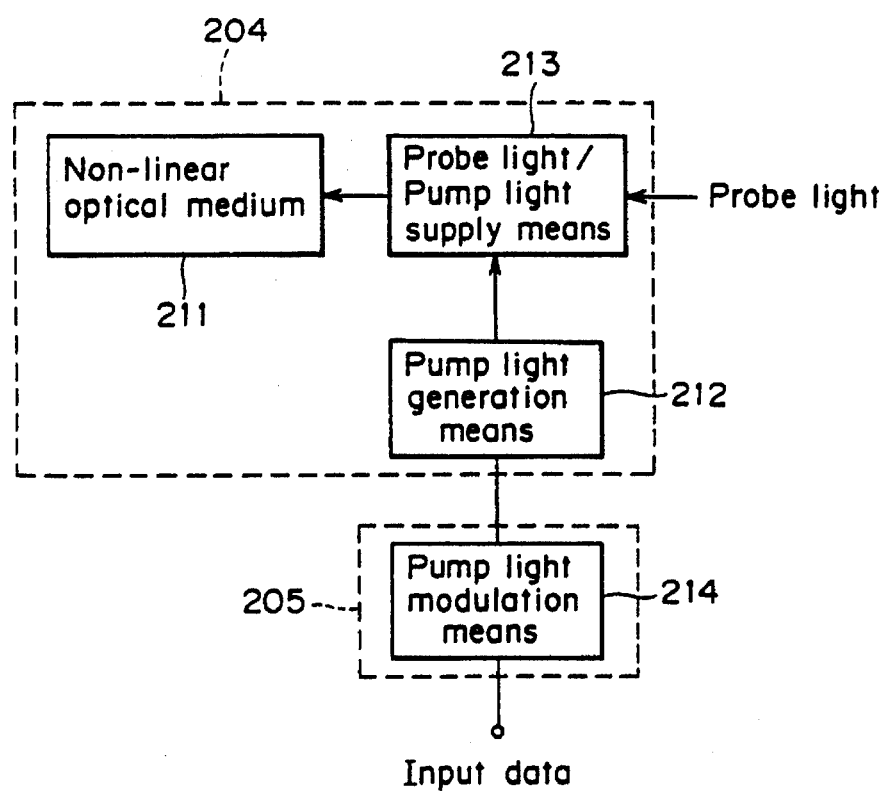
FIG. 19 is a block diagram showing a detailed construction of a master station in the present invention.

FIG. 19 is a block diagram showing a concrete construction example of the master station 201 of FIG. 18. The phase conjugate light generation means 204 includes non-linear optical medium 211, pump light generation means 212 for generating pump light, and probe light/pump light supply means 213. The probe light/pump light supply means 213 supplies pump light supplied thereto from the pump light generation means 212 to a non-linear optical medium 211 together with probe light supplied thereto from the slave station 202 of FIG. 18 by way of the optical transmission line 203. Phase conjugate light generated in the non-linear optical medium 211 is supplied in the opposite direction by way of a same route as the supplying route of the probe light or by way of another route different from the supplying route of the probe light to the optical transmission line 203 of FIG. 18.

Where the phase conjugate light generation means 204 constructed in such a manner as shown in FIG. 19 is employed, the modulation means 205 for modulating phase conjugate light can include pump light modulation means 214 for modulating pump light in accordance with input data. The pump light modulation means 214 either directly modulates a light source of the pump light generation means 212 or indirectly modulates pump light supplied from the pump light generation means 212 to the non-linear optical medium 211 by way of the probe light/pump light supply means 213. Where the non-linear optical medium 211 is used to generate phase conjugate light, preferably parametric optical amplification (optical parametric process) or four-light wave mixture is employed. While a parametric optical amplifier uses a secondary non-linear optical effect, four-light wave mixture uses a tertiary non-linear optical effect. Where four-light wave mixture is used to generate phase conjugate light, preferably first pump light and second pump light are used as pump light and the first pump light and the second pump light are supplied in the opposite directions to each other in a non-linear optical medium. Where such four-light wave mixture of the bi-directional pumping type is employed, phase conjugate light can be generated efficiently. It is a matter of course that a single pump light source may be used to cause four-light wave mixture.

Figure 20:
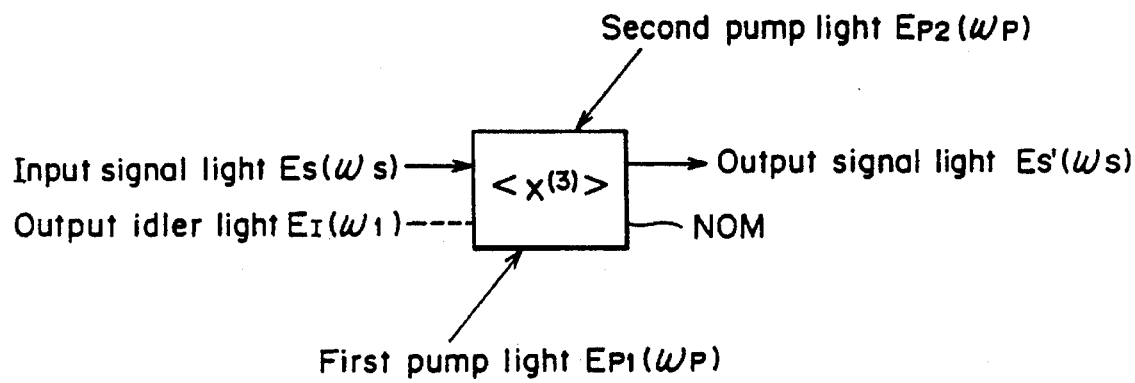
FIG. 20 is a view illustrating the principle of generation of phase conjugate light.

FIG. 20 is a view illustrating the principle of generating phase conjugate light when first pump light and second pump light of an equal frequency are supplied in the opposite directions to each other in a non-linear optical medium, which exhibits a tertiary non-linear optical effect, to cause four-light wave mixture. If input signal light (which corresponds to probe light) is supplied to a non-linear optical medium NOM, which exhibits a tertiary non-linear optical effect, in a condition wherein first pump light $E_{P1}$ and second pump light $E_{P2}$ are introduced in the opposite directions to each other into the non-linear optical medium NOM, then output signal light $E_S'$ of a frequency $\omega_S$ and a wave number $k_S$ and output idler light $E_I'$ of another frequency $\omega_I$ and another wave number $k_I$ are generated from input signal light $E_S$ of the frequency $\omega_S$ and the wave number $k_S$ by a tertiary non-linear optical process (in particular, diffraction of one of the first pump light and the second pump light by a spatial diffraction grating formed by the other one of the first pump light and the second pump light and the input signal light). It will be hereinafter described that the output idler light $E_I'$ corresponds to phase conjugate light of the input signal light $E_S$. Particularly, where the first pump light and the second pump light supplied in the opposite directions to each other have an equal frequency ($\omega_P$), since $k_I = -k_S$ in terms of the wave number, the idler light is outputted in the opposite direction to the incidence direction of the input signal light. Consequently, a phase conjugate light generation apparatus (phase conjugate mirror) is realized. In this instance, the following relationship is satisfied from the law of energy conservation:

$$\omega_S + \omega_I = 2\omega_P \quad (13)$$

Figure 21:
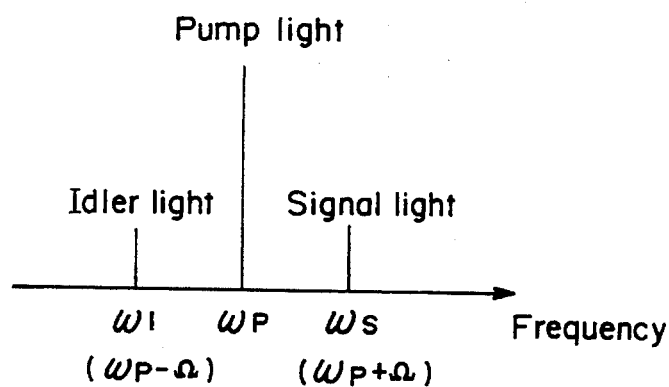
FIG. 21 is a view illustrating the arrangement of frequencies of signal light, pump light and idler light (phase conjugate light)

FIG. 21 is a view for explaining the arrangement of frequencies of signal light, pump light and idler light in four-light wave mixture. $\Omega$ represents a detuning frequency between the signal light and the pump light. It can be seen that, on the frequency axis, the signal light and the idler light are positioned at symmetrical positions with respect to the pump light.

If the interaction length of the non-linear optical effect in the principle of FIG. 20 is represented by L, then the generation equation is given as follows:

$$\frac{E_S'}{(\omega_S)^{1/2}} = \cosh(|g|L)\frac{E_S}{(\omega_S)^{1/2}} - i\frac{g}{|g|}\sinh(|g|L)\frac{E_I^*}{(\omega_I)^{1/2}} \quad (14)$$

$$\frac{E_I'^*}{(\omega_I)^{1/2}} = \cosh(|g|L)\frac{E_I^*}{(\omega_I)^{1/2}} + i\frac{g^*}{|g|}\sinh(|g|L)\frac{E_S}{(\omega_S)^{1/2}} \quad (15)$$

Here, g represents an engagement constant, and particularly in four-light wave mixture, $$g = \kappa E_{P1} E_{P2} \quad (16)$$

$$\kappa = 3\frac{\omega_0}{2nc}\langle\chi^{(3)}\rangle \quad (17)$$

n and $\chi^{(3)}$ represent the refraction index and the tertiary non-linear optical constant of the non-linear medium NOM, respectively. Meanwhile, $\langle\chi^{(3)}\rangle$ represents an average of the non-linear optical constant $\chi^{(3)}$ in all polarization conditions.

It can be recognized that, from the equations (14) and (15), the gains $G_S$ and $G_I$ for the signal light and the idler light are given by $$G_S = G = \cosh^2(|g|L) \quad (18)$$

$$G_I = (G-1)\frac{\omega_I}{\omega_S} = \sinh^2(|g|L)\frac{\omega_I}{\omega_S} \quad (19)$$

Normally, since $\omega_I/\omega_S \simeq 1$, it can be recognized that amplification of a signal is realized in generation of phase conjugate light by a non-linear optical effect. Further, since the gains in this instance rely upon the intensity of the pump light, intensity modulation can be performed for the idler light. The output idler light $E_I'$ generated in accordance with the principle of FIG. 20 is phase conjugate light with the input signal light $E_S$. This is apparent from the consideration of the equations (14) and (15) for the case wherein no input idler light is inputted ($E_I = 0$) ($E_I'$ corresponds to a complex conjugate with $E_S$).

Subsequently, the characteristic of time reversal, which is a significant feature of the phase conjugate light, will be described. Now, it is assumed that input signal light (corresponding to input signal light which is not in a modulated condition), which advances in the direction of +z, is represented as a plane wave by the following equation:

$$E_S(r,t) = (1/2)A_S(r)exp[i(\omega_S t - k_S z)] + c.c \quad (20)$$

Here, $A_S(r)$ represents a complex amplitude of an electric field, r represents a spatial coordinate vector, $\omega_S$ represents a frequency of the probe light, t represents time, and $k_S$ represents a wave number vector, and c.c. signifies that a complex conjugate with a term just prior to the same is provided there. It is to be noted that the magnitude $k_S$ of the wave number vector is given, where the refractive index of the optical path is represented by n and the velocity of light in the vacuum is represented by c, by $k_S = \omega_S n/c$. In this instance, phase conjugate light of the light represented by the equation (20) is represented by the following equation (21):

$$E_C(r,t) = (1/2)A_S^*(r)exp[i(\omega_S t + k_S z)] + c.c. \quad (21)$$

The equation (21) represents reflection type phase conjugate light which is a progressive wave in the direction of −z. As is apparent from the equation (21), the equation $$E_C(r, t) = E_S(r, -t) \quad (22)$$

stands with reflection type phase conjugate light, and it can be seen that the phase conjugate light has the characteristic of time reversal. By making use of the characteristic of time reversal, phase fluctuation such as steady phase deformation (influence of, for example, chromatic dispersion) or polarization variation, which occurs in an optical transmission line, can be compensated for.

Figure 22:
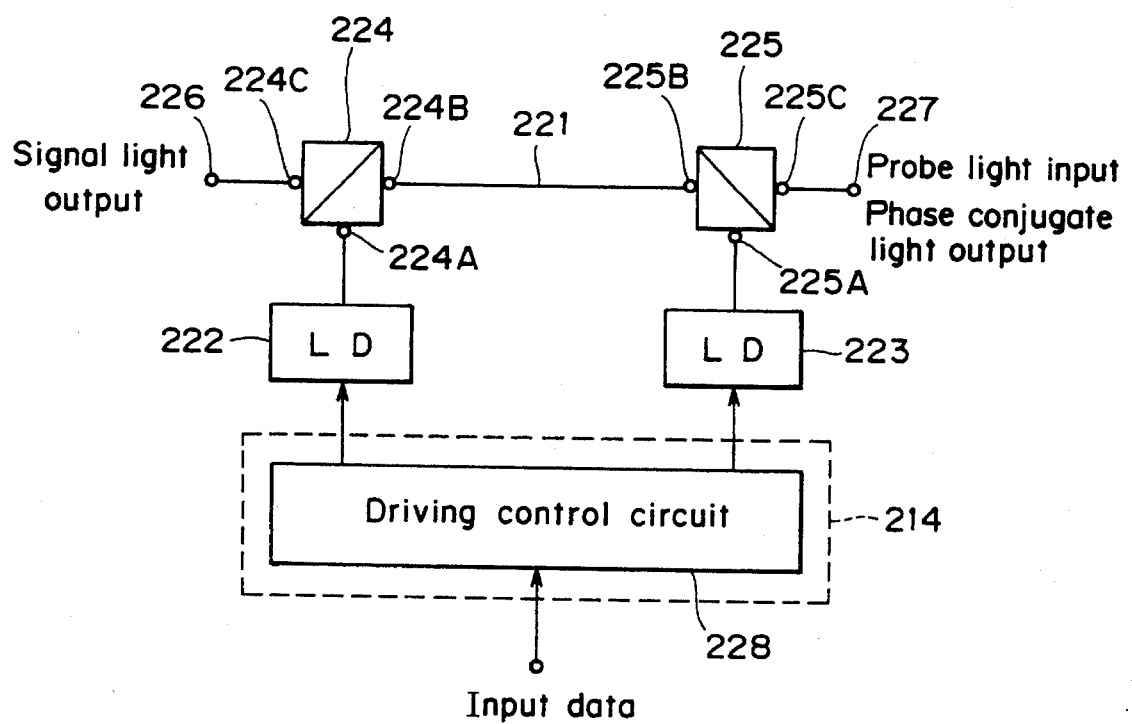
FIG. 22 is a block diagram showing an embodiment of the master station in the present invention.

FIG. 22 is a block diagram showing an embodiment of the phase conjugate light generation means 204 of FIGS. 18 and 19. In the present embodiment, an optical fiber 221 is used for the non-linear optical medium 211 of FIG. 19. The optical fiber 221 is preferably a single mode fiber of quartz. Further, two laser diodes 222 and 223 are employed corresponding to the pump light generation means 212 of FIG. 19. The laser diodes 222 and 223 output first pump light and second pump light, respectively, whose frequencies are equal to each other. For the non-linear optical medium 211, optical induction refraction index (photo-refractive) effect media such as $BaTiO_3$, various organic compounds, various semiconductors, and particularly semiconductor optical amplifiers of the progressive wave type and semiconductor optical amplifiers of the Fabry-Perot type can be used in addition to the optical fiber optical fiber 221. Further, also an optical waveguide structure formed from $LiNbO_3$ or a like substance can be adopted. Anyway, generation of phase conjugate light is possible by principally employing FWM of those media, and it is effective to use a non-linear optical medium whose production efficiency of phase conjugate light is high to decrease the optical path length of the phase conjugate light in order to facilitate phase matching to increase the width of the band. In order to introduce the first pump light and the second pump light from the laser diodes 222 and 223 in the opposite directions to each other into the optical fiber 221 as a non-linear optical medium, the probe light/pump light supply means 213 of FIG. 19 includes two optical couplers 224 and 225. The optical coupler 224 has ports 224A, 224B and 224C and at least functions such that it outputs light supplied to the port 224A from the port 224B and outputs light supplied to the port 224B from the port 224C. The port 224A of the optical coupler 224 is connected to the laser diode 222, and the port 224B is connected to the first end of the optical fiber 221 while the port 224C is connected to a port 226 for outputting signal light. The optical coupler 225 has ports 225A, 225B and 225C and at least functions such that it outputs light supplied to the port 225A from the port 225B and outputs light supplied to the port 225B from the port 225C and further outputs light supplied to the port 225C from the port 225B. The port 225A of the optical coupler 225 is connected to the laser diode 223 and the port 225B is connected to the second end of the optical fiber 221 while the port 225C is connected to a port 227 for inputting probe light and outputting phase conjugate light. For the optical couplers 224 and 225, for example, optical couplers of the fiber fusion type, half mirrors, optical couplers, polarization beam splitters or like elements are used.

In the present embodiment, the pump light modulation means 214 of FIG. 19 includes a drive control circuit 228 for the laser diodes 222 and 223. The drive control circuit 228 supplies drive currents to the laser diodes 222 and 223 so that phase conjugate light corresponding to input probe light may be generated from the first pump light and second pump light supplied to the optical fiber 221, and varies the drive currents to be supplied to the laser diode 222 and/or diode 223 in accordance with input data. Where intensity modulation or amplitude modulation is performed for the phase conjugate light, the drive control circuit 228 controls the drive currents to be supplied to the laser diodes 222 and 223 so that the intensity or the amplitude of at least one of the first pump light and the second pump light may be modified in accordance with input data. On the other hand, where frequency modulation is performed for the phase conjugate light, the drive control circuit 228 controls the drive currents to be supplied to the laser diodes 222 and 223 so that the frequencies of the first pump light and the second pump light may be modified in accordance with input data. When the first pump light and the second pump light supplied from the laser diodes 222 and 223 to the optical fiber 221 are modulated by frequency modulation, the phase conjugate light is modulated by frequency modulation from the relationship that the difference between the frequency of the signal light and the frequency of the pump light is equal to the difference between the frequency of the pump light and the frequency of the phase conjugate light (refer to FIG. 21).

With the present embodiments, since first pump light and second pump light from the laser diodes 222 and 223 are supplied in the opposite directions to each other into the optical fiber 221 as a non-linear optical medium, four-light wave mixture of the bi-directional pumping type can be caused to efficiently generate phase conjugate light corresponding to the input probe signal. Further, since the phase conjugate light can be extracted by way of a same route as the supplying route of the input probe light from the port 227, the system of FIG. 18 can be realized readily by connecting the port 227 to the optical transmission line 203 of FIG. 18. It is to be noted that the port 226 of FIG. 22 can be used for demodulation where probe light supplied to the port 227 is in a modulated condition as hereinafter described.

Figures 1, 23A:
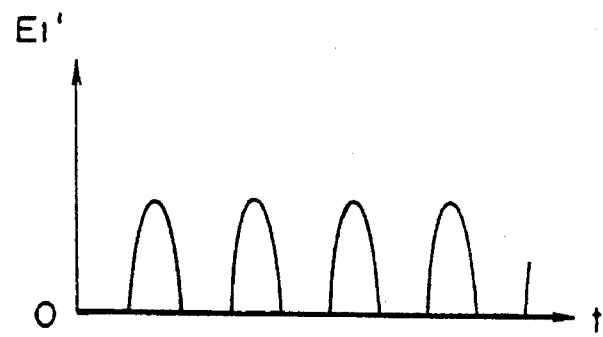
Figures 2, 23A:
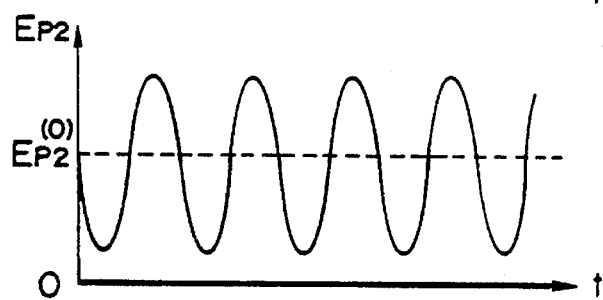
Figures 1, 23B:
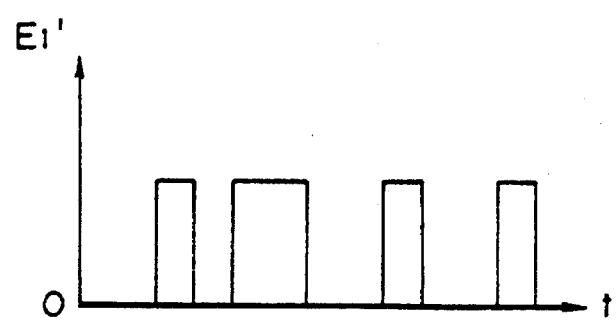
Figures 2, 23B:
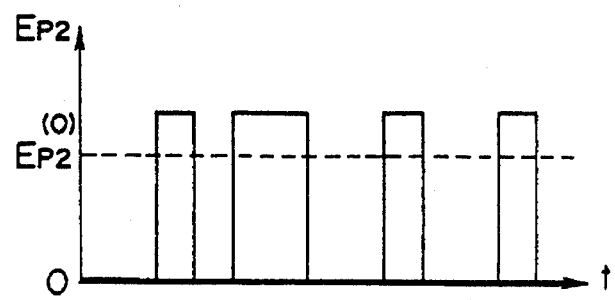

FIGS. 23A-1, 23A-2, 23B-1 and 23B-2 are views for explaining waveforms of phase conjugate light and second pump light when the drive current to be supplied to the laser diode 23 from the drive control circuit 228 of FIG. 22 in order to modulate phase conjugate light by intensity modulation is varied to modulate second pump light by intensity modulation. Referring to FIGS. 23A-1 and 23A-2, the lower stage (FIG. 23A-1) represents the waveform of second pump light $E_{P2}$ while the upper stage (FIG. 23A-2) represents the waveform of phase conjugate light $E_1'$. The second pump light $E_{P2}$ is in a modulated condition by intensity modulation with an analog signal (in the present example, a sine wave signal), and only when the second pump light $E_{P2}$ has a value higher value than the value $E_{P2}^{(0)}$ at which the signal gain G satisfies G=1, is phase conjugate light outputted. Accordingly, the waveform of the phase conjugate light $E_1'$ is equivalent to a waveform obtained by half-wave rectification of a sine wave signal. FIGS. 23B-1 and 23B-2 are waveform diagrams of the phase conjugate light and the second pump light shown similarly as in FIGS. 23A-1 and 23A-2 for the case wherein the second pump light is in a modulated condition by intensity modulation with a digital signal. Also in the present example, only when the second pump light $E_{P2}$ has a value higher than the threshold value $E_{P2}^{(0)}$, is phase conjugate light outputted. It is to be noted that the present invention can be put into practice otherwise where the intensity or the amplitude of the second pump light is varied always within a range higher than the threshold value $E_{P2}^{(0)}$.

Figure 24:
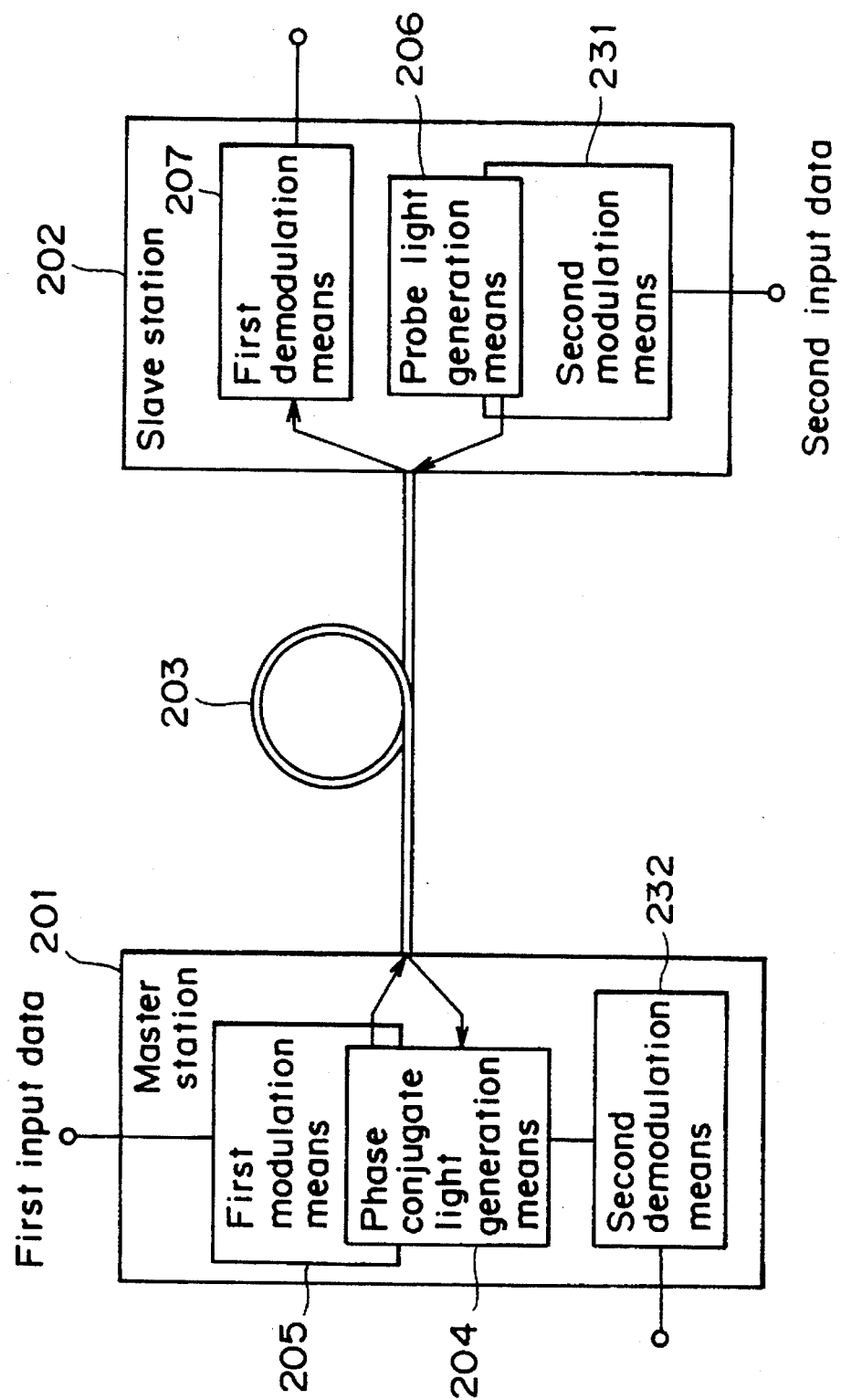
FIG. 24 is a block diagram showing another basic construction of an optical communications system of the present invention.

FIG. 24 is a block diagram showing another basic construction of an optical communication system of the present invention. The basic construction is characterized in that, in contrast with the basic construction of FIG. 18, the modulation means 205 of the master station 201 modifies phase conjugate light in accordance with first input data, the slave station 202 further has second modulation means 231 for modulating probe data in accordance with second input data, and that the master station 201 further has second demodulation means 32 for demodulating second input data in accordance with output light of the phase conjugate light generation means 204. With this construction, since transmission data can be carried on probe light in the direction from the slave station 202 to the master station 201, whereas transmission data can be carried on phase conjugate light in the direction from the master station 201 to the slave station 202, bi-directional transmission is allowed, and phase fluctuation in the optical transmission line in the direction from the master station 201 to the slave station 202 can be compensated for.

Where the second demodulation means 231 modulates the frequency or the phase of probe light, intensity modulation or amplitude modulation can be adopted as a modulation method of the modulation means 205 for phase conjugate light. By this, the first and second demodulation means 207 and 232 can readily demodulate first and second input data, respectively. Meanwhile, even where the second demodulation means 231 modulates the intensity or the amplitude of probe light at a comparatively low degree of modulation and the modulation means 205 modulates the intensity or the amplitude of phase conjugate light at a comparatively high degree of modulation, or in any of the reverse cases, demodulation can be achieved well. It is to be noted that the second demodulation means 232 of FIG. 24 is connected, for example, to the port 226 of FIG. 22 and demodulates second input data in accordance with signal light (which corresponds to amplified probe light) amplified in the optical fiber 221 of FIG. 22.

Figure 25:
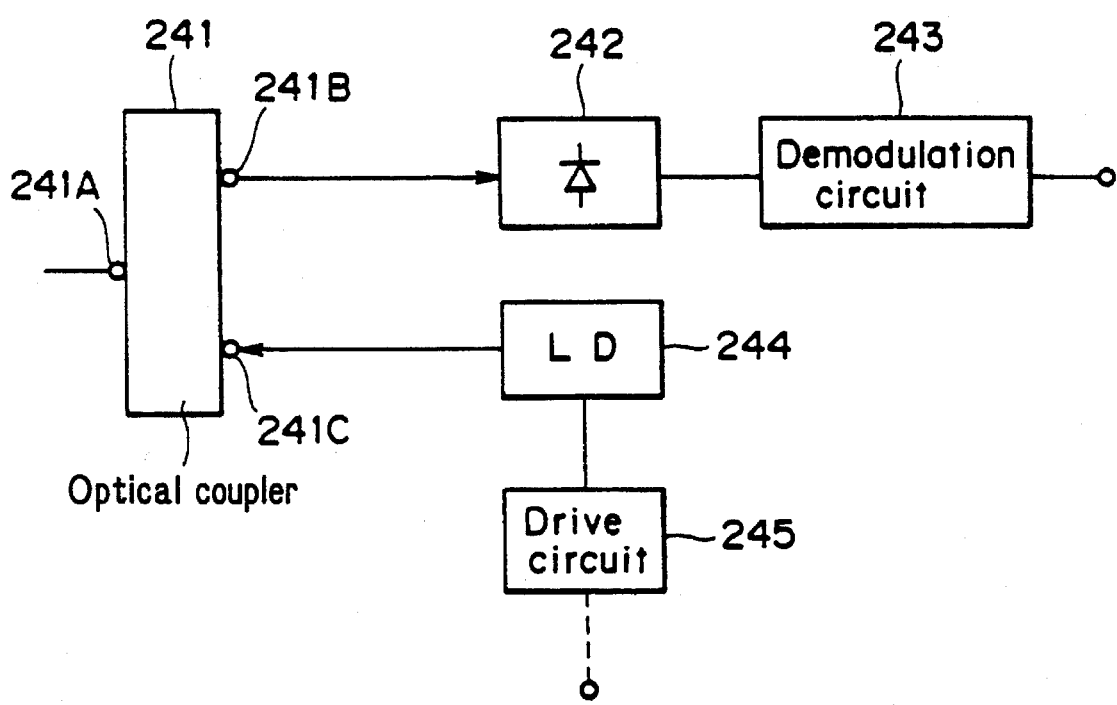
FIG. 25 is a block diagram showing a first embodiment of a slave station in the present invention.

FIG. 25 is a block diagram showing a first embodiment of the slave station which can be applied to the system of FIG. 18 or 24. In the present embodiment, where phase conjugate light is in an intensity modulated condition, transmission data are demodulated by direct detection. An optical coupler 241 has ports 241A, 241B and 241C and functions such that it outputs light supplied to the port 241A from the port 241B and outputs light supplied to the port 241C from the port 241A. For the optical coupler 241, for example, an optical circulator can be employed. The port 241A of the optical coupler 241 is connected to the optical transmission line 203 of FIG. 18 or 24, and the port 241B is connected to an optical receiver 242 such as a photodiode while the port 241C is connected to a laser diode 244 serving as a light source for probe light.

When phase conjugate light in an intensity modulated condition successively passes the port 241A and the port 241B of the optical coupler 241 in this order and is supplied to the optical receiver 242, the output electric signal of the optical receiver 242 varies in accordance with the intensity variation of phase conjugate light transmitted thereto. Accordingly, the transmission data can be reproduced by processing the output electric signal of the optical receiver 242 by means of a demodulation circuit 243 which is constructed in an ordinary manner using a discriminator or a like element. The laser diode 244 as a light source for probe light is driven by a drive circuit 245. Where the slave station of the present embodiment is applied to the system of FIG. 18, the drive circuit 245 steadily drives the laser diode 244 so that fixed probe light is outputted from the laser diode 244. The probe light successively passes the ports 241C and 241A of the optical coupler 241 in this order and is sent out to the optical transmission line 203 of FIG. 18. On the other hand, where the slave station of the present embodiment is applied to the system of FIG. 24, the drive circuit 245 drives the laser diode 244 so that modulated probe light may be outputted from the laser diode 244. Where amplitude modulation, phase modulation or frequency modulation is performed for coherent phase conjugate light, the slave station can reproduce transmission data by heterodyne detection using local light. In this instance, the phase conjugate light transmitted to the slave station can be introduced to the light receiving face of the optical receiver together with the local light to perform heterodyne detection.

Figure 26:
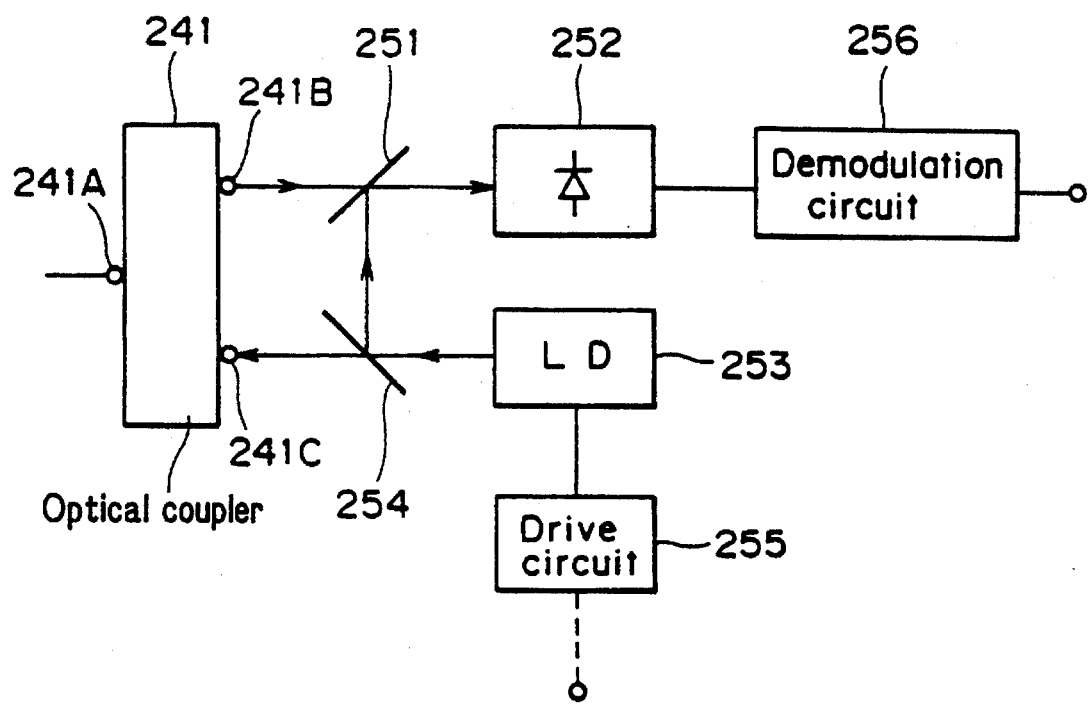
FIG. 26 is a block diagram showing a second embodiment of the slave station in the present invention.

FIG. 26 is a block diagram showing a second embodiment of a slave station which can be applied to the system of FIG. 18 or 24. The present embodiment is characterized in that, when the slave station tries to perform heterodyne detection, probe light from a single light source is split into two beams of light and one of the two beams of light is used as local light. Phase conjugate light transmitted by way of the optical transmission line 203 of FIG. 18 or 24 successively passes the ports 241A and 241B of the optical coupler 241 in this order and is then transmitted through a half mirror 251 and introduced into an optical receiver 252 such as a photodiode. Probe light outputted from a laser diode 253 is split into two beams of light by a half mirror 254, and one of the two split beams of probe light successively passes the ports 241C and 241A of the optical coupler 241 in this order and is sent out to the optical transmission line. The other split beam of probe light is reflected by the half mirror 254 and further reflected as local light by the half mirror 251 and is then introduced into the light receiving face of the optical receiver 252 along a same optical path as that of the phase conjugate light.

In this instance, since the local light source and the signal light source can be made common and the local light source can be disposed in the proximity of a receiver, reception of the local light at a high optical power level can be achieved, and accordingly, also assurance of a high receive sensitivity is easy. When the phase conjugate light and the local light are introduced into the light receiving face of the optical receiver 252 along the same optical path, an intermediate frequency signal having a frequency corresponding to the difference between the frequency of the phase conjugate light and the frequency of the local light is obtained as an output of the optical receiver 252. Accordingly, using a demodulation circuit 256 which is constructed in an ordinary manner based on the filter detection method or the synchronization detection method, transmission data can be demodulated in accordance with the intermediate frequency signal supplied from the optical receiver 252. It is to be noted that, in FIG. 26, reference numeral 255 denotes a drive circuit for the laser diode 253, and the drive circuit 255 corresponds to the drive circuit 245 of FIG. 25.

Figure 27:
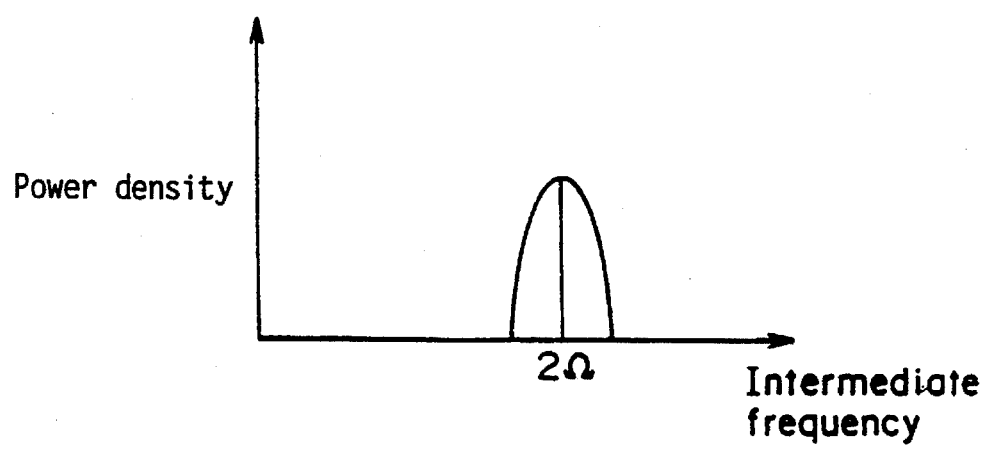
FIG. 27 is a view illustrating a spectrum of an intermediate frequency signal in the embodiment of FIG. 26.

FIG. 27 is a view illustrating a spectrum of the intermediate frequency signal outputted from the optical receiver 252 of FIG. 26. As described with reference to FIG. 21, where phase conjugate light is generated by four-light wave mixture using a non-linear optical medium, if the detuning frequency between the probe light and the pump light is represented by $\Omega$, also the detuning frequency between the pump light and the phase conjugate light is $\Omega$, and as a result, the difference between the frequency of the probe light and the frequency of the phase conjugate light is $2\Omega$. Accordingly, where split probe light is used as local light in the embodiment of FIG. 26, the center frequency of the intermediate frequency signal is $2\Omega$.

By the way, where heterodyne detection is performed as in the embodiment of FIG. 26, it is required to make the polarization planes of the phase conjugate light and the local light to be introduced into the optical receiver 252 coincide with each other in order to stabilize the output level of the intermediate frequency signal. Since the output light of the laser diode 253 has a polarization condition near to that of ordinary linear polarization, the local light supplied from the laser diode 253 to the optical receiver 252 by way of the half mirrors 254 and 251 can be regarded as linearly polarized light having a fixed polarization plane. Meanwhile, a single mode fiber which is used frequently as an optical transmission line has, as propagation modes thereof, two polarization modes whose polarization planes are perpendicular to each other, and the two polarization modes are coupled by an influence of various disturbances. As a result, the polarization condition of light supplied to the first end of the single mode fiber does not coincide with the polarization condition of light outputted from the second end of the fiber. Accordingly, where a single mode fiber is used as an optical transmission line connected to the port 241A of the optical coupler 241, the polarization condition of phase conjugate light supplied from the port 241B of the optical coupler 241 to the optical receiver 252 by way of the half mirror 251 is varied by a variation of the environment or some other cause as time passes. Where such variation of the polarization condition is involved, the level of the intermediate frequency signal outputted from the optical receiver 252 is varied, and in the worst case, the phase conjugate light and the local light do not interfere with each other, resulting in a condition wherein reception is disabled.

In order to cope with such a problem, in a conventional coherent optical communications system, polarization control is performed for signal light (which corresponds to the phase conjugate light in the embodiment of FIG. 26) and/or local light to be supplied to an optical receiver so that the polarization conditions of the signal light and the local light may coincide with each other. While the problem described above can be solved also by use of a polarization holding fiber as an optical transmission line or by application of a polarization diversity method in place of polarization control, any of such solutions has a drawback in that the construction of the system is complicated.

Figure 28:
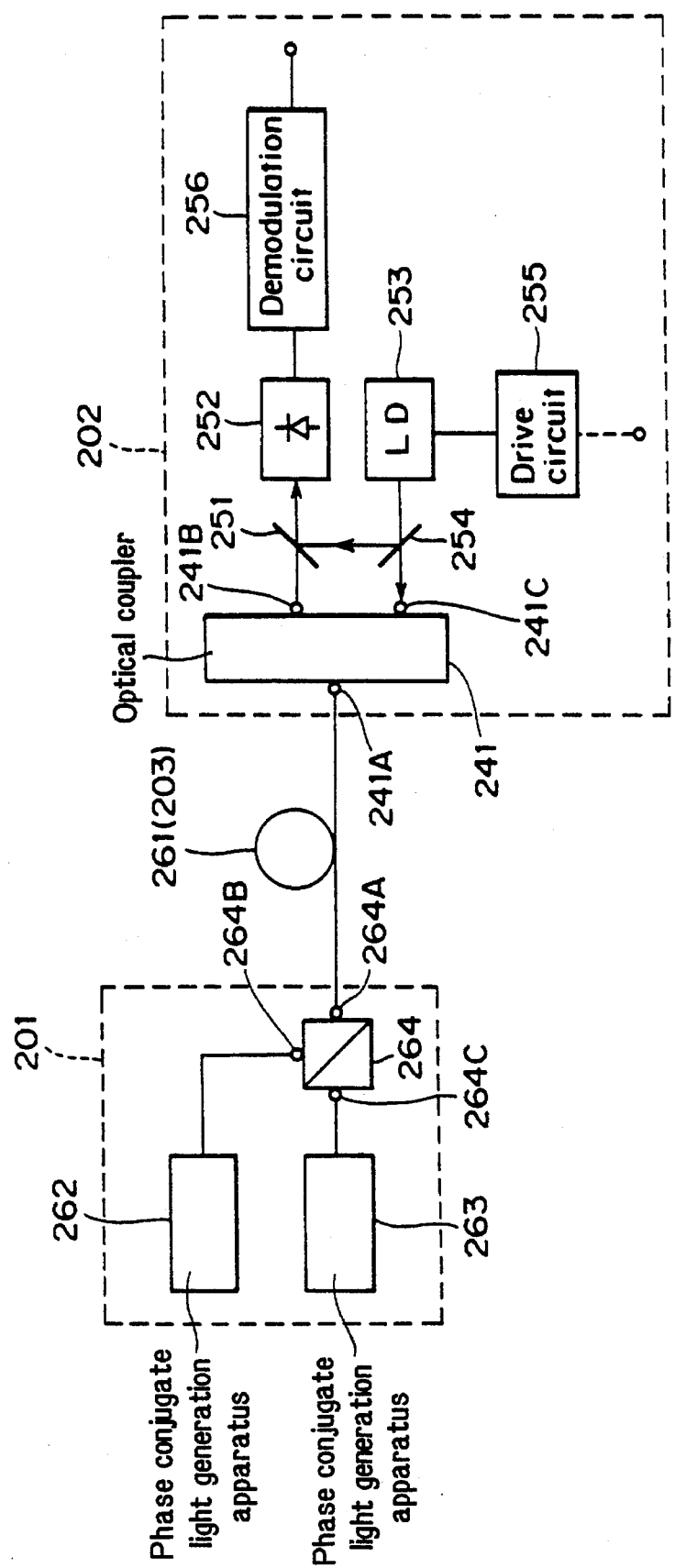
FIG. 28 is a block diagram of an optical communications system showing an embodiment which eliminates the necessity of polarization control.

FIG. 28 is a block diagram of an optical communications system of an embodiment wherein a high level of an intermediate frequency signal can be maintained without using polarization control or some other countermeasure. For the slave station 202, for example, the slave station shown in FIG. 26 is used. The optical transmission line 203 interconnecting the master station 201 and the slave station 202 is, in the present embodiment, a single mode fiber 261. The master station 201 has two phase conjugate light generation apparatuses 262 and 263 and a polarization beam splitter 264. The phase conjugate light generation apparatus 262 and 263 generate beams of phase conjugate light in the form of linearly polarized light having a same polarization plane as probe light in the form of linearly polarized light supplied thereto and sends out the beams of phase conjugate light in the opposite direction to that of the probe light supplying route. The polarization beam splitter 264 has ports 264A, 264B and 264C and functions such that it splits light supplied to the port 264A into two orthogonally polarized light components and outputs the orthogonally polarized light components from the ports 264B and 264C. It further outputs two orthogonally polarized light components supplied from the ports 264B and 264C from the port 264A. The port 264A of the polarization beam splitter 264 is connected to the single mode fiber 261, and the ports 264B and 264C are connected to the phase conjugate light generation apparatuses 262 and 263, respectively, by way of transmission lines such as fixed polarization fibers having a polarization condition keeping function.

Probe light sent from the slave station 202 to the master station 201 by way of the single mode fiber 261 is polarized and split by the polarization beam splitter 264 into two polarized light components which have polarization planes perpendicular to each other. The two polarized light components of the probe light are supplied to the phase conjugate light generation apparatuses 262 and 263 while keeping the polarization conditions, and phase conjugate light having corresponding polarization planes are generated in the phase conjugate light generation apparatuses 262 and 263. The phase conjugate light outputted from the phase conjugate light generation apparatuses 262 and 263 is composed by the polarization beam splitter 264 and transmitted to the slave station 202 by way of the single mode fiber 261. Since the two polarized light components of the phase conjugate light sent out from the phase conjugate light generation apparatuses 262 and 263 are transmitted to the slave station 202 going up accurately along the variation of the polarization condition of the probe light, when the period of the variation of the polarization condition in the single mode fiber 261 is sufficiently great in comparison with a time required for a reciprocating stroke of light between the master station 201 and the slave station 202, the polarization condition of the phase conjugate light at the output end of the single mode fiber 261 returns to the condition of the probe light when the probe light is supplied to the single mode fiber 261, and accordingly, heterodyne detection always in an optical polarization condition is allowed. With the present embodiment, since polarization control or application of a polarization diversity method is unnecessary in this manner, it is possible to provide a simple system of a higher performance. It is to be noted that preferably the difference between the optical path length between the phase conjugate light generation apparatus 262 and the polarization beam splitter 264 and the optical path length between the phase conjugate light generation apparatus 263 and the polarization beam splitter 264 is set shorter than the coherent length of the light source.

The master station 201 may be constructed such that it has a single phase conjugate light generation apparatus 262. In this instance, the phase conjugate light generation apparatus 263 and the polarization beam splitter 264 from among the components of the master station 201 of FIG. 28 are omitted, and the phase conjugate light generation apparatus 262 is connected to the single mode fiber 261 by way of an active polarization controller. And, light in an arbitrary polarization condition inputted from the single mode fiber 261 to the master station 201 is converted into light in a same condition as in a polarization condition (normally a linearly polarized condition) of phase conjugate light to be generated by the phase conjugate light generation apparatus 262 and is inputted in this condition to the phase conjugate light generation apparatus 262. Consequently, the phase conjugate light generated is converted by the active polarization controller back into light in a polarization condition when it is outputted from the single mode fiber 261. Accordingly, when the phase conjugate light propagates in the opposite direction in the single mode fiber 261 and returns to the slave station 202, it has a polarization condition equal to the initial polarization condition.

Where the probe light supplied from the probe light generation means 206 to the optical transmission line 203 in the system of FIG. 18 or 24 is a plurality of probe light components in a frequency division multiplexed condition, either a number of phase conjugate light generation means 204 equal to the frequency division multiplex number is used or wide band phase conjugate light generation means 204, which can generate different phase conjugate light components for the plurality of frequency division multiplexed probe light components, is employed in order to allow frequency division multiplex optical transmission.

Figure 29:
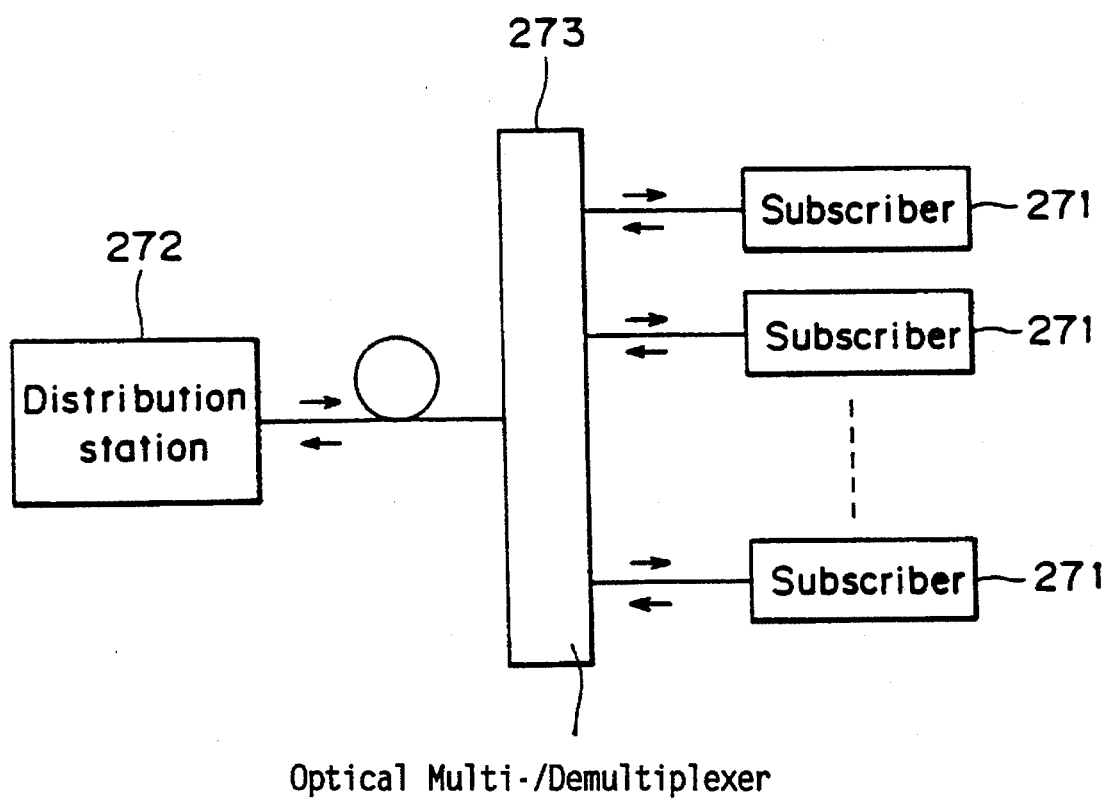
FIG. 29 is a block diagram of an optical communications system showing an embodiment wherein the present invention is applied to an optical distribution system.

FIG. 29 is a block diagram of an optical communications system showing an embodiment wherein the present invention is applied to an optical distribution system. The first embodiment in the present system is a case wherein a plurality of subscribers 271 each of which corresponds to the master station 201 and a distributing station 272 which corresponds to the slave station 202 are interconnected by way of an optical multi-/demultiplexer 273. Probe light of a single frequency or probe light in a frequency division multiplexed condition from the distributing station 272 is distributed by the optical multi-/demultiplexer 273 so that it is supplied to each of the subscribers 271. In each of the subscribers 271, transmission data are reproduced based on the individually distributed probe light, and meanwhile, transmission data such as a request signal from each of the subscribers 271 are transmitted to the distributing station 72 by phase conjugate light. In the present embodiment, since each of the subscribers 271 can perform amplification of output signal light and phase conjugate light, the distribution loss of the optical multi-/demultiplexer 273 can be compensated for, and an optical subscriber system of a simple construction can be realized. Each of the subscribers 271 has, for example, the detailed construction example of the master station of FIG. 19, and in this instance, by making different the frequencies of different kinds of pump light to be generated by the individual pump light generation means 212, it is facilitated to detect it on the side of the distributing station 272, for example, from which subscriber the request signal is received.

A second embodiment in the present system is a case wherein a distributing station 272 corresponding to the master station and a plurality of subscribers 271 each corresponding to a slave station are interconnected by way of an optical multi-/demultiplexer 273. Probe light of frequencies allocated to the individual subscribers 271 or probe light distributed from a common light source is composed by the optical multi-/demultiplexer 273 and supplied to the distributing station 272. The distributing station 272 converts the probe light into phase conjugate light and carries transmission data onto the phase conjugate light and then transmits the phase conjugate light back to the individual subscribers 271. In generation of the phase conjugate light, where probe light of different frequencies is allocated to the different subscribers, either a number of phase conjugate light generation means equal to the number of the subscribers is used or wide band phase conjugate light generation means which can generate phase conjugate light for a plurality of different kinds of probe light is used. Further, it is also possible to carry request signals from the subscribers onto probe light from the individual subscribers.

As described above, with the second application form of the present invention, since phase conjugate light generation means having multiple functions is used and can be applied to an optical communications system, an effect that a predetermined function can be realized with a simple construction is provided. Further, with the present invention, another effect is that it is possible to provide an optical communications system which compensates for phase fluctuation in an optical transmission line.

Subsequently, a third application field of the present invention will be described. The following embodiments of the present invention relate to an optical modulator which can be applied to various optical systems.

Conventionally, as an optical modulator, an optical modulator which modulates an optical device in response to an electric signal is known. For example, amplitude modulation and frequency (phase) modulation based on modulation of input current of a laser diode, intensity modulation and phase modulation based on modulation of a bias voltage for a LiNbO3 optical waveguide and so forth are employed frequently. As the speed of optical systems increases, the performances of conventional optical modulators are approaching their limits. In the meantime, it is anticipated to further increase the speed of optical systems. Further, as employment of optical amplification repeating increases, demands for optical repeaters which do not rely upon the transmission rate are increasing. In order to meet such demands, development of optical modulations (so-called full optical modulators) which operate with light without involving electric processing is required.

It is an object of the present invention in the third application field to provide such an optical modulator.

Figure 30:
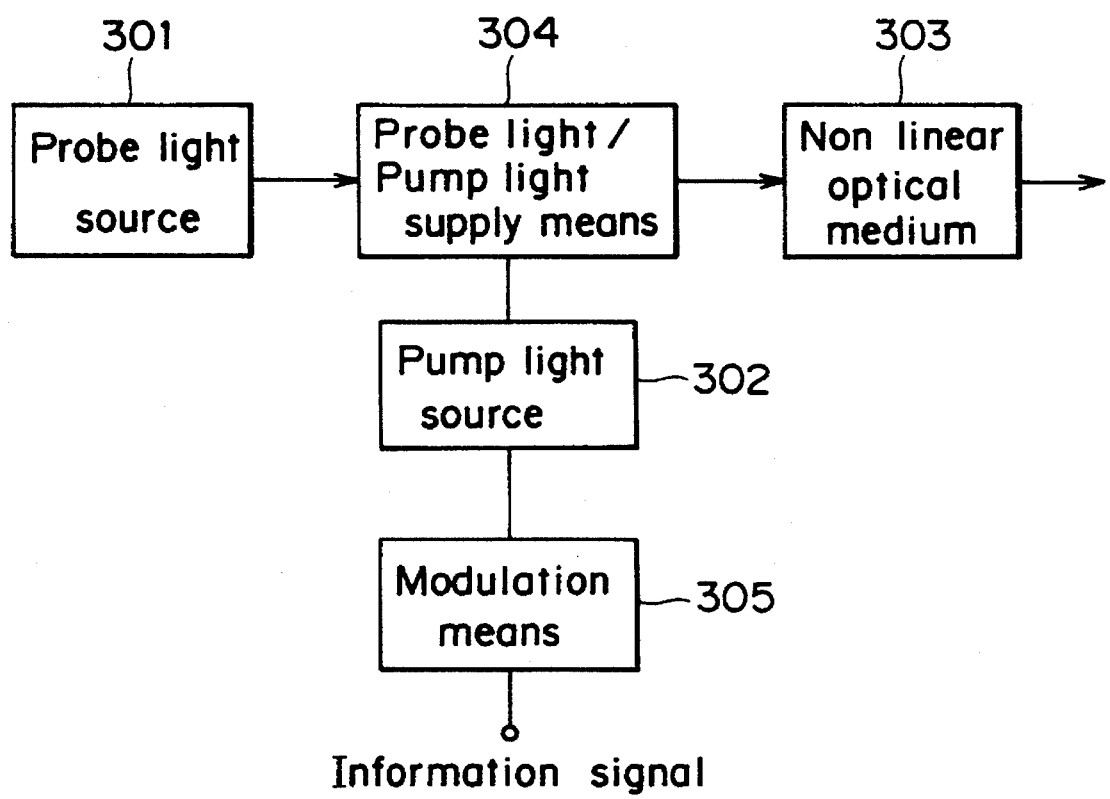
FIG. 30 is a block diagram showing a basic construction of an optical modulator of the present invention.

FIG. 30 is a block diagram showing a basic construction of an optical modulator of the present invention. The present optical modulator includes a probe light source 301, a pump light source 302, a non-linear optical medium 303, probe light/pump light supply means 304 for supplying probe light from the probe light source 301 to the non-linear optical medium 303 together with pump light from the pump light source 302, and modulation means 305 operatively connected to the pump light source 302 for modulating the pump light with an information signal. And, modulated phase conjugate light is outputted from the non-linear optical medium 303.

Since generation of phase conjugate light by four-light wave mixture (FWM) employing a non-linear optical medium and characteristics of the phase conjugate light are described above, for example, in connection with the equations (13) to (22) in the second application field, here, how output idler light (phase conjugate light) is modulated is described by way of an example of amplitude (intensity) modulation, frequency modulation and phase modulation. It is assumed that input signal light (probe light) $E_S(\omega_S, t)$, pump light $E_P(\omega_P, t)$ and output idler light $E_I'(\omega_P, t)$ in FWM are individually represented in the manner given below. $A_S(\omega_S, t)$, $A_P(\omega_P, t)$ and $A_I(\omega_I, t)$ represent the amplitudes of the probe light, the pump light and the output idler light, respectively; $\omega_S$, $\omega_P$ and $\omega_I$ represent the frequencies of the probe light, the pump light and the output idler light, respectively; t represents the time; and $\phi_S(t)$, $\phi_P(t)$ and $\phi_I(t)$ represent the phases of the probe light, the pump light and the output idler light, respectively.

$$E_S(\omega_S,t)=A_S(\omega_S,t)exp[i(\omega_S t+\phi_S(t))]+c.c. \quad (23)$$

$$E_P((\omega_P,t)=A_P(\omega_P,t)exp[i(\omega_P t+\phi_P(t))]+c.c. \quad (24)$$

$$E_I'(\omega_P, t)=A_I(\omega_I, t)\, exp\, [i\, (\omega_I t+\phi_I(t))]+c.c. \quad (25)$$

Here, if the case wherein no idler light is involved ($E_I=0$) is considered, then the following relations are obtained from the equations (13) to (16):

$$A_I(\omega_I,t) \propto k|A_P(\omega_P,t)|^2 A_S^*(\omega_S,t) \quad (26)$$

$$\omega_I=2\omega_P-\omega_S \quad (27)$$

$$\phi_I(t)=2\phi_P(t)-\phi_S(t) \quad (28)$$

(1) Amplitude (Intensity) Modulation

From the equation (26), it can be seen that, if the amplitude $A_P(\omega_P, t)$ of the pump light is varied, then the amplitude $A_I(\omega_I, t)$ of the output idler light (phase conjugate light) varies in proportion to the square of the absolute value of the amplitude $A_P(\omega_P, t)$. In particular, if amplitude (intensity) modulation is applied to the pump light as represented by the equations (29) and (30), then the output idler light is modulated by amplitude (intensity) modulation as given by the equation (31).

$$A_P(\omega_P,\, t)=A_P F(\omega,t) \quad (A_P:const.) \quad (29)$$

$$F(\omega,t) = \begin{cases} cos(\omega t + \theta) & (analog) \\ 0\, or\, 1 & digital) \end{cases} \quad (30)$$

$$A_I(\omega_I,t) \propto K|A_P|^2|F(\omega,t)|^2 A_S^*(\omega_S,\, t) \quad (31)$$

($\omega$: modulation frequency)

In this instance, if the extinction ratio of the pump light $E_P(\omega_P, t)$ is represented by $\gamma$, then the extinction ratio of idler light $E_I'(\omega_P, t)$ obtained is given by $\gamma^2$. If, for example, $\gamma=-15$ dB, then $\gamma^2=-30$ dB, and accordingly, remarkable improvement in the extinction ratio is allowed.

The idler light $E_I'(\omega_P, t)$ is outputted only when the pump light $E_P(\omega_P, t)$ has a value higher than a value $E_P^{(0)}$ at which the signal gain G=1 is satisfied. This manner is illustrated in FIGS. 31A-1 and 31A-2. Here, the pump light is modulated with a sine wave. Where the pump light is modulated by on-off modulation with a digital signal, the waveforms as shown in FIGS. 31B-1 and 31B-2 are obtained. By the way, particularly in the case of digital modulation, the pulse shape of the pump light is actually a shape deformed from a rectangular shape as shown in FIG. 31C-2, and if it is considered that the amplitude of the idler light increases in proportion to the square of the amplitude of the pump light, then it can be seen that the pulse width of the idler light is small in comparison with the pulse width of the pump light. This manner is illustrated in FIG. 31C-1. Accordingly, it is possible to have pulses with an arbitrary duty ratio and shape using such characteristics.

(2) Frequency Modulation

If such frequency modulation as represented by the equation (32) is applied to the pump light, then the output idler light is frequency modulated as given by the equation (33):

$$A_P(\omega_P,t) = A_P\exp\left[i\Delta\omega\int_0^t F(\omega,T)dt\right] + c.c. \quad (32)$$

$$E_I'(\omega_P,t) = A_I\exp\left[i\left((2\omega_P - \omega_S)t + 2\Delta\omega\int_0^t F(\omega,t)dt + 2\phi_P(t) - \phi_S(t)\right)\right] + c.c. \quad (33)$$

In this instance, since the modulation degree of the output idler light is twice that of the pump light, the frequency degree of the pump light necessary to provide frequency modulation of the modulation degree m to the output idler light may be one half the modulation degree m, that is, m/2.

(3) Phase Modulation

If it is assumed that phase modulation is applied as represented by the equation (34) to the pump light, then the output idler light is phase modulated as given by the equation (35):

$$A_P(\omega_P,t) = A_P\exp\left[im\int_0^t F(\omega,t)dt\right] + c.c. \quad (34)$$

$$E_I'(\omega_P,t) = \quad (35)$$

$$A_I\exp[i((2\omega_P - \omega_S)t + 2mF(\omega,t)t(2\phi_P(t) - \phi_S(t))] + c.c.$$

(m: modulation index)

Also in this instance, since the modulation degree of the idler light is twice that of the pump light, similarly to the case of frequency modulation, the modulation degree of the pump light to provide frequency modulation of the modulation degree m to the idler light may be one half the modulation degree m, that is, m/2. From the equations (33) and (34), the phase noise of the output idler light is the sum of double of the phase noise of the pump light and the phase noise of the signal light. Accordingly, when optical frequency modulation or optical phase modulation is to be performed, preferably the phase noise of a light source used is made as low as possible. In other words, preferably a coherent light source is used for the probe light source and the pump light source.

Referring to FIG. 30, as concrete examples of the non-linear medium 303 for generating idler light by FWM, crystal media such as TiBaO₃ or LiNbO₃, various organic media, various semiconductors (for example, semiconductor amplifiers), optical fibers and so forth are listed. In any case, an opposing type pumping arrangement could construct an optical modulator of the phase conjugate mirror (PCM) type, but a forward pumping arrangement could construct a phase conjugate device type optical modulator of the transmission type. Where the present invention is applied to optical fiber communications, an optical fiber is suitable as a non-linear optical medium from the matching property with an optical transmission line. In the following, several examples wherein an optical fiber is employed as a non-linear optical medium will be described.

Figure 32:
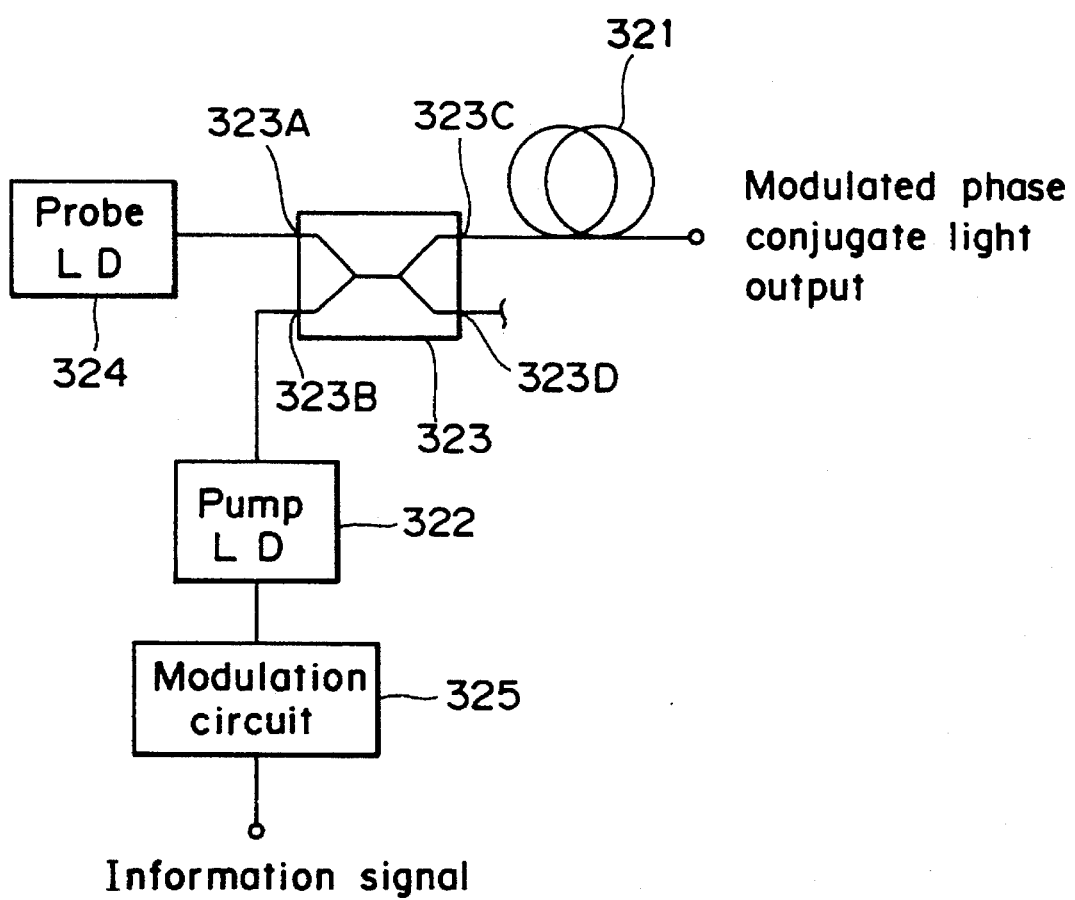
FIG. 32 is a block diagram showing a first embodiment of an optical modulator of the present invention.

FIG. 32 is a block diagram of a first embodiment of an optical modulator of the present invention. An optical fiber 321, a pump LD (laser diode) 322, an optical coupler 323, a probe LD 324 and a modulation circuit 325 which correspond to the non-linear optical medium 303, the pump light source 302, the probe light/pump light supply means 304, the probe light source 301 and the modulation means 305 of FIG. 30, respectively, are employed. The optical fiber 321 as a non-linear optical medium preferably is a single mode fiber. In this instance, preferably the optical fiber 321 as a non-linear optical medium is a single mode fiber. In this instance, when the wavelength of probe light and the wavelength of pump light are made a little different from each other to cause FWM of the degeneracy type, the wavelength at which the optical fiber 321 exhibits zero dispersion is set so as to coincide with the wavelength of the pump light (oscillation wavelength of the pump LD 322). The optical coupler 323 has four ports 323A, 323B, 323C and 323D. The probe LD 324 is connected to the port 323A; the pump LD 322 is connected to the port 323B; a first end of the optical fiber 321 is connected to the port 232c; and the port 323D terminates in a dead end. The optical coupler 323 functions at least such that it outputs light supplied to the ports 323A and 323B from the port 323C. For the optical coupler 323, for example, an optical coupler of the fiber fusion type, a half mirror, an optical combiner, a polarization beam splitter or a like element is used.

With the construction, since probe light supplied to the port 323A of the optical coupler 323 and pump light supplied to the port 323B can be guided into the optical fiber 321 which is a non-linear optical medium, phase conjugate light (idler light) of the transmission type can be generated by FWM. And, since the pump light is modulated by the modulation circuit 325 connected to the pump LD 322, modulated idler light can be outputted from the second end of the optical fiber 321 in accordance with the principle described hereinabove. The modulated idler light is sent out, for example, to an optical transmission line not shown.

Where an optical fiber is employed for the non-linear optical medium, in order to cause FWM efficiently in the optical fiber, preferably phase matching between the probe light and the idler light is established. As effective methods for this, there is a method which employs degeneracy FWM wherein the wavelengths of pump light and probe light are made to coincide with each other, another method wherein the wavelength of pump light is made to coincide with the zero dispersion wavelength of an optical fiber, and so forth. Particularly where the latter method is adopted, the phase velocities of probe light and idler light can made equal to each other while maintaining the mutual complex conjugate relationship between the probe light and the idler light (in the approximation up to the secondary dispersion), and as a result, ideal phase matching is allowed.

By the way, when optical modulation is performed by FWM in an optical fiber, if the intensity of the pump light is increased in order to increase the modulation efficiency, then the pump light will be reflected within the optical fiber by stimulated Brillouin scattering (SBS), resulting in saturation of the conversion efficiency. Particularly in the case of amplitude (intensity) modulation or when no modulation is applied (CW), SBS occurs, in a single mode fiber, at an input power of about +7 to 8 dBm or so. An embodiment which eliminates an influence of such SBS will be described subsequently.

Figure 33:
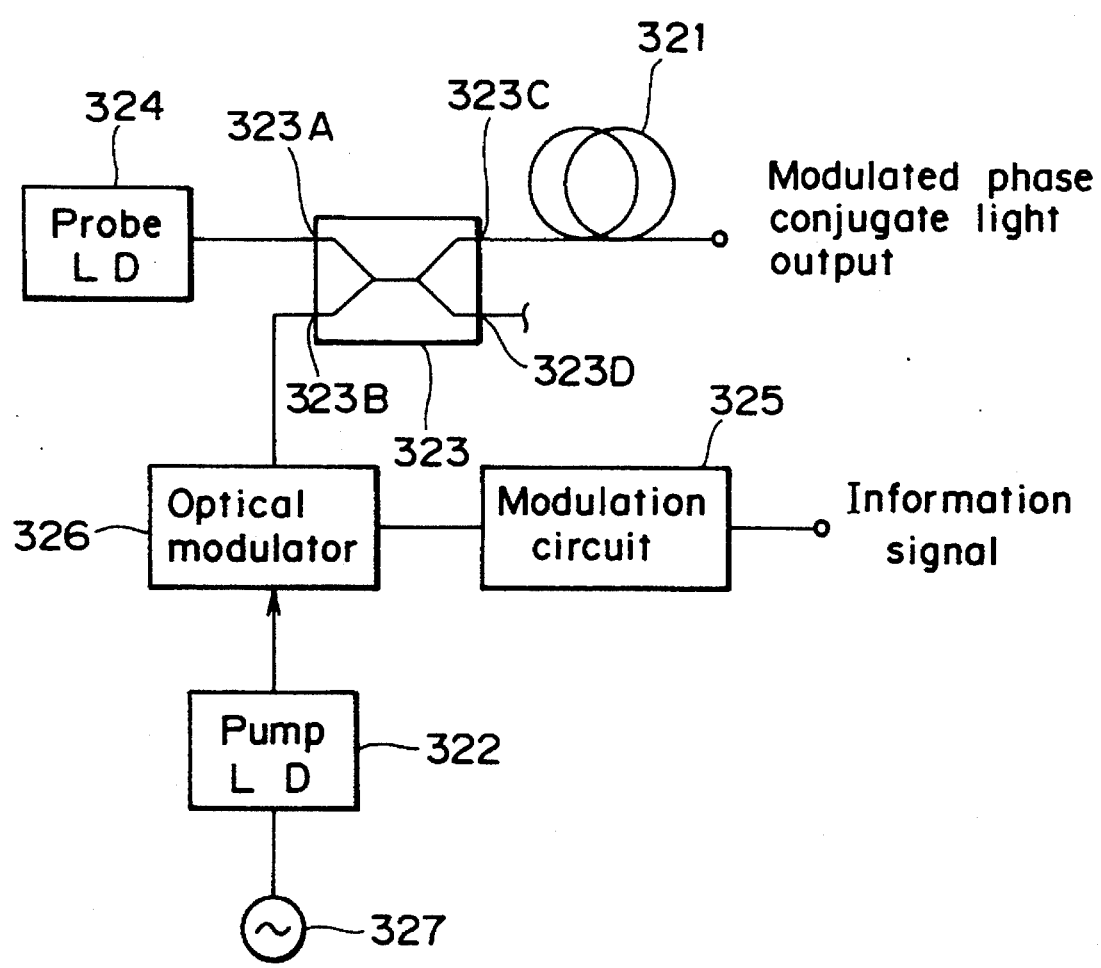
FIG. 33 is a block diagram showing a second embodiment of an optical modulator of the present invention.

FIG. 33 is a block diagram showing a second embodiment of an optical modulator of the present invention. In the present embodiment, pump light from the pump LD 322 frequency modulated by an oscillator 327 of a comparatively low frequency ω' is inputted to the port 323B of the optical coupler 323 by way of an optical modulator 326. The optical modulator 326 is driven by the modulation circuit 325, to which an information signal is inputted, to modulate the pump light, which passes therethrough, by amplitude (intensity) modulation. Consequently, the power density of the pump light within the optical fiber 321 per a unit frequency can be decreased to suppress SBS. Where the pump light is modulated directly in place of such indirect modulation of the pump light by the optical modulator 326, the low frequency signal of the frequency ω' should be supplied in a superimposed condition on the information signal to the pump LD 322. It is to be noted that the frequency ω' of the optical modulator 326 should be sufficiently low so that it may not have an influence upon the information signal to be supplied to the modulation circuit 325. While, in the present embodiment, low speed frequency modulation of pump light is performed in order to modulate phase conjugate light, also where phase conjugate light which is not in a modulated condition is obtained as in the embodiment described above, SBS can be suppressed by modulating the pump light by frequency modulation.

Figure 34:
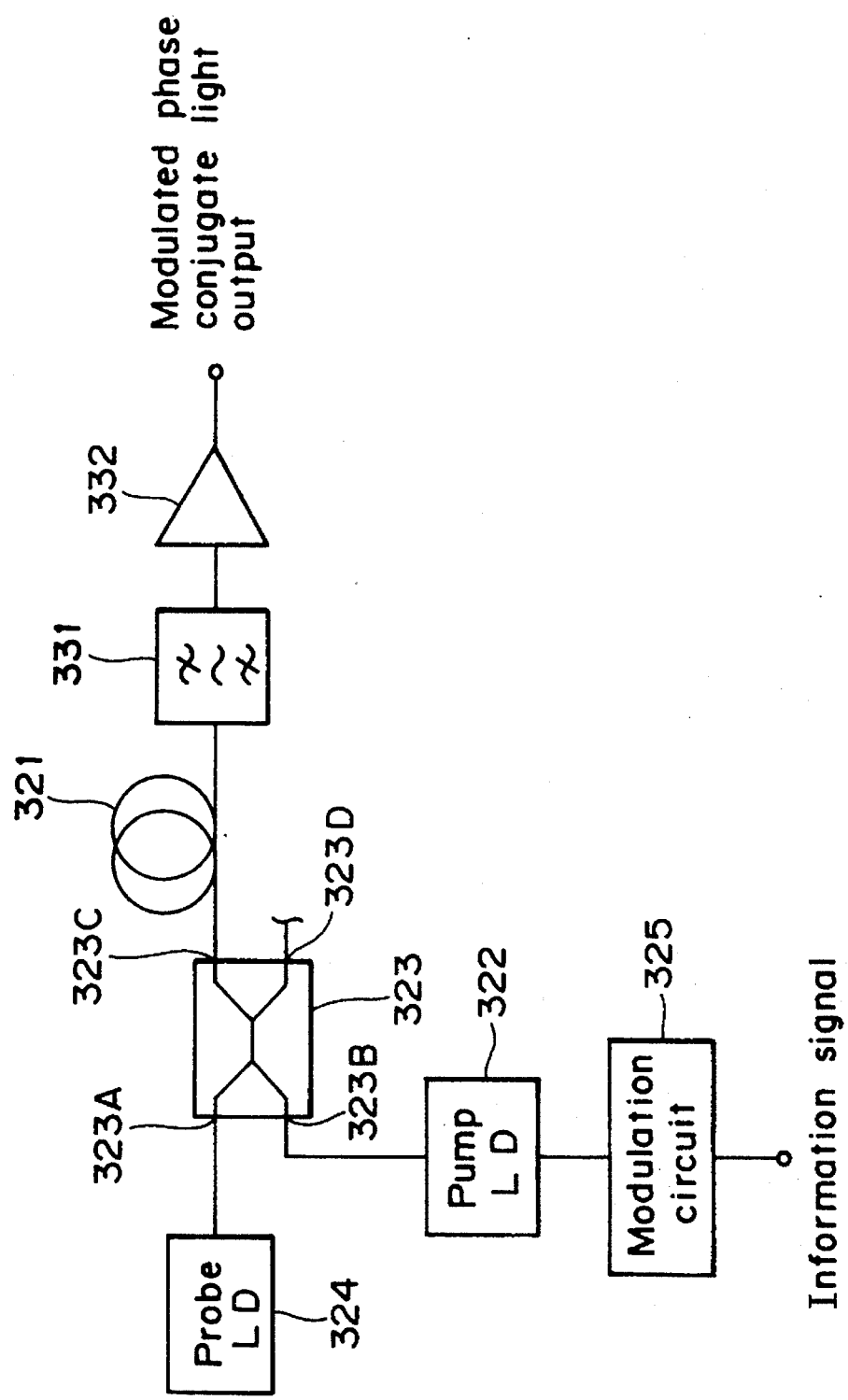
FIG. 34 is a block diagram showing a third embodiment of an optical modulator of the present invention.

FIG. 34 is a block diagram showing a third embodiment of an optical modulator of the present invention. The present embodiment is characterized in that, in contrast with the first embodiment of FIG. 32, phase conjugate light (output idler light) generated in the optical fiber 321 is sent out to an optical transmission line, not shown by passing through an optical band pass filter 331 and an optical amplifier 332 in this order. The optical amplifier 332 is, for example, a linear optical amplifier. A construction example of the optical amplifier 332 includes a doped fiber in which a rare earth element such as Er (erbium) is doped, a pump light source for outputting pump light, and means for supplying the pump light to the doped fiber together with light (output idler light here) to be amplified. The optical band pass filter 331 is provided to remove undesired light such as light from the probe LD 324 and the pump LD 322 or noise light or the like, and by means of the optical band pass filter 331, only modulated output idler light can be outputted from the present optical modulator. Further, by removing such unnecessary light, the saturation of the optical amplifier 332 is prevented, for example, by the pump light from the pump LD 322, and the output idler light generated in the optical fiber 321 can be amplified sufficiently. Further, since generally the intensity of the pump light from the pump LD 322 is very high in comparison with the intensities of the probe light and the output idler light, by removing unnecessary light such as the pump light using the optical band pass filter 331, there is no possibility that pump light of a high intensity may further cause a non-linear optical effect in an optical transmission line at a following stage. Further, by removing unnecessary light by means of the optical band pass filter 331, when a demodulation signal is to be reproduced on the receiving side based on modulated output idler light, the difficulty in demodulation arising from the presence of pump light can be eliminated. It is to be noted that, since the intensity of output idler light generated in the optical fiber 321 is sometimes higher than the intensity of the probe light supplied to the optical fiber 321 when the intensity of the pump light supplied from the pump LD 322 is sufficiently high, when such amplification action occurs, the pump LD 322 need not be employed.

Figure 35:
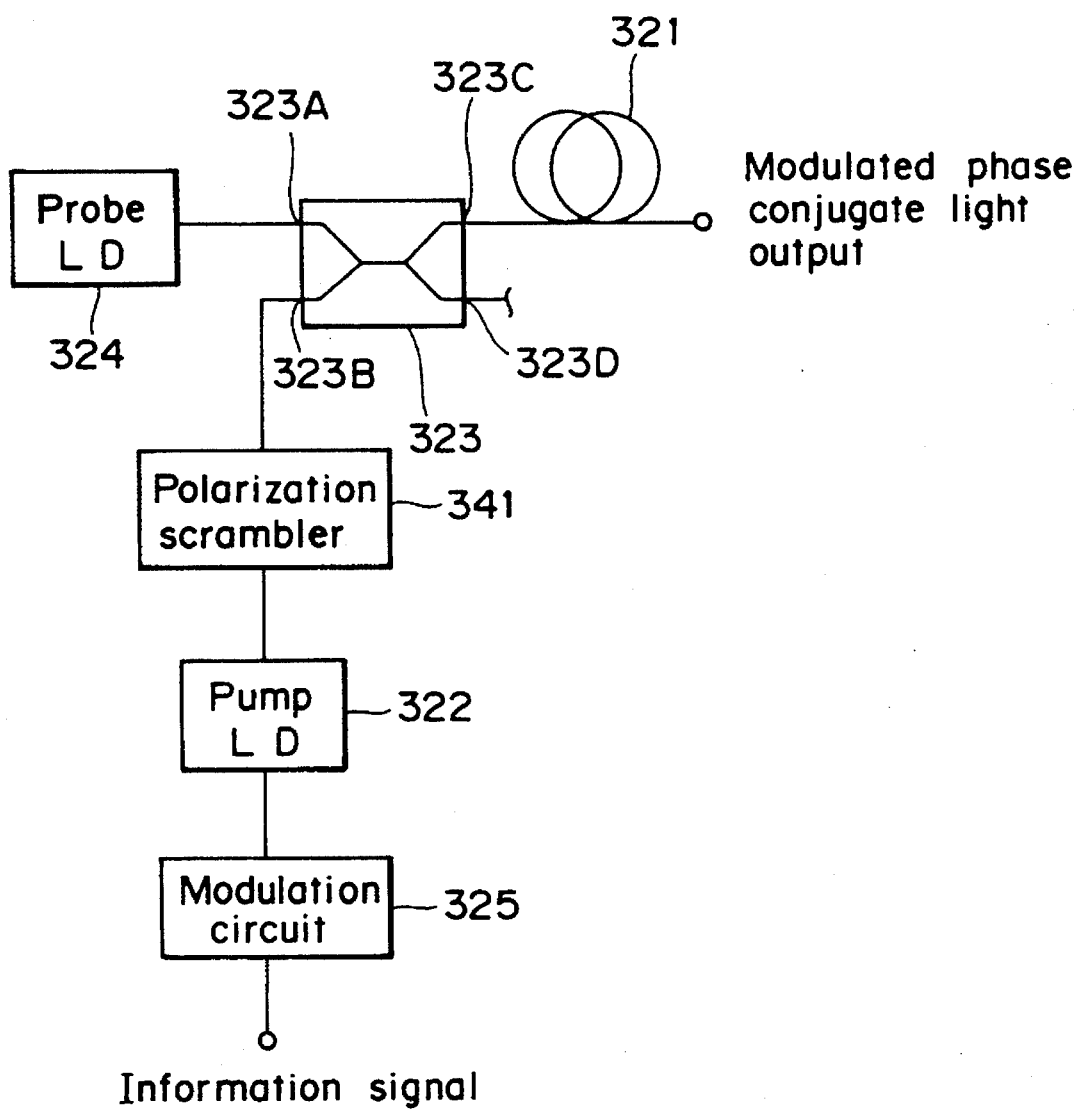
FIG. 35 is a block diagram showing a fourth embodiment of an optical modulator of the present invention.

FIG. 35 is a block diagram showing a fourth embodiment of an optical modulator of the present invention. The present embodiment is characterized in that, in contrast with the first embodiment of FIG. 32, a polarization scrambler 341 is interposed between the pump LD 322 and the port 323B of the optical coupler 323. Generally, as propagation modes of a single mode fiber, there are two polarization modes in which the polarization planes are perpendicular to each other, and the two polarization modes are coupled to each other by an influence of various disturbances. As a result, the polarization condition of light supplied to a first end of the single mode fiber does not coincide with the polarization condition of light outputted from a second end of the single mode fiber. Accordingly, where probe light from the probe LD 324 is supplied to the optical coupler 323 by way of a comparatively long single mode fiber like a case wherein an optical modulator of the present invention is built in an optical repeater or a like case, the polarization condition of the probe light supplied to the optical fiber 321 as a non-linear optical medium is varied by a variation of the circumstances, etc., as time passes. Meanwhile, as is apparent from the principle of generation of output idler light (phase conjugate light) described above, the conversion efficiency from probe light to phase conjugate light relies upon the relationship between the polarization condition of probe light and the polarization condition of pump light supplied to the non-linear optical medium. With the fourth embodiment of FIG. 35, since pump light from the pump LD 322 is combined with probe light by way of the polarization scrambler 341, even when the polarization condition of the probe light supplied varies as time passes, the conversion efficiency from the probe light to phase conjugate light can be made fixed, thereby to stabilize operation of the optical modulator.

The polarization scrambler 341 is constructed in an ordinary manner using a half-wave plate or a quarter-wave plate or a like element and functions such that, for example, when the pump light supplied from the pump LD 322 is substantially linearly polarized light, it rotates the polarization plane of the linearly polarized light. Since the variation of the polarization condition of probe light supplied which arises from a variation of environmental conditions is comparatively slow, the polarization reliance can be eliminated sufficiently by setting the operation frequency (for example, a reciprocal number to the period of rotation of the polarization plane) of the polarization scrambler 341 to approximately 1 to 100 KHz. While, in the present example, the polarization scrambler 341 acts upon the pump light supplied from the pump LD 322, the polarization scrambler may alternatively act upon probe light.

Figure 36:
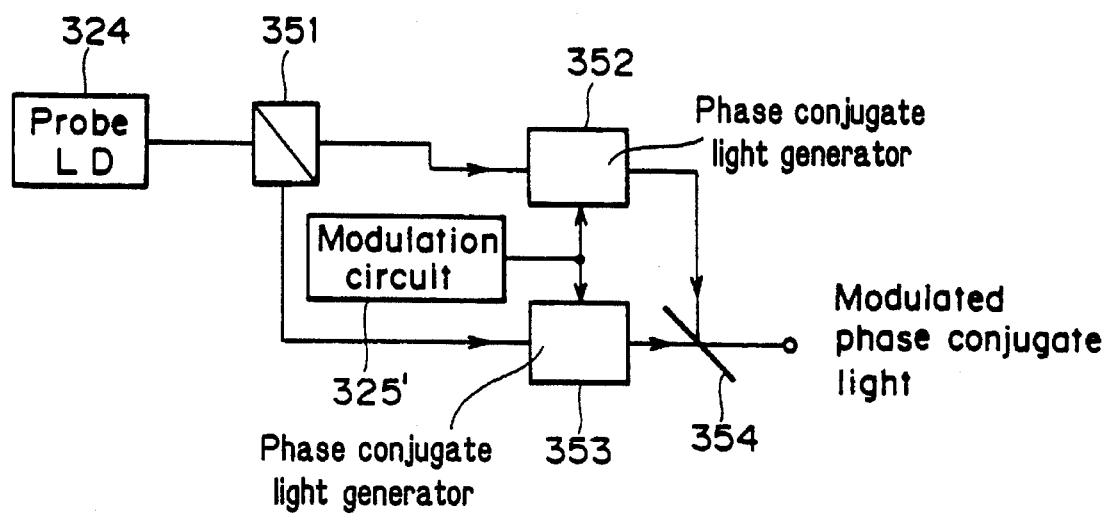
FIG. 36 is a block diagram showing a fifth embodiment of an optical modulator of the present invention.

FIG. 36 is a block diagram showing a fifth embodiment of an optical modulator of the present invention. In the present embodiment, a polarization beam splitter 351 for splitting probe light supplied thereto from the probe LD 324 into first and second polarized light components whose polarization planes are perpendicular to each other, phase conjugate light generators 352 and 353 for generating phase conjugate light (output idler light) in accordance with the first and second polarized light components from the polarization beam splitter 351, and a polarization composer 354 for combining the phase conjugate light from the phase conjugate light generators 352 and 353, are employed. The polarization composer 354 is, for example, a polarization beam splitter, and phase conjugate light composed by the polarization composer 354 is sent out into an optical transmission line, not shown. For the phase conjugate light generators 352 and 353, for example, the construction of the first embodiment of FIG. 32 from which the probe LD 324 and the modulation circuit 325 are removed can be employed. A modulation circuit 325' is provided in order to modulate pump light in the phase conjugate light generators 352 and 353.

With the present embodiment, since first and second polarized light components of probe light supplied to the phase conjugate light generators 352 and 353 are both linearly polarized light, it is easy for the phase conjugate light generators 352 and 353 to make the polarization condition of the probe light (first or second polarized light component) supplied thereto coincide with the polarization condition of the pump light, and the polarization reliance can be eliminated. In short, the generation efficiency of phase conjugate light can be made fixed irrespective of a variation of the polarization condition of the probe light supplied thereto from the probe LD 324. In the present embodiment, preferably the difference between the optical path length of the optical path from the polarization beam splitter 351 to the polarization composer 354 by way of the phase conjugate light generator 352 and the optical path length of the optical path from the polarization beam splitter 351 to the polarization composer 354 by way of the phase conjugate light generator 353 is made sufficiently small in comparison with the advancing distance of light at one time slot T of a signal. For example, where the information signal supplied to the modulation circuit 325' is an NRZ signal of 10 Gb/s, the advancing distance of light within one time slot T is about 2 mm, and accordingly, preferably the optical path length difference is suppressed less than approximately 0.2 mm corresponding to one tenth the advancing distance of light.

Figure 37:
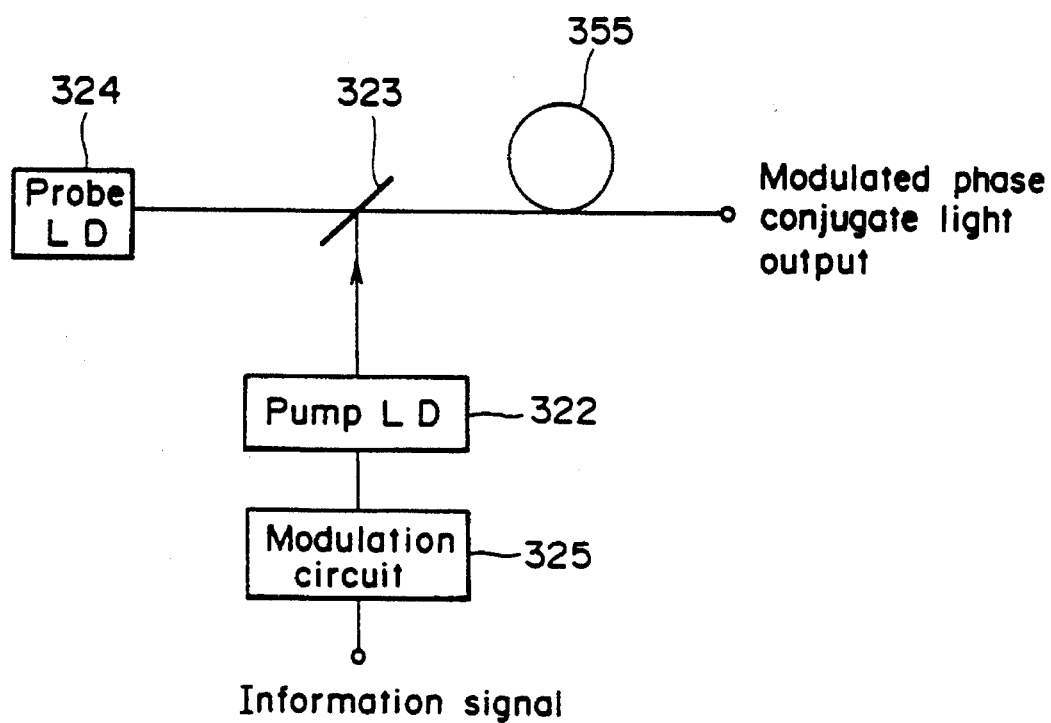
FIG. 37 is a block diagram showing a sixth embodiment of an optical modulator of the present invention.

FIG. 37 is a view showing a sixth embodiment of an optical modulator of the present invention. For the probe light/pump light supply means, the optical coupler 323 is used, and for the non-linear optical medium, a polarization holding (maintaining) fiber 355 is used. Probe light from the probe LD 324 and pump light from the pump LD 322 are combined by the optical coupler 323 and inputted to the polarization holding fiber 355. The pump light is substantially linearly polarized light having a predetermined polarization plane, and the arrangement of the pump LD 322 and so forth are set such that the predetermined polarization plane may be inclined approximately by 45° with respect to the main axis of the polarization holding fiber 355. Due to this construction, two orthogonal polarized light components of pump light power in the polarization holding fiber can be kept equal to each other and fixed, and consequently, the generation efficiency of output idler light with respect to probe light in an arbitrary polarization condition can be kept stable.

Since there is the possibility in that, in the embodiment of FIG. 37, a phase offset may be caused by a little difference in refraction factor between two polarized waves in the direction of the main axis of the polarization holding fiber 355 as the length of the polarization holding fiber 355, which is used as a non-linear optical medium, increases, preferably either the pump light power is raised or the non-linear constant of the polarization holding fiber 355 is increased so that the polarization holding fiber 355 of a small distance may suffice. The degree of the phase offset between the two orthogonal polarized light components depends upon the material or the structure of the polarization holding fiber 355. In a standard fiber, an offset of 17 ps is produced for the length of 10 m. Accordingly, the offset appears as polarization dispersion of 1 bit with a signal whose bit rate is approximately 60 Gb/s. In this instance, the transmission rate of a signal which can be transmitted actually is approximately 10 Gb/s. As the length of the polarization holding fiber 355 increases, the transmission rate of a signal which can be transmitted further decreases. Subsequently, an embodiment which can cope with a signal of a high bit rate without decreasing the length of a polarization holding fiber as a non-linear optical medium will be described.

Figure 38:
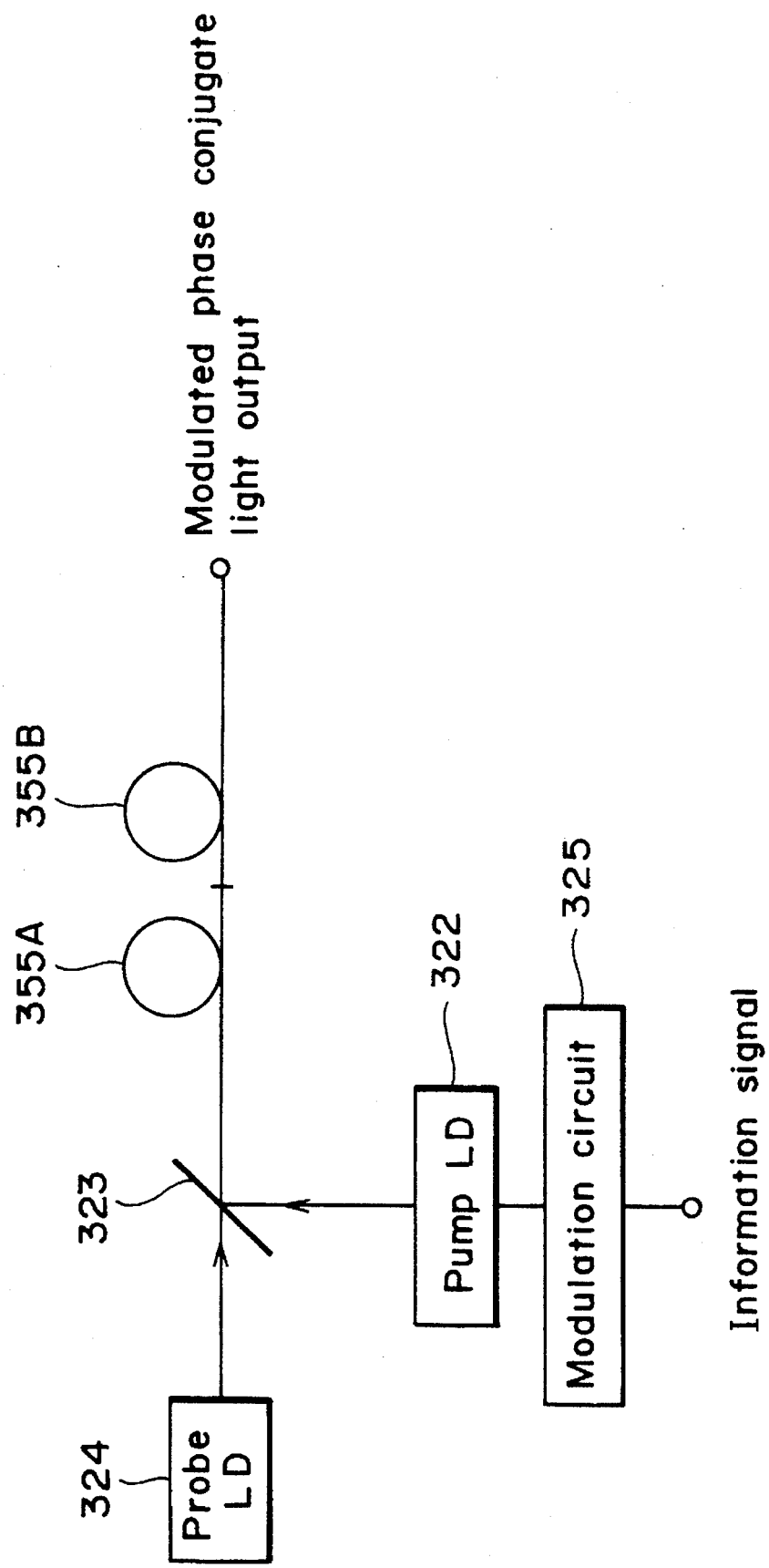
FIG. 38 is a block diagram showing a seventh embodiment of an optical modulator of the present invention.

FIG. 38 is a block diagram showing a seventh embodiment of an optical modulation of the present invention. The present embodiment is characterized in that, in contrast with the embodiment of FIG. 37, the non-linear optical medium is formed from two polarization holding fibers 355A and 355B of a substantially equal length. The polarization holding fibers 355A and 355B are connected to each other such that the main axes thereof may be perpendicular to each other. Pump light is substantially linearly polarized light having a predetermined polarization plane. Probe light and pump light combined by the optical coupler 323 are supplied to a first end of the polarization holding fiber 355A. Here, the arrangement of the pump LD 322 and so forth are set so that the polarization plane of the pump light may be inclined substantially by 45° with respect to the main axis of the polarization holding fiber 355A. A second end of the polarization holding fiber 355A is connected to a first end of the polarization holding fiber 355B. From a second end of the polarization holding fiber 355B, modulated phase conjugate light generated in the polarization holding fibers 355A and 355B is outputted. In the present embodiment, since the lengths of the polarization holding fibers 355A and 355B having substantially the same characteristics are set equal to each other, the phase offset between two orthogonal polarized light components generated in the polarization holding fiber 355A is canceled by the phase offset between two orthogonally polarized light components generated in the polarization holding fiber 355B, and even where the total length of the polarization holding fibers 355A and 355B is great, the transmission rate of a signal is not limited by this at all.

Figure 39:
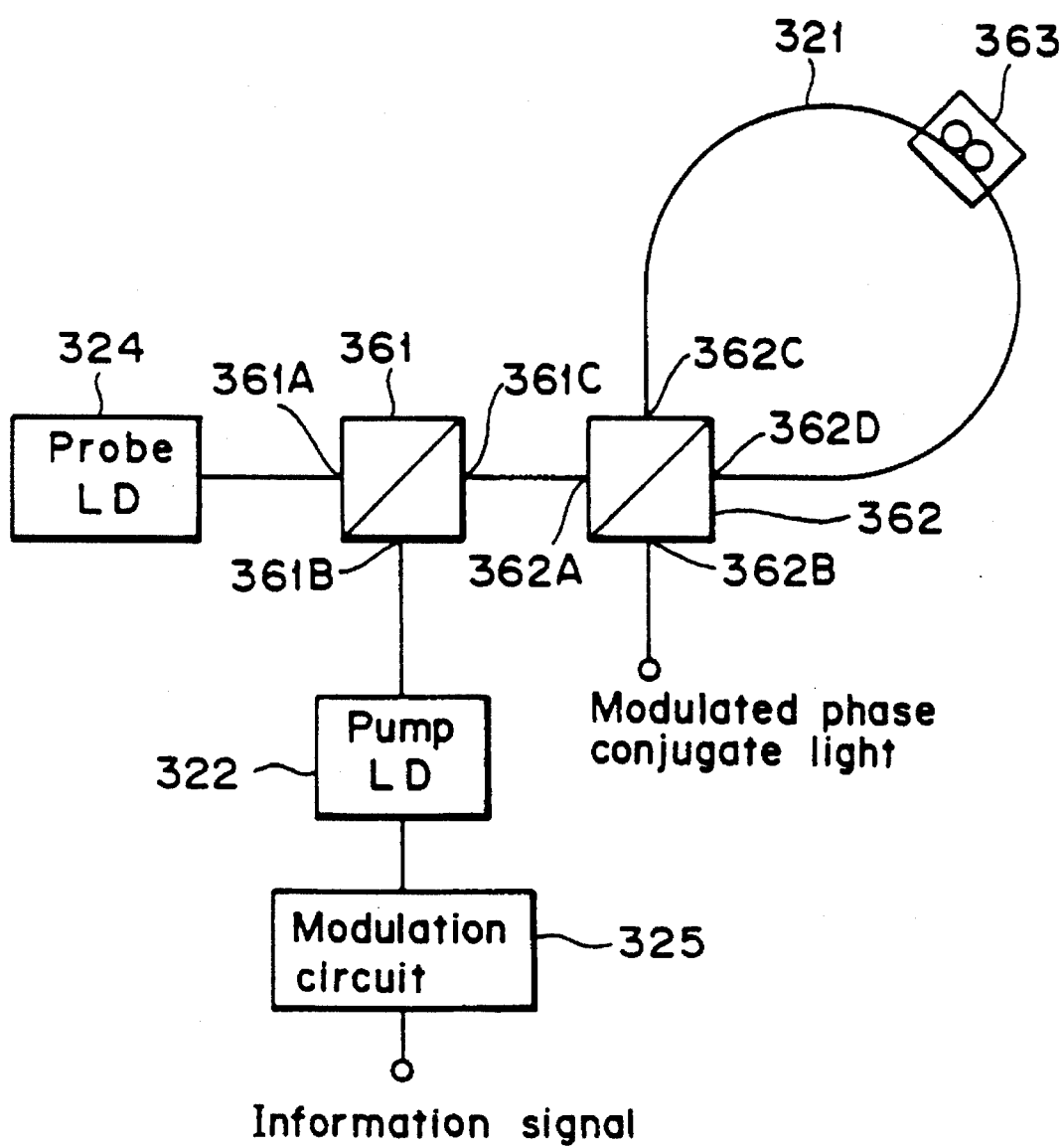
FIG. 39 is a block diagram showing an eighth embodiment of an optical modulator of the present invention.

FIG. 39 is a block diagram showing an eighth embodiment of an optical modulator of the present invention. The present embodiment is similar to the embodiments of FIGS. 32 to 35 described above in that the pump LD 322 is used for the pump light source and the optical fiber 321 is employed for the non-linear optical medium. In the present embodiment, in order to guide probe light and pump light in the opposite directions in the optical fiber 321, the probe light/pump light supply means includes an optical coupler 361 and a polarization beam splitter 362. The optical coupler 361 has ports 361A, 361B and 361C and outputs light supplied to the ports 361A and 361B from the port 361C. The probe LD 324 is connected to the port 361A, and the pump LD 322 is connected to the port 361B. The polarization beam splitter 362 has ports 362A, 362B, 362C and 362D, and polarizes and splits light supplied to the ports 362A and 362B into two orthogonally polarized light components and individually outputs the two polarized light components from the ports 362C and 362D. Further, the polarization beam splitter 362 polarizes and splits light supplied to the ports 362C and 362D into two orthogonally polarized light components and individually outputs the two polarized light components from the ports 362A and 362B. The port 361C of the optical coupler 361 is connected to the port 362A; an optical transmission line not shown is connected to the port 362B; and the optical fiber 321 is connected between the ports 362C and 362D. A polarization controller 363, which is constructed in an ordinary manner using a quarter-wave plate, a half-wave plate or a like element, is provided intermediately of the optical fiber 321, and the polarization controller 363 effects such control that the polarization condition of light supplied to the optical fiber 321 and the polarization condition of light to be outputted from the optical fiber 321 may coincide with each other.

Probe light supplied to the optical coupler 361 is combined with pump light from the pump LD 322, and the probe light and the pump light are split into first polarized light components and second polarized light components, which have a polarization plane perpendicular to the polarization plane of the first polarized light components, by the polarization beam splitter 362. The first and second polarized light components propagate in the opposite directions to each other in the optical fiber 321 and are polarized and composed, when they pass the polarization beam splitter 362 again, and then outputted from the port 362B. The polarization plane of the pump light outputted from the pump LD 322 is set such that the distribution ratio of the pump light from the pump LD 322 to the first and second polarized light components split by the polarization beam splitter 362 may be 1:1. In particular, the pump LD 322 is set such that the polarization plane of the pump light supplied to the port 362A of the polarization beam splitter 362 may be inclined approximately by 45° individually with respect to the polarization planes of the first and second polarized light components. Where the pump LD 322 is set in this manner, the two orthogonally polarized light components of the pump light act with polarization planes which individually coincide with those of the two orthogonally polarized light components of the probe light guided in the opposite directions to each other in the optical fiber 321, when phase conjugate light beams, which are generated in the opposite directions to each other in the optical fiber 321, are composed in the polarization beam splitter 362 and outputted from the port 362B, the phase conjugate light can be obtained at a fixed conversion efficiency irrespective of a variation of the polarization condition of the supplied probe light.

Figure 40:
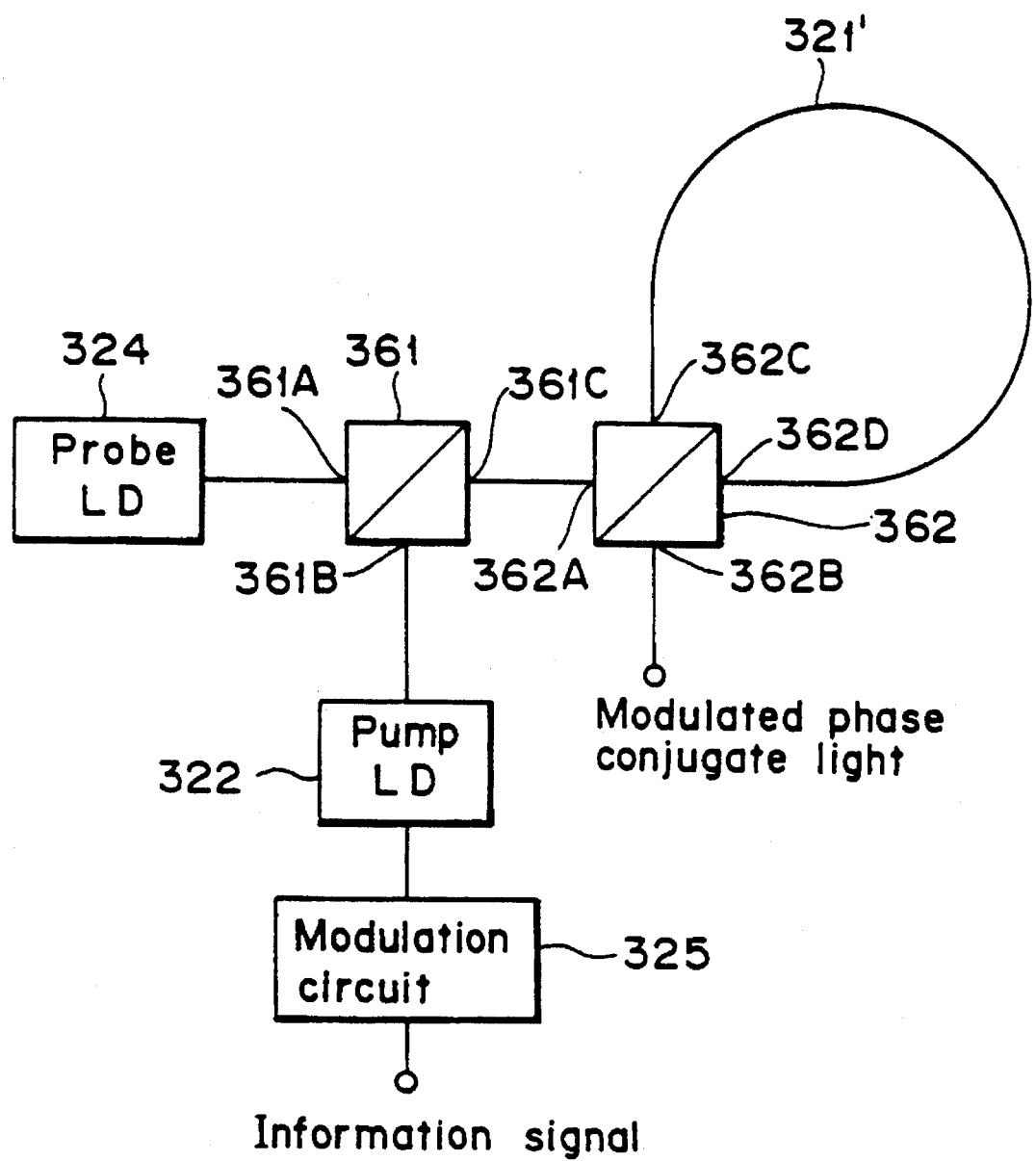
FIG. 40 is a block diagram showing a ninth embodiment of an optical modulator of the present invention.

FIG. 40 is a block diagram showing a ninth embodiment of an optical modulator of the present invention. The present embodiment is characterized in that, in contrast with the embodiment of FIG. 39, an optical fiber 321' is employed for the non-linear optical medium. The optical fiber 321' is connected to the polarization beam splitter 362 such that the polarization condition of light supplied to the optical fiber 321' may coincide with the polarization condition of light to be outputted from the optical fiber 321'. In this instance, the main axis of the optical fiber 321' is parallel to the polarization plane of linearly polarized light polarized and split by the polarization beam splitter 362. With the present embodiment, since the polarization controller 363 of FIG. 39 is unnecessary, the construction of the apparatus can be simplified.

Figure 41:
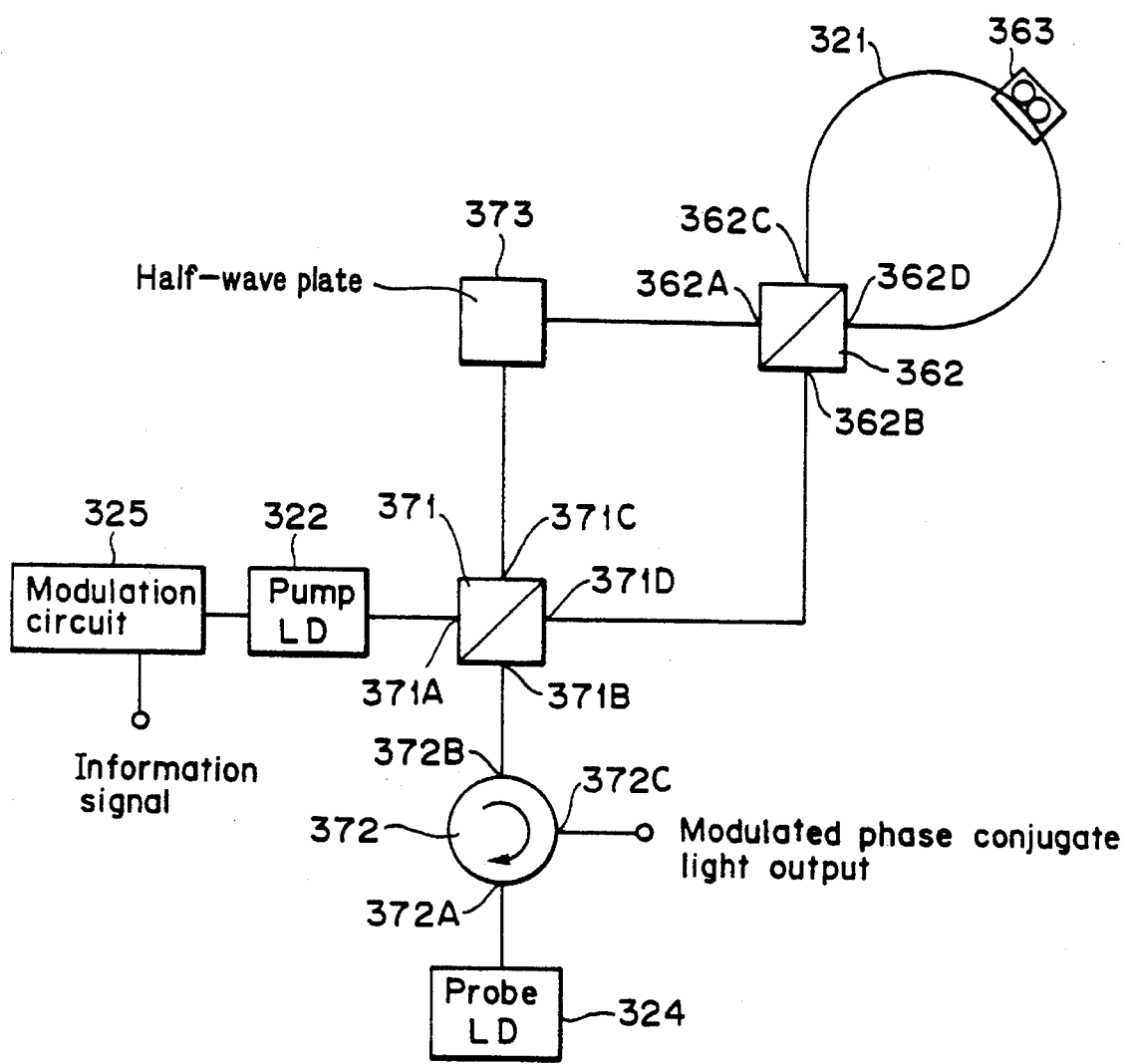
FIG. 41 is a block diagram showing a tenth embodiment of an optical modulator of the present invention.

FIG. 41 is a block diagram showing a tenth embodiment of an optical modulator of the present invention. The present embodiment is similar to the embodiment of FIG. 39 in that the optical fiber 321 as a non-linear optical medium, the pump LD 322, the probe LD 324, the polarization beam splitter 362 and the polarization controller 363 are employed. In the present embodiment, in order to separate pump light, which remains without being consumed upon generation of phase conjugate light, from generated phase conjugate light, the probe light/pump light supply means includes an optical coupler 371, a half-wave plate 373 and the polarization beam splitter 362. Further, in order to separate a port to which pump light is to be supplied and another port for extracting phase conjugate light from each other, the probe light/pump light supply means further includes an optical circulator 372. The optical circulator 372 has three ports 372A, 372B and 372C and functions such that it outputs light supplied to the port 372A from the port 372B and outputs light supplied to the port 372B from the port 372C and further outputs light supplied to the port 372C from the port 372A. The probe LD 324 is connected to the port 372A, and the port 372C is connected to an optical transmission line not shown. The optical coupler 371 has four ports 371A, 371B, 371C and 371D, and equally distributes light supplied to the ports 371A and 371B so as to be outputted from the ports 371C and 371D and equally distributes light supplied to the ports 371C and 371D so as to be outputted from the ports 371A and 371B. For the optical coupler 371, for example, a half mirror or an optical coupler of the fiber fusion type is used. The pump LD 322 is connected to the port 371A; the port 372B of the optical circulator 372 is connected to the port 371B; and the port 371D is connected to the port 362B of the polarization beam splitter 362. The half-wave plate 373 is interposed in the optical path between the port 371C of the optical coupler 371 and the port 362A of the polarization beam splitter 362, and the half-wave plate 373 rotates the polarization plane of light supplied thereto by 90°. The present embodiment is constructed such that the polarization condition of pump light supplied to the port 371A of the optical coupler 371 and the polarization condition of probe light supplied from the probe LD 324 to the port 371B of the optical coupler 371 by way of the optical circulator 372 coincide with each other.

Now, operation of the present embodiment will be described under the assumption that each of the pump light and the probe light is linearly polarized light having a polarization plane perpendicular to the plane of the figure. The pump light and the probe light supplied to the ports 371A and 371B of the optical coupler 371 are equally distributed and outputted from the ports 371C and 371D. The polarization planes of the probe light and the pump light outputted from the port 371C are rotated by 90° by the half-wave plate 373, and the probe light and the pump light are supplied as linearly polarized light having a polarization plane parallel to the plane of the figure to the port 362A of the polarization beam splitter 362. The probe light and the pump light supplied to the port 362A are supplied from the port 362D to the optical fiber 321, and when they propagate in the counterclockwise direction in the figure within the optical fiber 321, phase conjugate light is generated in the same direction. The phase conjugate light and remaining pump light are supplied from the port 362C to the polarization beam splitter 362 and outputted from the port 362B. Meanwhile, the probe light and the pump light supplied from the port 371D of the optical coupler 371 to the port 362B of the polarization beam splitter 362 are supplied from the port 362D to the optical fiber 321, and since they have polarization planes perpendicular to the plane of the figure, when they propagate in the counterclockwise direction in the figure within the optical fiber 321, phase conjugate light is generated. The phase conjugate light and remaining pump light are supplied from the port 362C to the polarization beam splitter 362 and outputted from the port 362A. The polarization planes of the phase conjugate light and the pump light supplied from the port 362A to the half-wave plate 373 are rotated by 90° so that the phase conjugate light and the pump light are supplied as linearly polarized light parallel to the plane of the figure to the port 371C of the optical coupler 371. The pump light and the phase conjugate light supplied from the half-wave plate 373 to the port 371C and the pump light and the phase conjugate light supplied from the port 362B of the polarization beam splitter 362 to the port 371D of the optical coupler 371 all have polarization planes parallel to the plane of the figure and the lengths of the optical paths having been followed by them coincide completely with one another. Accordingly, of the pump light and the phase conjugate light supplied to the ports 371C and 371D of the optical coupler 371, the pump light is principally outputted from the port 371A and the phase conjugate light is principally outputted from the port 371B. The light outputted from the port 371B of the optical coupler 371 is sent out into the optical transmission line, not shown, by way of the optical circulator 372.

With the present embodiment, remaining pump light and generated phase conjugate light upon generation of phase conjugate light within the optical fiber 321 as a non-linear optical medium can be separated from each other without using an optical filter (for example, the optical band pass filter 331 of FIG. 34). Since the intensity of pump light used upon generation of phase conjugate light is very high in comparison with the intensities of probe light and generated phase conjugate light, the embodiment of FIG. 41 is useful to separate pump light of such high intensity from phase conjugate light.

While the number of beams of probe light is one in the embodiments described above, the present invention can be applied to a plurality of kinds of frequency division multiplexed probe light.

Figure 42:
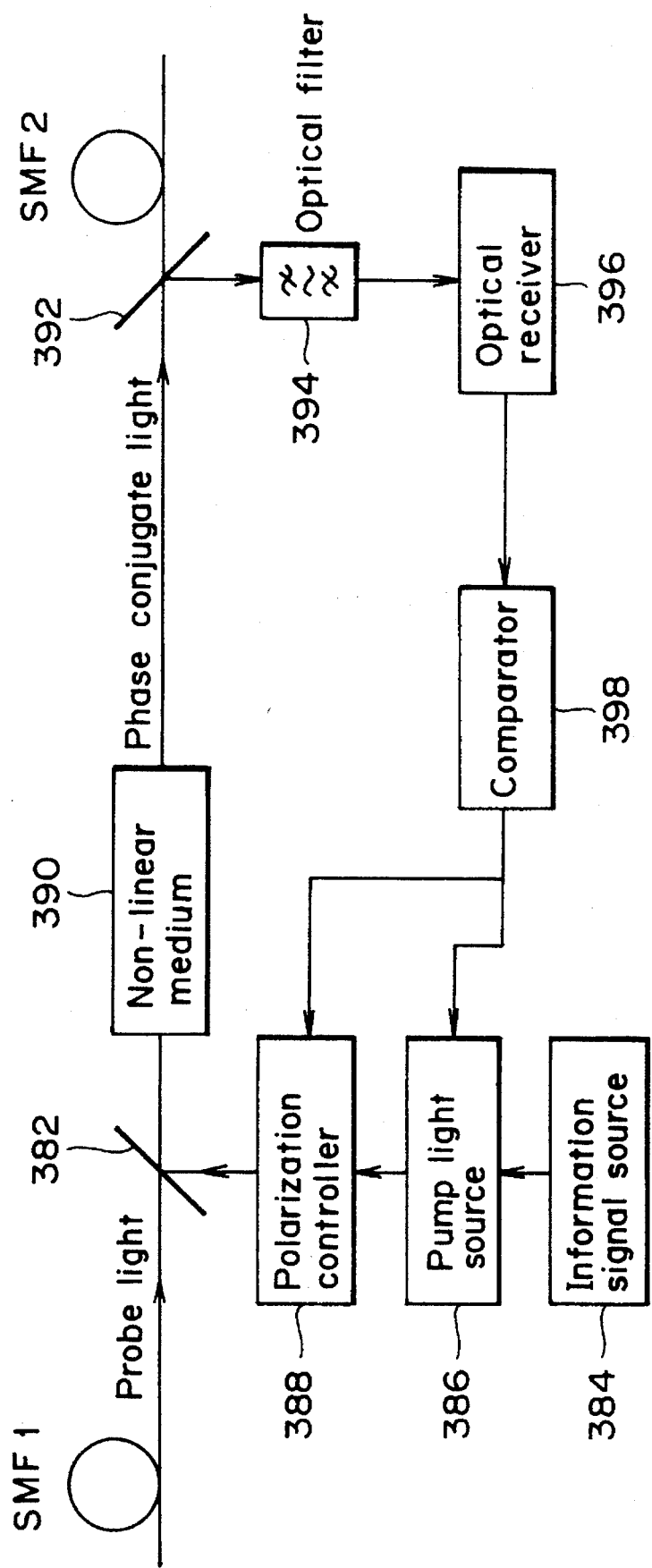
FIG. 42 is a block diagram showing an eleventh embodiment of an optical modulator of the present invention.

FIG. 42 is a block diagram showing an eleventh embodiment of an optical modulator of the present invention. Probe light from a single mode fiber SMF-1 is inputted to a first port of an optical coupler 382. Pump light from a pump light source 386 modulated by an information signal source 384 is supplied to a second port of the optical coupler 382 by way of a polarization controller 388. When the probe light and the pump light combined by the optical coupler 382 are inputted to a non-linear optical medium 390, phase conjugate light is generated in the non-linear optical medium 390, and the phase conjugate light is split into two beams of light by an optical coupler 392. One of the phase conjugate light beams thus split is sent out to another single mode fiber SMF-2 while the other of the split phase conjugate light beams passes an optical filter 394 and is converted into an electric signal by an optical receiver 396. A comparator 398 controls the polarization condition of the pump light and the oscillation wavelength of the pump light source 386 so that the output level of the optical receiver 396 may be maximum. The wavelength of the pump light is controlled in response to the temperature or the bias current of a laser diode which is used as the pump light source 386.

With the present embodiment, since the polarization condition of pump light is controlled positively in accordance with the polarization condition of probe light, phase conjugate light can be generated at a stabilized conversion efficiency irrespective of the polarization condition of the probe light.

While, in any of the embodiments of an optical modulator of the present invention described above, a probe light source is installed at a comparatively near location to a non-linear optical medium and the optical modulator is applied to a sending station, the present optical modulator can be applied also to a repeating station. In particular, by inputting probe light transmitted thereto from a sending station to a non-linear optical medium together with pump light (which is in a modulated condition), information can be written into phase conjugate light which is generated in the non-linear optical medium.

INDUSTRIAL APPLICABILITY

As described above, by applying phase conjugate optics to an optical system in accordance with the present invention, achievement of a novel function or improvement in characteristics of an optical system which has not been obtained by the prior art optical technology can be achieved.

I claim:

1. A phase conjugate light generation apparatus, comprising:

a non-linear optical medium;

a pump light source for outputting pump light;

signal light/pump light supply means connected to a signal light input port, for supplying input signal light supplied to the signal light input port to said non-linear optical medium together with the pump light from said pump light source; and signal light/phase conjugate light extraction means for extracting output signal light and phase conjugate light generated by an interaction between the input signal light and the pump light supplied to said non-linear optical medium and outputting the output signal light and the phase conjugate light from a signal light output port and a phase conjugate light output port, respectively;

wherein said signal light/pump light supply means comprises an optical coupler having first to third ports connected to said signal light input port, said pump light source and a first end of said non-linear optical medium, respectively, for outputting light supplied to said first and second ports from said third port thereof.

2. A phase conjugate light generation apparatus comprising:

a non-linear optical medium;

a pump light source for outputting pump light;

signal light/pump light supply means connected to a signal light input port, for supplying input signal light supplied to the signal light input port to said non-linear optical medium together with the pump light from said pump light source; and signal light/phase conjugate light extraction means for extracting output signal light and phase conjugate light generated by an interaction between the input signal light and the pump light supplied to said non-linear optical medium and outputting the output signal light and the phase conjugate light from a signal light output port and a phase conjugate light output port, respectively;

wherein said non-linear optical medium generates the phase conjugate light by four-light wave mixture of a one-directional pumping type; and said signal light/phase conjugate light extraction means comprising an optical divider having first to third ports and connected at said first port thereof to a second end of said non-linear optical medium for splitting light supplied to said first port into two beams of light and outputting the two beams of light from said second and third ports thereof, a first optical filter interposed in an optical path between said second port of said optical divider and said signal light output port and having a pass band which includes a frequency of the output signal light, and a second optical filter interposed in an optical path between said third port of said optical divider and said phase conjugate light output port and having a pass band which includes a frequency of the phase conjugate light.

3. A phase conjugate light generation apparatus, comprising:

a non-linear optical medium;

a pump light source for outputting pump light;

signal light/pump light supply means connected to a signal light input port, for supplying input signal light supplied to the signal light input port to said non-linear optical medium together with the pump light from said pump light source; and signal light/phase conjugate light extraction means for extracting output signal light and phase conjugate light generated by an interaction between the input signal light and the pump light supplied to said non-linear optical medium and outputting the output signal light and the phase conjugate light from a signal light output port and a phase conjugate light output port, respectively;

said pump light source comprising first and second pump light sources for outputting beams of pump light having equal frequencies to each other; and said signal light/pump light supply means comprising
a first optical coupler having first to third ports and connected at said second port thereof to said first pump light source and at said third port thereof to a first end of said pump light source, for outputting light supplied to said first and second ports from said third port thereof and for outputting light supplied to said third port from said first port thereof, and
a second optical coupler having first to third ports and connected at said first port thereof to a second end of said non-linear optical medium and at said second port thereof to said second pump light source, for outputting light supplied to said first port from said third port thereof and for outputting light supplied to said second port from said first port thereof.

4. A phase conjugate light generation apparatus according to claim 3, wherein:

said non-linear optical medium generates the phase conjugate light by four-light wave mixture of a bi-directional pumping type; and said signal light/phase conjugate light extraction means comprises
an optical divider having first to third ports and connected at said first port thereof to said signal light input port and at said third port thereof to said first port of said first optical coupler, for outputting light supplied to said first port from said third port thereof and for outputting light supplied to said third port from said second port thereof,
a first optical filter interposed in an optical path between said third port of said second optical coupler and said signal light output port and having a pass band which includes a frequency of the output signal light, and
a second optical filter interposed in an optical path between said second port of said optical divider and said phase conjugate light output port and having a pass band which includes a frequency of the phase conjugate light.

5. A phase conjugate light generation apparatus according to claim 3, wherein:

said non-linear optical medium generates the phase conjugate light by four-light wave mixture of a bi-directional pumping type;

said phase conjugate light output port comprises first and second phase conjugate light output ports; and said signal light/phase conjugate light extraction means comprises a first optical divider having first to third ports and connected at said first port thereof to said third port of said second optical coupler for splitting light supplied to said first port thereof, a first optical filter interposed in an optical path between said second port of said first optical divider and said signal light output port and having a pass band which includes a frequency of the output signal light, a second optical filter interposed in an optical path between said third port of said first optical divider and said first phase conjugate light output port and having a pass band which includes a frequency of the phase conjugate light, a second optical divider having first to third ports and connected at said first port thereof to said signal light input port and at said third port thereof to said first port of said first optical coupler, for outputting light supplied to said first port from said third port thereof and for outputting light supplied to said third port from said second port thereof, and a third optical filter interposed in an optical path between said second port of said second optical divider and said second phase conjugate light output port and having a pass band which includes the frequency of the phase conjugate light.

6. A phase conjugate light generation apparatus, comprising:

a non-linear optical medium;

a pump light source for outputting pump light;

signal light/pump light supply means connected to a signal light input port, for supplying input signal light supplied to the signal light input port to said non-linear optical medium together with the pump light from said pump light source;

signal light/phase conjugate light extraction means for extracting output signal light and phase conjugate light generated by an interaction between the input signal light and the pump light supplied to said non-linear optical medium and outputting the output signal light and the phase conjugate light from a signal light output port and a phase conjugate light output port, respectively; and modulation means for modulating the pump light in accordance with input data, wherein said modulation means modulates a frequency of the pump light.

7. A repeater optical transmission system, comprising:

a sending station;

a receiving station;

an optical transmission line laid between said sending station and said receiving station; and at least one repeating station interposed intermediately of said optical transmission line;

said at least one repeating station including a phase conjugate light generation apparatus, wherein said phase conjugate light generation apparatus comprises
a non-linear optical medium,
a pump light source for outputting pump light,
signal light/pump light supply means connected to a signal light input port, for supplying input signal light supplied to the signal light input port to said non-linear optical medium together with the pump light from said pump light source,
signal light/phase conjugate light extraction means for extracting output signal light and phase conjugate light generated by an interaction between the input signal light and the pump light supplied to said non-linear optical medium and outputting the output signal light and the phase conjugate light from a signal light output port and a phase conjugate light output port, respectively, and said phase conjugate light generation apparatus receiving light supplied thereto from the side of said sending station as the input signal light and sending out the phase conjugate light toward the side of said receiving station.

8. A repeater optical transmission system according to claim 7, wherein said at least one repeating station further comprises modulation means for modulating the pump light in accordance with input data, and the input data includes supervision data of said repeating station.

9. A repeater optical transmission system according to claim 7, wherein light to be sent out from said sending station is modulated in accordance with transmission data, and said at least one repeating station further comprises demodulation means for receiving the phase conjugate light generated by said phase conjugate light generation apparatus and reproducing demodulated data corresponding to the transmission data.

10. A repeater optical transmission system according to claim 7, wherein:

said at least one repeating station is a plurality of repeating stations;

said signal light input port of said phase conjugate light generation apparatus of a first one of the plurality of repeating stations as counted from the side of said sending station is connected to said sending station;

said signal light input port of said phase conjugate light generation apparatus of an nth (n being a natural number greater than 1) one of said plurality of repeating stations as counted from the side of said sending station is connected to said phase conjugate light output port of said phase conjugate light generation apparatus of the (n−1)th repeating station; and said phase conjugate light output port of said phase conjugate light generation apparatus of a first one of said plurality of repeating stations as counted from the side of said receiving station is connected to said receiving station.

11. A bi-directional repeater optical transmission system, comprising:

a first sending/receiving station having a first optical transmitter and a first optical receiver;

a second sending/receiving station having a second optical transmitter and a second optical receiver;

ascending and descending optical transmission lines laid between said first and second sending/receiving stations;

at least one repeating station interposed intermediately of said ascending and descending optical transmission lines;

said at least one repeating station comprising a phase conjugate light generation apparatus, wherein said phase conjugate light generation apparatus comprises
a non-linear optical medium,
a pump light source for outputting pump light,
signal light/pump light supply means connected to a signal light input port, for supplying input signal light supplied to the signal light input port to said non-linear optical medium together with the pump light from said pump light source, and signal light/phase conjugate light extraction means for extracting output signal light and phase conjugate light generated by an interaction between the input signal light and the pump light supplied to said non-linear optical medium and outputting the output signal light and the phase conjugate light, from a signal light output port and a phase conjugate light output port, respectively, said pump light source of said phase conjugate light generation apparatus comprising first and second pump light sources for outputting first pump light and second pump light, respectively, said phase conjugate light output port of said phase conjugate light generation apparatus comprising first and second phase conjugate light output ports, said phase conjugate light generation apparatus receiving light supplied to said signal light input port thereof from the side of said first sending/receiving station as first signal light, generating first phase conjugate light in accordance with the first signal light and the first pump light, sending out the first phase conjugate light from said first phase conjugate light output port thereof toward the side of said second sending/receiving station, receiving light supplied to said signal light output port thereof from the side of said second sending/receiving station as second signal light, generating second phase conjugate light in accordance with the second signal light and the second pump light, and sending out the second phase conjugate light from said second phase conjugate light output port thereof toward the side of said first sending/receiving station.

12. A bi-directional repeater optical transmission system according to claim 11, wherein:

said at least one repeating station is a plurality of repeating stations;

said signal light input port and said second phase conjugate light output port of said phase conjugate light generation apparatus of a first one of the plurality of repeating stations as counted from the side of said first sending/receiving station are connected to said first optical transmitter and said first optical receiver, respectively;

said signal light input port and said second phase conjugate light output port of said phase conjugate light generation apparatus of an nth (n being a natural number greater than 1) one of said plurality of repeating stations as counted from the side of said first sending/receiving station is connected to said first phase conjugate light output port and said signal light output port of said phase conjugate light generation apparatus of the (n−1)th repeating station, respectively; and said signal light output port and said first phase conjugate light output port of said phase conjugate light generation apparatus of a first one of said plurality of repeating stations as counted from the side of said second sending/receiving station is connected to said second optical transmitter and said second optical receiver, respectively.

13. An optical distribution system, comprising:

a plurality of phase conjugate light generation apparatuses, each comprising:
a non-linear optical medium;

a pump light source for outputting pump light;

signal light/pump light supply means connected to a signal light input port, for supplying input signal light supplied to the signal light input port to said non-linear optical medium together with the pump light from said pump light source; and signal light/phase conjugate light extraction means for extracting output signal light and phase conjugate light generated by an interaction between the input signal light and the pump light supplied to said non-linear optical medium and outputting the output signal light and the phase conjugate light from a signal light output port and a phase conjugate light output port, respectively;

said signal light output port and said phase conjugate light output port of an upper order one of each pair of adjacent ones of said plurality of phase conjugate light generation apparatuses being connected to said signal light input port of a lower order one phase conjugate light generation apparatus of the pair.

14. An optical switching system, comprising:

a phase conjugate light generation apparatus comprising a non-linear optical medium, a pump light source for outputting pump light, signal light/pump light supply means connected to a signal light input port, for supplying input signal light supplied to the signal light input port to said non-linear optical medium together with the pump light from said pump light source, signal light/phase conjugate light extraction means for extracting output signal light and phase conjugate light generated by an interaction between the input signal light and the pump light supplied to said non-linear optical medium and outputting the output signal light and the phase conjugate light from a signal light output port and a phase conjugate light output port, respectively;

switching means for switching said pump light source of said phase conjugate light generation apparatus on and off;

wherein said optical switching system switches, in response to operation of said switching means, between a condition wherein the phase conjugate light is generated and another condition wherein the phase conjugate light is not generated.

15. An optical channel selection system, comprising:

a phase conjugate light generation apparatus comprising a non-linear optical medium, a pump light source for outputting pump light, signal light/pump light supply means connected to a signal light input port, for supplying input signal light supplied to the signal light input port to said non-linear optical medium together with the pump light from said pump light source, and signal light/phase conjugate light extraction means for extracting output signal light and phase conjugate light generated by an interaction between the input signal light and the pump light supplied to said non-linear optical medium and outputting the output signal light and the phase conjugate light from a signal light output port and a phase conjugate light output port, respectively;

sweeping means for sweeping a frequency of the pump light of said phase conjugate light generation apparatus;

a plurality of kinds of frequency division multiplexed signal light being supplied to said signal light input port of said phase conjugate light generation apparatus; and phase conjugate light corresponding to signal light alternatively selected from the plurality of kinds of signal light being generated in response to operation of said sweeping means.

16. An optical AND circuit system, comprising:

a phase conjugate light generation apparatus, comprising a non-linear optical medium, a pump light source for outputting pump light, signal light/pump light supply means connected to a signal light input port, for supplying input signal light supplied to the signal light input port to said non-linear optical medium together with the pump light from said pump light source, and signal light/phase conjugate light extraction means for extracting output signal light and phase conjugate light generated by an interaction between the input signal light and the pump light supplied to said non-linear optical medium and outputting the output signal light and the phase conjugate light from a signal light output port and a phase conjugate light output port, respectively;

said pump light source comprising first and second pump light sources for outputting beams of pump light having equal frequencies to each other;

said signal light/pump light supply means comprising
a first optical coupler having first to third ports and connected at said second port thereof to said first pump light source and at said third port thereof to a first end of said pump light source, for outputting light supplied to said first and second ports from said third port thereof and for outputting light supplied to said third port from said first port thereof, and a second optical coupler having first to third ports and connected at said first port thereof to a second end of said non-linear optical medium and at said second port thereof to said second pump light source for outputting light supplied to said first port from said third port thereof and for outputting light supplied to said second port from said first port thereof; and pump light control means for varying the light emission intensities of said first and second pump light sources of said phase conjugate light generation apparatus in accordance with high and low levels of first and second input logic data, respectively;

the phase conjugate light being generated when both of the first and second input logic data have the high level.

17. An optical communications system, comprising:

a master station having phase conjugate light generation means and first modulation means;

a slave station having probe light generation means and first demodulation means; and an optical transmission line provided between said master station and said slave station;

said probe light generation means supplying probe light to a first end of said optical transmission line;

said phase conjugate light generation means generating phase conjugate light from the probe light outputted from a second end of said optical transmission line and supplying the phase conjugate light to the second end of said optical transmission line;

said first modulation means modulating the phase conjugate light in accordance with first input data;

said first demodulation means demodulating the first input data in accordance with the phase conjugate light outputted from the first end of said optical transmission line.

18. An optical communications system according to claim 17, wherein said phase conjugate light generation means comprises:
   a non-linear optical medium;
   pump light generation means for outputting pump light; and
   probe light/pump light supply means for supplying the pump light supplied thereto from said pump light generation means to said non-linear optical medium together with the probe light.

19. An optical communications system according to claim 18, wherein said non-linear optical medium exhibits a tertiary non-linear optical effect, and generates the phase conjugate light by four-light wave mixture.

20. An optical communications system according to claim 18, wherein said first modulation means comprises pump light modulation means for modulating the pump light in accordance with the first input data.

21. An optical communications system according to claim 20, wherein the pump light comprises first pump light and second pump light of the same frequency and supplied in the opposite directions to each other to said non-linear optical medium.

22. An optical communications system according to claim 21, wherein said pump light modulation means modulates one of an intensity and an amplitude of at least one of the first pump light and the second pump light.

23. An optical communications system according to claim 21, wherein said pump light modulation means modulates frequencies of the first pump light and the second pump light.

24. An optical communications system according to claim 17, wherein;
   said slave station further comprises second modulation means for modulating the probe light in accordance with second input data; and
   said master station further comprises second demodulation means for demodulating the second input data in accordance with the phase conjugate light generated by said phase conjugate light generation means.

25. An optical communications system according to claim 24, wherein:
   said second modulation means modulates one of a frequency and a phase of the probe light; and
   said first modulation means modulates one of an intensity and an amplitude of the phase conjugate light.

26. An optical communications system according to claim 24, wherein:
   said second modulation means modulates one of an intensity and an amplitude of the probe light at a comparatively low degree of modulation; and
   said first modulation means modulates one of an intensity and an amplitude of the phase conjugate light at a comparatively high degree of modulation.

27. An optical communications system according to claim 17, wherein said first modulation means modulates an intensity of the phase conjugate light, and said first demodulation means (207) includes an optical receiver for converting the phase conjugate light outputted from the first end of said optical transmission line into an electric signal, said first demodulation means performing direct detection.

28. An optical communications system according to claim 17, wherein said first modulation means modulates one of an amplitude, a phase and a frequency of the phase conjugate light, and said first demodulation means (207) includes an optical receiver for receiving, at a same optical receiving face thereof, the phase conjugate light outputted from the first end of said optical transmission line together with local light and converting the received light into an electric signal, said first demodulation means performing heterodyne detection.

29. An optical communications system according to claim 28, wherein said slave station further comprises optical splitting means for splitting the probe light from said probe light generation means into first probe light and second probe light, and the first probe light is supplied to the first end of said optical transmission line while the second probe light is supplied as the local light to said optical receiver.

30. An optical communications system according to claim 29, wherein:
   said optical transmission line comprises a single mode fiber;
   said phase conjugate light generation means comprises first and second phase conjugate light generation apparatuses; and
   said master station further comprises a polarization beam splitter having first to third ports and connected at said first port thereof to said single mode fiber and at said second and third ports thereof to said first and second phase conjugate light generation apparatuses, respectively, for splitting light supplied to said first port into two orthogonally polarized light components and outputting the two orthogonally polarized light components from said second and third ports thereof and for outputting two orthogonally polarized light components supplied to said second and third ports from said first port thereof.

31. An optical communications system according to claim 17, wherein the probe light supplied to the first end of said optical transmission line comprises a plurality of kinds of frequency division multiplexed probe light.

32. An optical communications system according to claim 17, wherein:
   said slave station further comprises second modulation means for modulation the probe light in accordance with second input data;
   said optical communications system comprises a plural number of said master station; and
   each of the plurality of master stations further comprises second demodulation means for demodulating the second input data in accordance with the phase conjugate light generated by said phase conjugate light generation means.

33. An optical communications system according to claim 32, wherein said phase conjugate light generation means of each of the plurality of master stations comprises:
   a non-linear optical medium;
   pump light generation means for generating pump light; and
   probe light/pump light supply means for supplying the pump light supplied thereto from said pump light generation means to said non-linear optical medium together with the probe light;
   wherein the kinds of pump light generated from the pump light generation means have different frequencies from one another.

34. An optical communications system according to claim 17, comprising a plural number of said slave station.

35. An optical modulator, comprising:
a probe light source;
a pump light source;
a non-linear optical medium;
probe light/pump light supply means for supplying probe light from said probe light source to said non-linear optical medium together with pump light from said pump light source; and
modulation means operatively connected to said pump light source for modulating a frequency of the pump light;
said non-linear optical medium outputting modulated phase conjugate light.

36. An optical modulator, comprising:
a probe light source;
a pump light source;
a non-linear optical medium;
probe light/pump light supply means for supplying probe light from said probe light source to said non-linear optical medium together with pump light from said pump light source; and
modulation means operatively connected to said pump light source for modulating a phase of the pump light;
said non-linear optical medium outputting modulated phase conjugate light.

37. An optical modulator, comprising
a probe light source;
a pump light source;
a non-linear optical medium;
probe light/pump light supply means for supplying probe light from said probe light source to said non-linear optical medium together with pump light from said pump light source;
modulation means operatively connected to said pump light source for modulating the pump light in accordance with an information signal;
said non-linear optical medium outputting modulated phase conjugate light; and
an optical band pass filter operatively connected to said non-linear optical medium and having a pass band which includes a wavelength of the phase conjugate light.

38. An optical modulator according to claim 37, further comprising an optical amplifier operatively connected to said optical band pass filter for amplifying the phase conjugate light.

39. An optical modulator, comprising:
a probe light source;
a pump light source;
a non-linear optical medium;
probe light/pump light supply means for supplying probe light from said probe light source to said non-linear optical medium together with pump light from said pump light source; and
modulation means operatively connected to said pump light source for modulating the pump light in accordance with an information signal;
said non-linear optical medium outputting modulated phase conjugate light, wherein said non-linear optical medium comprises an optical fiber.

40. An optical modulator according to claim 39, wherein a wavelength of the probe light and a wavelength of the pump light are a little different from each other, and a wavelength which provides zero-dispersion of said optical fiber substantially coincides with the wavelength of the pump light.

41. An optical modulator, comprising:
a probe light source;
a pump light source;
a non-linear optical medium;
probe light/pump light supply means for supplying probe light from said probe light source to said non-linear optical medium together with pump light from said pump light source; and
modulation means operatively connected to said pump light source for modulating the pump light in accordance with an information signal;
said non-linear optical medium outputting modulated phase conjugate light;
wherein the pump light is modulated by frequency modulation in accordance with a signal having a sufficiently lower speed than the information signal.

42. An optical modulator, comprising:
a probe light source;
a pump light source;
a non-linear optical medium;
probe light/pump light supply means for supplying probe light from said probe light source to said non-linear optical medium together with pump light from said pump light source;
modulation means operatively connected to said pump light source for modulating the pump light in accordance with an information signal;
said non-linear optical medium outputting modulated phase conjugate light;
polarization splitting means for splitting the probe light into first and second polarized light components having polarization planes perpendicular to each other; and
polarization composition means;
said non-linear optical medium receiving the first and second polarized light components of the probe light and outputting phase conjugate light corresponding to the first and second polarized light components so that the phase conjugate light is generated by said polarization composition means.

43. An optical modulator, comprising:
a probe light source;
a pump light source;
a non-linear optical medium;
probe light/pump light supply means for supplying probe light from said probe light source to said non-linear optical medium together with pump light from said pump light source; and
modulation means operatively connected to said pump light source for modulating the pump light in accordance with an information signal;
said non-linear optical medium comprising a polarization holding fiber and outputting modulated phase conjugate light;
the pump light being substantially linearly polarized light having a predetermined polarization plane; and
said pump light source being set so that the predetermined polarization plane is inclined approximately by 45° with respect to the main axis of said polarization holding fiber.

44. An optical modulator, comprising:

a probe light source;

a pump light source;

a non-linear optical medium;

probe light/pump light supply means for supplying probe light from said probe light source to said non-linear optical medium together with pump light from said pump light source; and modulation means operatively connected to said pump light source for modulating the pump light in accordance with an information signal;

said non-linear optical medium outputting modulated phase conjugate light and comprises first and second polarization holding fibers of substantially equal lengths, said first and second polarization holding fibers being connected to each other such that the main axes thereof are perpendicular to each other;

the pump light being substantially linearly polarized light having a predetermined polarization plane;

the pump light being supplied to said first polarization holding fiber; and said pump light source being set so that the predetermined polarization plane is inclined approximately by 45° with respect to the main axis of said first polarization holding fiber.

45. An optical modulator according to claim 39, wherein said probe light/pump light supply means comprises:

an optical coupler having first to third ports and connected at said first and second ports thereof to said probe light source and said pump light source, respectively, for outputting light supplied to said first and second ports thereof from said third port; and a polarization beam splitter having fourth to seventh ports and connected at said fourth port thereof to said third port, said polarization beam splitter outputting the modulated phase conjugate light from said fifth port thereof, said sixth and seventh ports being connected to the first end and the second end of said optical fiber, respectively, said polarization beam splitter outputting two orthogonally polarized light components of light supplied to said fourth and fifth ports from said sixth and seventh ports thereof, respectively, said polarization beam splitter outputting two orthogonally polarized light components of light supplied to said sixth and seventh ports from said fourth and fifth ports thereof, respectively;

said pump light source being set so that the polarization plane of the pump light to be supplied to said fourth port is inclined approximately by 45° with respect to both of the polarization planes of the two orthogonally polarized light components.

46. An optical modulator according to claim 45, further comprising a polarization controller for controlling a polarization condition of light supplied to said optical fiber and a polarization condition of light to be outputted from said optical fiber so that they may coincide with each other.

47. An optical modulator according to claim 45, wherein said optical fiber is a polarization holding fiber.

48. An optical modulator according to claim 39, wherein said probe light/pump light supply means comprises:

an optical coupler having first to fourth ports, the pump light being supplied to said first port, the probe light being supplied to said second port, said optical coupler equally distributing light supplied to said first and second ports thereof so as to be outputted from said third and fourth ports thereof, said optical coupler equally distributing light supplied to said third and fourth ports thereof so as to be outputted from said first and second ports thereof;

a polarization beam splitter have fifth to eighth ports, said sixth port being connected to said fourth port, said seventh and eighth ports being connected to the first end and the second end of said optical fiber, respectively, said polarization beam splitter outputting two orthogonally polarized light components of light supplied to said fifth and sixth ports from said seventh and eighth ports thereof, said polarization beam splitter outputting two orthogonally polarized light components of light supplied to said seventh and eighth ports from said fifth and sixth ports thereof; and a half-wave plate interposed in an optical path between said third port and said fifth port;

wherein the pump light and the probe light supplied to said first and second ports, respectively, have polarization conditions which coincide with each other.

49. An optical modulator according to claim 48, further comprising an optical circulator having a ninth port connected to said probe light source, a tenth port connected to said second port, and an eleventh port for outputting the modulated phase conjugate light, said optical circulator outputting light supplied to said ninth port from said tenth port thereof, said optical circulator outputting light supplied to said tenth port from said eleventh port thereof.

50. An optical modulator according to claim 39, wherein said probe light/pump light supply means comprises:

an optical coupler having a first port to which the probe light is supplied, a second port to which the pump light is supplied, and a third port connected to the first end of said optical fiber, said optical coupler outputting the probe light and the pump light supplied to said first and second ports, respectively, from said third port thereof, the modulated phase conjugate light being outputted from the second end of said optical fiber.

51. An optical modulator according to claim 50, further comprising a polarization scrambler interposed in an optical path between said probe light source and said first port for disturbing the polarization condition of the probe light.

52. An optical modulator according to claim 50, further comprising a polarization scrambler interposed in an optical path between said pump light source and said second port for disturbing the polarization condition of the pump light.

* * * * *

UNITED STATES PATENT AND TRADEMARK OFFICE
CERTIFICATE OF CORRECTION

PATENT NO. : 5,596,667
DATED : January 21, 1997
INVENTOR(S) : Shigeki WATANABE

It is certified that error appears in the above-indentified patent and that said Letters Patent is hereby corrected as shown below:

Column 4, line 67, ";" should be --.--.

Column 6, equation 9, delete "+tm" and "(9)" (the equation number) should be right justified;
    equations 10 and 11, at the end of the line after "c" insert --.--.

Column 7, line 17, "11" should be --1--.

Column 16, line 40, delete ",".

Column 18, equation 20, at the end of the line after "c" insert --.--.

Column 20, line 14, delete "value" (second occurrence).

Column 24, line 54, "72" should be --272--.

Column 26, equation 31, should read
    $--A_I(\omega_I,t) \alpha K|A_P|^2|F(\omega,t)|^2 A_s^*(\omega_s,t)--$.

Column 36, line 27, after "apparatus" insert --,--.

Column 40, line 8, delete ",".

Column 43, line 35, ";" should be --:--;
    *line 60, delete "(207)".

Column 44, line 1, delete "(207)";
    *line    "modulation" should be --modulating--.

UNITED STATES PATENT AND TRADEMARK OFFICE
CERTIFICATE OF CORRECTION

PATENT NO. : 5,596,667

DATED : Janaury 21, 1997

INVENTOR(S) : Shigeki WATANABE

It is certified that error appears in the above-indentified patent and that said Letters Patent is hereby corrected as shown below:

Column 48, line 14, "have" should be --having--.

Signed and Sealed this

Second Day of September, 1997

Attest:

BRUCE LEHMAN

Attesting Officer

Commissioner of Patents and Trademarks